US008384829B2

(12) United States Patent
Yamashita et al.

(10) Patent No.: US 8,384,829 B2
(45) Date of Patent: Feb. 26, 2013

(54) DISPLAY APPARATUS AND DISPLAY APPARATUS DRIVING METHOD

(75) Inventors: Junichi Yamashita, Tokyo (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/285,582

(22) Filed: Oct. 31, 2011

(65) Prior Publication Data

US 2012/0154682 A1 Jun. 21, 2012

(30) Foreign Application Priority Data

Dec. 15, 2010 (JP) ................................ 2010-279002

(51) Int. Cl.
*H04N 9/68* (2006.01)

(52) U.S. Cl. ...................................................... 348/649

(58) Field of Classification Search .................. 348/649, 348/650, 645, 646, 651, 655, 656, 725, 552, 348/653

See application file for complete search history.

(56) References Cited

U.S. PATENT DOCUMENTS

| | | | | |
|---|---|---|---|---|
| 6,686,698 | B2 * | 2/2004 | Takeuchi et al. | 315/169.2 |
| 6,774,951 | B2 * | 8/2004 | Narushima | 348/552 |
| 7,737,933 | B2 * | 6/2010 | Yamano et al. | 345/94 |
| 7,742,019 | B2 * | 6/2010 | Takahara | 345/76 |
| 7,817,210 | B2 * | 10/2010 | Ikeda et al. | 348/671 |
| 7,924,248 | B2 * | 4/2011 | Takahara | 345/76 |
| 8,144,141 | B2 * | 3/2012 | Hirose et al. | 345/209 |
| 2007/0080905 | A1 * | 4/2007 | Takahara | 345/76 |
| 2007/0268210 | A1 | 11/2007 | Uchino et al. | |
| 2008/0225027 | A1 * | 9/2008 | Toyomura et al. | 345/204 |
| 2011/0141149 | A1 * | 6/2011 | Inoue et al. | 345/690 |
| 2012/0162532 | A1 * | 6/2012 | Oniki et al. | 348/725 |

FOREIGN PATENT DOCUMENTS

| | | |
|---|---|---|
| JP | 2007-310311 | 11/2007 |

* cited by examiner

*Primary Examiner* — Paulos M Natnael
(74) *Attorney, Agent, or Firm* — Rader, Fishman & Grauer PLLC

(57) ABSTRACT

A display apparatus includes: a display panel that includes display elements having a current-driven light-emitting portion, in which the display elements are arranged in a two-dimensional matrix in a first direction and a second direction, and that displays an image on the basis of a video signal; and a luminance correcting unit that corrects the luminance of the display elements when displaying an image on the display panel by correcting a gradation value of an input signal and outputting the corrected input signal as the video signal. The luminance correcting unit includes a reference operating time calculator, an accumulated reference operating time storage, a reference curve storage, a gradation correction value holder, and a video signal generator.

7 Claims, 41 Drawing Sheets

(EXAMPLE 1)

(EXAMPLE 1)

(EXAMPLE 1)

(EXAMPLE 1)

(EXAMPLE 1)

(EXAMPLE 1)

(EXAMPLE 1)

(EXAMPLE 1)

PANEL TEMPERATURE: t1 DUTY RATIO : $DR_{Mode0}$ (EXAMPLE 1)

PANEL TEMPERATURE: t1 DUTY RATIO : $DR_{Mode0}$ (EXAMPLE 1)

(EXAMPLE 1)

PANEL TEMPERATURE: t1 DUTY RATIO : $DR_{Mode0}$ (EXAMPLE 1)

PANEL TEMPERATURE: t1 DUTY RATIO : $DR_{Mode0}$ (EXAMPLE 1)

PANEL TEMPERATURE: t1 DUTY RATIO : $DR_{Mode0}$ (EXAMPLE 1)

(EXAMPLE 1)

(EXAMPLE 1)

(EXAMPLE 1)

PANEL TEMPERATURE: t1

(EXAMPLE 1)

(EXAMPLE 1)

FIG.19

(EXAMPLE 1)

| | | | | | | | |
|---|---|---|---|---|---|---|---|
| $SP_{(1,1)}$ | $SP_{(2,1)}$ | ● ● ● | $SP_{(n-1,1)}$ | $SP_{(n,1)}$ | $SP_{(n+1,1)}$ | ● ● ● | $SP_{(N,1)}$ |
| $SP_{(1,2)}$ | $SP_{(2,2)}$ | ● ● ● | $SP_{(n-1,2)}$ | $SP_{(n,2)}$ | $SP_{(n+1,2)}$ | ● ● ● | $SP_{(N,2)}$ |
| ⋮ | ⋮ | | ⋮ | ⋮ | ⋮ | | ⋮ |
| $SP_{(1,m)}$ | $SP_{(2,m)}$ | ● ● ● | $SP_{(n-1,m)}$ | $SP_{(n,m)}$ | $SP_{(n+1,m)}$ | ● ● ● | $SP_{(N,m)}$ |
| ⋮ | ⋮ | | ⋮ | ⋮ | ⋮ | | ⋮ |
| $SP_{(1,M)}$ | $SP_{(2,M)}$ | ● ● ● | $SP_{(n-1,M)}$ | $SP_{(n,M)}$ | $SP_{(n+1,M)}$ | ● ● ● | $SP_{(N,M)}$ |

$$SP_{(n,m)\_Q-1}=SP_{(n,m)\_Q-2}+T_F \cdot f_{DRC}(DR_{Mode}) \cdot f_{CSC}(VD_{Sig(n,m)\_Q-2})$$

(EXAMPLE 1)

*FIG.22*

(EXAMPLE 1)

| | | | | | | | |
|---|---|---|---|---|---|---|---|
| $LC_{(1,1)}$ | $LC_{(2,1)}$ | • • • | $LC_{(n-1,1)}$ | $LC_{(n,1)}$ | $LC_{(n+1,1)}$ | • • • | $LC_{(N,1)}$ |
| $LC_{(1,2)}$ | $LC_{(2,2)}$ | • • • | $LC_{(n-1,2)}$ | $LC_{(n,2)}$ | $LC_{(n+1,2)}$ | • • • | $LC_{(N,2)}$ |
| ⋮ | ⋮ | | ⋮ | ⋮ | ⋮ | | ⋮ |
| $LC_{(1,m)}$ | $LC_{(2,m)}$ | • • • | $LC_{(n-1,m)}$ | $LC_{(n,m)}$ | $LC_{(n+1,m)}$ | • • • | $LC_{(N,m)}$ |
| ⋮ | ⋮ | | ⋮ | ⋮ | ⋮ | | ⋮ |
| $LC_{(1,M)}$ | $LC_{(2,M)}$ | • • • | $LC_{(n-1,M)}$ | $LC_{(n,M)}$ | $LC_{(n+1,M)}$ | • • • | $LC_{(N,M)}$ |

$LC_{(n,m)\_Q-1}=1/f_{REF}(SP_{(n,m)\_Q-1})$ (EXAMPLE 2)

(EXAMPLE 2)

(EXAMPLE 2)

(EXAMPLE 2)

(EXAMPLE 2)

(EXAMPLE 2)

(EXAMPLE 2)

(EXAMPLE 2)

*FIG.31*

(EXAMPLE 2)

| | | | | | | | |
|---|---|---|---|---|---|---|---|
| $SP_{(1,1)}$ | $SP_{(2,1)}$ | ••• | $SP_{(n-1,1)}$ | $SP_{(n,1)}$ | $SP_{(n+1,1)}$ | ••• | $SP_{(N,1)}$ |
| $SP_{(1,2)}$ | $SP_{(2,2)}$ | ••• | $SP_{(n-1,2)}$ | $SP_{(n,2)}$ | $SP_{(n+1,2)}$ | ••• | $SP_{(N,2)}$ |
| ⋮ | ⋮ | | ⋮ | ⋮ | ⋮ | | ⋮ |
| $SP_{(1,m)}$ | $SP_{(2,m)}$ | ••• | $SP_{(n-1,m)}$ | $SP_{(n,m)}$ | $SP_{(n+1,m)}$ | ••• | $SP_{(N,m)}$ |
| ⋮ | ⋮ | | ⋮ | ⋮ | ⋮ | | ⋮ |
| $SP_{(1,M)}$ | $SP_{(2,M)}$ | ••• | $SP_{(n-1,M)}$ | $SP_{(n,M)}$ | $SP_{(n+1,M)}$ | ••• | $SP_{(N,M)}$ |

$$SP_{(n,m)\_Q-1}=SP_{(n,m)\_Q-2}+T_F\cdot f_{DRC}(DR_{Mode})\cdot f_{CSC}(VD_{Sig(n,m)\_Q-2})\cdot f_{TAC}(WPT_{\_Q-2})$$

(EXAMPLES 1 TO 2)

(EXAMPLES 1 TO 2)

[ TP(2)-1 ]

[ TP(2)0 ]

(EXAMPLES 1 TO 2)

(EXAMPLES 1 TO 2)

[ TP(2)3 ]

[ TP(2)4 ]

(EXAMPLES 1 TO 2)

[ TP(2)5 ]

[ TP(2)5 ] (CONTINUED)

(EXAMPLES 1 TO 2)

(EXAMPLES 1 TO 2)

[ TP(2)8 ]

[MODIFICATION]

[MODIFICATION]

DISPLAY APPARATUS AND DISPLAY APPARATUS DRIVING METHOD

FIELD

The present disclosure relates to a display apparatus and a display apparatus driving method.

BACKGROUND

Display elements having a light-emitting portion and display apparatuses having such display elements are widely known. For example, a display element (hereinafter, also simply abbreviated as an organic EL display element) having an organic electroluminescence light-emitting portion using the electroluminescence (hereinafter, also abbreviated as EL) of an organic material has attracted attention as a display element capable of emitting light with high luminance through low-voltage DC driving.

Similarly to a liquid crystal display, for example, in a display apparatus (hereinafter, also simply abbreviated as an organic EL display apparatus) including organic EL display elements, a simple matrix type and an active matrix type are widely known as a driving type. The active matrix type has a disadvantage that the structure is complicated but has an advantage that the luminance of an image can be enhanced. The organic EL display element driven by an active matrix driving method includes a light-emitting portion constructed by an organic layer including a light-emitting layer and a driving circuit driving the light-emitting portion.

As a circuit driving an organic electroluminescence light-emitting portion (hereinafter, also simply abbreviated as a light-emitting portion), for example, a driving circuit (referred to as a 2Tr/1C driving circuit) including two transistors and a capacitor is widely known from JP-A-2007-310311 and the like. The 2Tr/1C driving circuit includes two transistors of a writing transistor $TR_W$ and a driving transistor $TR_D$ and one capacitor $C_1$, as shown in FIG. 3.

The operation of the organic EL display element including the 2Tr/1C driving circuit will be described in brief below. As shown in the timing diagram of FIG. 32, a threshold voltage cancelling process is performed in period $TP(2)_3$ and period $TP(2)_5$. Then, a writing process is performed in period $TP(2)_7$ and a drain current $I_{ds}$ flowing from the drain region of the driving transistor $TR_D$ to the source region flows in the light-emitting portion ELP in period $TP(2)_8$. Basically, the organic EL display element emits light with a luminance corresponding to the product of the emission efficiency of the light-emitting portion ELP and the value of the drain current $I_{ds}$ flowing in the light-emitting portion ELP.

The operation of the organic EL display element including the 2Tr/1C driving circuit will be described later in detail with reference to FIG. 32 and FIGS. 33A to 38.

In general, in a display apparatus, the luminance becomes lower as the operating time becomes longer. In the display apparatus using the organic EL display elements, the fall in luminance due to a temporal variation in the emission efficiency of a light-emitting portion is observed. Therefore, in the display apparatus, when a single pattern is displayed for a long time, a so-called burn-in phenomenon where a variation in luminance due to the displayed pattern is observed or the like may occur. For example, as shown in FIG. 41A, the display apparatus is made to operate for a long time in a state where characters are displayed (in white) on the upper-right part of a display area EA of the organic EL display apparatus and all areas other than the characters are displayed in black. Thereafter, when the entire display area EA is displayed in white, the luminance of the upper-right part in which the characters have been displayed in the display area EA is relatively lowered as shown in FIG. 41B, which is recognized as an unnecessary pattern. In this way, when the burn-in phenomenon occurs, the display quality of the display apparatus is lowered.

SUMMARY

The fall in display quality of the display apparatus due to the burn-in phenomenon can be resolved by controlling the display elements so as to compensate for the fall in luminance due to the burn-in phenomenon when driving the display elements in the area in which the burn-in phenomenon occurs. However, for example, the fall in emission efficiency of a light-emitting portion of an organic EL display element depends on the history of the duty ratio of an emission period of the display element (for example, the ratio at which an emission period occupies one frame period) or the like in addition to the histories of the luminance of a displayed image and the operating time. In a method of measuring temporal variation data of an operation history plural times in advance and compensating for the fall in luminance due to the burn-in phenomenon with reference to a table storing the temporal variation data, there is a problem in that the scale of a control circuit increases and the control is complicated.

Therefore, it is desirable to provide a display apparatus which can compensate for a fall in luminance due to a burn-in phenomenon without individually storing a history of the luminance of a displayed image, a history of the operating time, and a history of the duty ratio of an emission period of a display element as data but by reflecting the histories or to provide a display apparatus driving method which can compensate for the fall in luminance due to a burn-in phenomenon by reflecting the histories.

An embodiment of the present disclosure is directed to a display apparatus including: a display panel that includes display elements having a current-driven light-emitting portion, in which the display elements are arranged in a two-dimensional matrix in a first direction and a second direction, and that displays an image on the basis of a video signal; and a luminance correcting unit that corrects the luminance of the display elements when displaying an image on the display panel by correcting a gradation value of an input signal and outputting the corrected input signal as the video signal, wherein the luminance correcting unit includes: a reference operating time calculator that calculates the value of a reference operating time in which a temporal variation in luminance of each display element when the corresponding display element operates for a predetermined unit time on the basis of the video signal in a state where the duty ratio of an emission period is set to a certain duty ratio is equal to a temporal variation in luminance of each display element when it is assumed that the corresponding display element operates on the basis of the video signal of a predetermined reference gradation value in a state where the duty ratio of the emission period is set to a predetermined reference duty ratio; an accumulated reference operating time storage that stores an accumulated reference operating time value obtained by accumulating the value of the reference operating time calculated by the reference operating time calculator for each display element; a reference curve storage that stores a reference curve representing the relationship between the operating time of each display element and the temporal variation in luminance of the corresponding display element when the corresponding display element operates on the basis of the video signal of the predetermined reference gradation value in the state where the duty ratio of the emission period is set to the predetermined reference duty ratio; a gradation correction value holder that calculates a correction value of a gradation value used to compensate for the temporal variation in luminance of each display element with reference to the accumulated reference operating time storage and the reference curve storage and that holds the correction value of the gradation value corresponding to the respective display elements; and a video signal generator that corrects the gradation value of the input signal corresponding to the respective display elements on the basis of the correction values of the gradation values held by the gradation correction value holder and that outputs the corrected input signal as the video signal.

Another embodiment of the present disclosure is directed to a display apparatus driving method using a display apparatus having a display panel that includes display elements having a current-driven light-emitting portion, in which the display elements are arranged in a two-dimensional matrix in a first direction and a second direction, and that displays an image on the basis of a video signal and a luminance correcting unit that corrects the luminance of the display elements when displaying an image on the display panel by correcting a gradation value of an input signal and outputting the corrected input signal as the video signal. The display apparatus driving method includes correcting the luminance of the display elements when displaying an image on the display panel by correcting a gradation value of an input signal on the basis of the operation of the luminance correcting unit and outputting the corrected input signal as the video signal. The correcting includes: calculating the value of a reference operating time in which a temporal variation in luminance of each display element when the corresponding display element operates for a predetermined unit time on the basis of the video signal in a state where the duty ratio of an emission period is set to a certain duty ratio is equal to a temporal variation in luminance of each display element when it is assumed that the corresponding display element operates on the basis of the video signal of a predetermined reference gradation value in a state where the duty ratio of the emission period is set to a predetermined reference duty ratio; storing an accumulated reference operating time value obtained by accumulating the value of the calculated reference operating time for each display element; calculating a correction value of a gradation value used to compensate for the temporal variation in luminance of each display element with reference to a reference curve representing the relationship between the operating time of each display element and the temporal variation in luminance of the corresponding display element when the corresponding display element operates on the basis of the video signal of the predetermined reference gradation value in the state where the duty ratio of the emission period is set to the predetermined reference duty ratio on the basis of the accumulated reference operating time value and holding the correction value of the gradation value corresponding to the respective display elements; and correcting the gradation value of the input signal corresponding to the respective display elements on the basis of the correction values of the gradation values and outputting the corrected input signal as the video signal.

In the display apparatus according to the embodiment of the present disclosure, it is possible to compensate for a fall in luminance due to the burn-in phenomenon without individually storing a history of the luminance of a displayed image, a history of the operating time, and a history of the duty ratio of an emission period of each display element as data but by reflecting the histories. In the display apparatus driving method according to the embodiment of the present disclosure, it is possible to compensate for a fall in luminance due to a burn-in phenomenon by not individually storing a history of luminance of a displayed image, a history of an operating time, and a history of the duty ratio of an emission period of each display element as data but reflecting the histories.

BRIEF DESCRIPTION OF THE DRAWINGS

FIG. 19 is a graph schematically illustrating data stored in an accumulated reference operating time storage shown in FIG. 2.

FIG. 22 is a graph schematically illustrating data stored in a gradation correction value storage of the gradation correction value holder shown in FIG. 2.

FIG. 31 is a graph schematically illustrating data stored in an accumulated reference operating time storage shown in FIG. 24.

DETAILED DESCRIPTION

Figure 1:
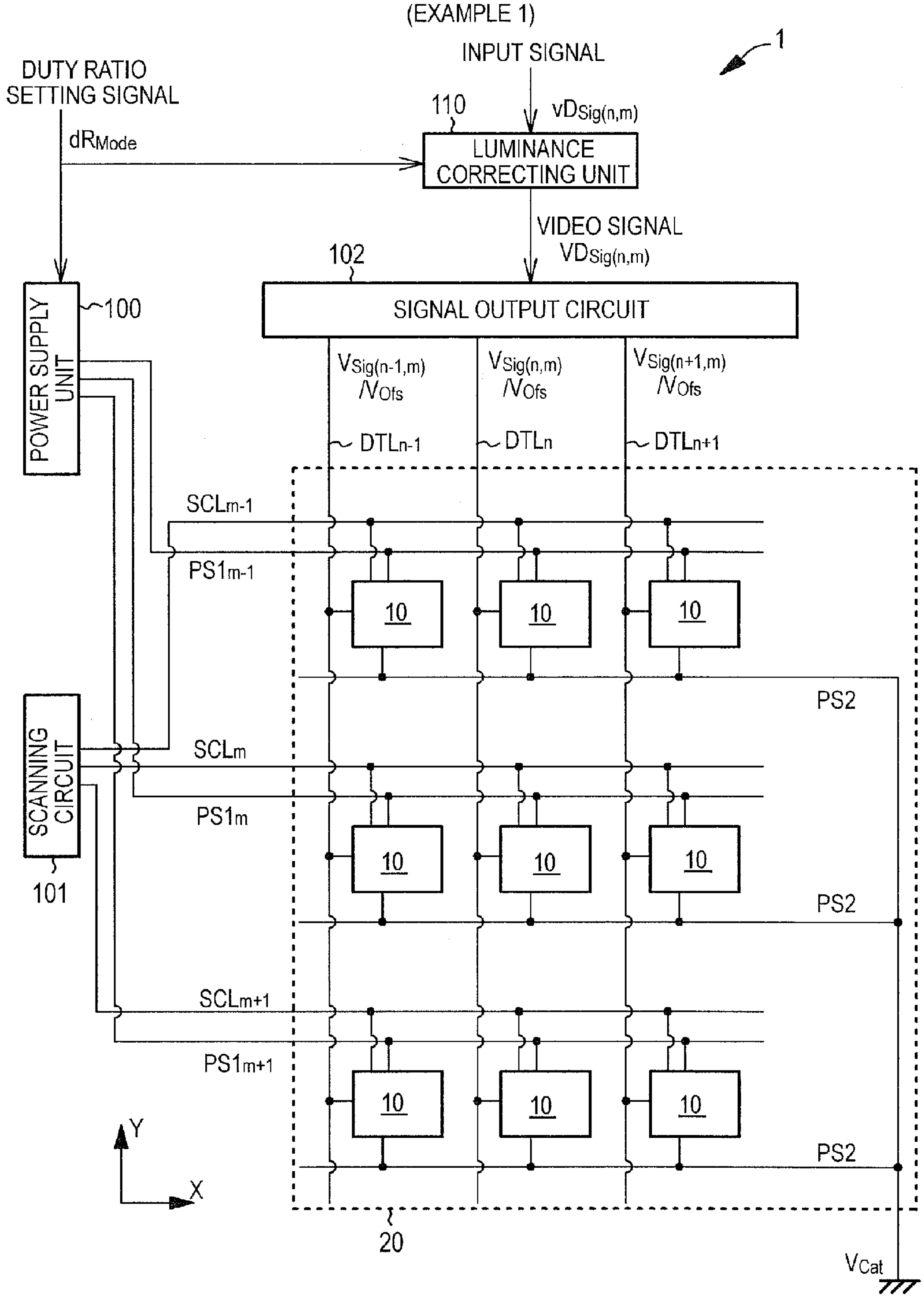
FIG. 1 is a conceptual diagram illustrating a display apparatus according to Example 1.

Hereinafter, examples of the present disclosure will be described with reference to the accompanying drawings. The present disclosure is not limited to the examples and various numerical values and materials in the embodiments are only examples. The description will be made in the following order.

1. General Explanation of Display Apparatus and Display Apparatus Driving Method
2. Example 1 (Display Apparatus and Display Apparatus Driving Method)
3. Example 2 (Display Apparatus and Display Apparatus Driving Method)

[General Explanation of Display Apparatus and Display Apparatus Driving Method]

From the viewpoint of digital control, it is preferable that the values of an input signal and a video signal vary in steps expressed by powers of 2. In the display apparatus and the display apparatus driving method according to the embodiment of the present disclosure, the gradation value of the video signal may be greater than the maximum value of the gradation value of the input signal.

For example, an input signal can be subjected to an 8-bit gradation control and a video signal can be subjected to a gradation control greater than 8 bits. For example, a configuration in which the video signal is subjected to a 9-bit control can be considered, but the present disclosure is not limited to this example.

In the display apparatus according to the embodiment of the present disclosure or the display apparatus used in a display apparatus driving method according to an embodiment of the present disclosure (hereinafter, also generally referred to as a display apparatus according to an embodiment of the present disclosure), the luminance correcting unit may further include: an operating time conversion factor storage that stores as an operating time conversion factor the ratio of the value of the operating time until the temporal variation in luminance reaches a certain value by causing each display element to operate on the basis of the video signal of the gradation values in the state where the duty ratio of the emission period is set to the predetermined reference duty ratio and the value of the operating time until the temporal variation in luminance reaches the certain value by causing each display element to operate on the basis of the video signal of a predetermined reference gradation value in the state where the duty ratio of the emission period is set to the predetermined reference duty ratio; and a duty ratio acceleration factor storage that stores the ratio of a second operating time conversion factor and an operating time conversion factor as a duty ratio acceleration factor when the ratio of the value of the operating time until the temporal variation in luminance reaches a certain value by causing each display element to operate on the basis of the video signal of the gradation values in the state where the duty ratio of the emission period is set to the duty ratio different from the predetermined reference duty ratio and the value of the operating time until the temporal variation in luminance reaches the certain value by causing each display element to operate on the basis of the video signal of a predetermined reference gradation value in the state where the duty ratio of the emission period is set to the predetermined reference duty ratio is defined as the second operating time conversion factor. The reference operating time calculator may calculate the value of the reference operating time by referring to the value stored in the operating time conversion factor storage to correspond to the gradation value of the video signal and the value stored in the duty ratio acceleration factor storage to correspond to the duty ratio of the emission period during operation and multiplying the value of a unit time by the stored values.

In the display apparatus having the above-mentioned preferable configuration, as the unit time becomes shorter, the precision in burn-in compensation becomes further improved but the processing load of the luminance correcting unit also becomes greater. The unit time can be appropriately set depending on the specification of the display apparatus.

For example, a time given as the reciprocal of a display frame rate, that is, a time occupied by a so-called one frame period, can be set as the unit time. Alternatively, a time occupied by a period including a predetermined number of frame periods can be set as the unit time. In the latter case, video signals of various gradation values are supplied to one display element in the unit time. In this case, for example, it has only to be configured to refer to only the gradation value in the first frame period of the unit time.

The display apparatus according to the present disclosure having the above-mentioned configuration may further include a temperature sensor, the operating time conversion factor stored in the operating time conversion factor storage may be an operating time conversion factor when each display element operates under a predetermined temperature condition, the luminance correcting unit may further include a temperature acceleration factor storage that stores the ratio of a third operating time conversion factor and an operating time conversion factor as a temperature acceleration factor when the ratio of the value of the operating time until the temporal variation in luminance reaches a certain value by causing each display element to operate on the basis of the video signal of the gradation values in the state where the duty ratio of the emission period is set to the predetermined reference duty ratio under a temperature condition different from the predetermined temperature condition and the value of the operating time until the temporal variation in luminance reaches the certain value by causing each display element to operate on the basis of the video signal of a predetermined reference gradation value in the state where the duty ratio of the emission period under the predetermined temperature condition is set to the predetermined reference duty ratio is defined as the third operating time conversion factor, and the reference operating time calculator may calculate the value of the reference operating time by referring to the value stored in the operating time conversion factor storage to correspond to the gradation value of the video signal, the value stored in the duty ratio acceleration factor storage to correspond to the duty ratio of the emission period during operation, and the value stored in the temperature acceleration factor storage to correspond to temperature information of the temperature sensor and multiplying the value of a unit time by the stored values.

In this case, the installation position of the temperature sensor can be appropriately determined depending on the specification of the display apparatus, and it is preferable that the temperature sensor is basically disposed in a display panel, from the viewpoint of observation of the temperature condition of the display elements. The number of temperature sensors can be appropriately determined depending on the design of the display apparatus. When the temperature condition of the display panel during operation of the display apparatus is substantially uniform in the overall display panel, only one temperature sensor is preferably installed, from the viewpoint of simplification in configuration of the display apparatus. On the other hand, when the temperature condition varies between the upper and lower parts of the display panel or between the right and left parts thereof, it is preferable that plural temperature sensors be installed so as to perform a control on the basis of the values of the temperature sensors.

The temperature sensor may be a contact type or a non-contact type. The configuration of the temperature sensor is not particularly limited, and a widely-known temperature sensor such as a thermistor or a semiconductor sensor using the temperature characteristic of a semiconductor element can be used. When the temperature sensor is independent of the display panel, the temperature sensor can be preferably disposed outside a display area of the display panel. The temperature sensor may be disposed in a part on the rear surface of the display panel corresponding to the display area. On the other hand, when the temperature sensor is formed of the same type of semiconductor element as a semiconductor element (for example, a transistor constituting a driving circuit which drives a light-emitting portion) constituting a display element, the temperature sensor may be disposed in a part surrounding the display area of the display panel or may be disposed in the display element.

In the display apparatus according to the embodiment of the present disclosure having the above-mentioned various preferred configurations, a reference operating time calculator, an accumulated reference operating time storage, a reference curve storage, a gradation correction value holder, a video signal generator, an operating time conversion factor storage, a duty ratio acceleration factor storage, and a temperature acceleration factor storage of the luminance, correcting unit can be constructed by widely-known circuit elements. The same is true of various circuits such as a power supply circuit, a scanning circuit, and a signal output circuit to be described later.

The display apparatus according to the embodiment of the present disclosure having the above-mentioned various configurations may have a so-called monochrome display configuration or a color display configuration.

In case of the color display configuration, one pixel can include plural sub-pixels, and for example, one pixel can include three sub-pixels of a red light-emitting sub-pixel, a green light-emitting sub-pixel, and a blue light-emitting sub-pixel. A group (such as a group additionally including a sub-pixel emitting white light to improve the luminance, a group additionally including a sub-pixel complementary color light to extend the color reproduction range, a group additionally including a sub-pixel emitting yellow light to extend the color reproduction range, and a group additionally including sub-pixels emitting yellow and cyan to extend the color reproduction range) including one or more types of sub-pixels in addition to the three types of sub-pixels may be configured.

Examples of pixel values in the display apparatus include several image-display resolutions such as VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536), (1920, 1035), (720, 480), and (1280, 960), but the pixel values are not limited to these values.

In the display apparatus according to the embodiment of the present disclosure, examples of a current-driven light-emitting portion constituting a display element include an organic electroluminescence light-emitting portion, an LED light-emitting portion, and a semiconductor laser light-emitting portion. These light-emitting portions can be formed using widely-known materials or methods. From the viewpoint of construction of a flat panel display apparatus, the light-emitting portion is preferably formed of the organic electroluminescence light-emitting portion. The organic electroluminescence light-emitting portion may be of a top emission type or a bottom emission type. The organic electroluminescence light-emitting portion can include an anode electrode, a hole transport layer, a light-emitting layer, an electron transport layer, and a cathode electrode.

The display elements of the display panel are formed in a certain plane (for example, on a base) and the respective light-emitting portions are formed above the driving circuit driving the corresponding light-emitting portion, for example, with an interlayer insulating layer interposed therebetween.

An example of the transistors constituting the driving circuit driving the light-emitting portion is an n-channel thin film transistor (TFT). The transistor constituting the driving circuit may be of an enhancement type or a depression type. The n-channel transistor may have an LDD (Lightly Doped Drain) structure formed therein. In some cases, the LDD structure may be asymmetric. For example, since a large current flows in a driving transistor at the time of light emission of the corresponding display element, the LDD structure may be formed in only one source/drain region serving as the drain region at the time of emission of light. For example, a p-channel thin film transistor may be used.

A capacitor constituting the driving circuit can include one electrode, the other electrode, and a dielectric layer interposed between the electrodes. The transistor and the capacitor constituting the driving circuit are formed in a certain plane (for example, on a base) and the light-emitting portion is formed above the transistor and the capacitor constituting the driving circuit, for example, when an interlayer insulating layer interposed therebetween. The other source/drain region of the driving transistor is connected to one end (such as the anode electrode of the light-emitting portion) of the light-emitting portion, for example, via a contact hole. The transistor may be formed in a semiconductor substrate.

Examples of the material of the base or a substrate to be described later include polymer materials having flexibility, such as polyethersulfone (PES), polyimide, polycarbonate (PC), and polyethylene terephthalate (PET), in addition to glass materials such as high strain point glass, soda glass ($Na_2O.CaO.SiO_2$), borosilicate glass ($Na_2O.B_2O_3.SiO_2$), forsterite ($2MgO.SiO_2$), and solder glass ($Na_2O.PbO.SiO_2$). The surface of the base or the substrate may be variously coated. The materials of the base and the substrate may be equal to or different from each other. When the base and the substrate formed of a polymer material having flexibility are used, a flexible display apparatus can be constructed.

In the display apparatus, various wires such as scanning lines, data lines, and power supply lines may have widely-known configurations or structures.

In two source/drain regions of one transistor, the term "one source/drain region" may be used to mean a source/drain region connected to a power source. If a transistor is in the ON state, it means that a channel is formed between the source/drain regions. It is not considered whether a current flow from one source/drain region of the transistor to the other source/drain region. On the other hand, if a transistor is in the OFF state, it means that a channel is not formed between the source/drain regions. The source/drain region can be formed of a conductive material such as polysilicon containing impurities or amorphous silicon or may be formed of metal, alloy, conductive particles, stacked structures thereof, or a layer including an organic material (conductive polymer).

Conditions in various expressions in this specification are satisfied when the expressions are substantially valid as well as when the expressions are mathematically strictly valid. Regarding the validation of the expressions, a variety of unevenness caused in designing or manufacturing the display elements or the display apparatus is allowable.

In timing diagrams used in the below description, the lengths (time length) of the horizontal axis representing various periods are schematic and do not show the ratios of the time lengths of the periods. The same is true of the vertical axis. The wave forms in the timing diagrams are schematic.

EXAMPLE 1

Example 1 relates to a display apparatus and a display apparatus driving method according to an embodiment of the present disclosure.

FIG. 1 is a conceptual diagram illustrating the display apparatus 1 according to Example 1. The display apparatus 1 according to Example 1 includes a display panel 20 in which display elements 10 each having a current-driven light-emitting portion are arranged in a two-dimensional matrix in a first direction and a second direction and that displays an image on a video signal $VD_{Sig}$ and a luminance correcting unit 110 that corrects the luminance of the display elements 10 when displaying an image on the display panel 20 by correcting the gradation value of the input signal $vD_{Sig}$ and outputting the corrected input signal as the video signal $VD_{Sig}$. In Example 1, the light-emitting portion is constructed by an organic electroluminescence light-emitting portion.

Total N×M display elements 10 of N display elements in the first direction (the X direction in FIG. 1 which is also referred to as a row direction) and M display elements in the second direction (the Y direction in FIG. 1 which is also referred to as a column direction) are arranged in a two-dimensional matrix. The number of rows of the display elements 10 is M and the number of display elements 10 in each row is N. 3×3 display elements 10 are shown in FIG. 1, which is only an example.

The display panel 20 includes plural (M) scanning lines SCL being connected to a scanning circuit 101 and extending in the first direction, plural (N) data lines DTL being connected to a signal output circuit 102 and extending in the second direction, and plural (M) power supply lines PS1 being connected to a power supply unit 100 and extending in the first direction. The display elements 10 in the m-th row (where m=1, 2, . . . , M) are connected to the m-th scanning line $SCL_m$ and the m-th power supply line $PS1_m$ and constitute a display element row. The display elements 10 in the n-th column (where n=1, 2, . . . , N) are connected to the n-th data line $DTL_n$.

The power supply unit 100 and the luminance correcting unit 110 are supplied with a duty ratio setting signal $dR_{Mode}$ used to set a duty ratio (for example, the ratio of an emission period in one frame period) of an emission period of the display element 10 from the outside. The "duty ratio of the emission period" will be described later in detail with reference FIG. 5.

The duty ratio setting signal $dR_{Mode}$ is a signal for switching an image display mode to a normal display mode or a cinema mode or the like and can be appropriately set to a value, for example, by an observer's selection.

By changing the duty ratio of the emission period, it is possible to adjust the brightness of the entire screen without affecting the gradation expression of the image. Specifically, as the duty ratio of the emission period decreases, the screen becomes dark as a whole and an image suitable for observation in a low-illuminance environment can be displayed.

For purposes of ease of expanation, it is assumed that the duty ratio setting signal $dR_{Mode}$ can be switched (is a 2-bit signal) among four types of $dR_{Mode0}$, $dR_{Mode1}$, $dR_{Mode2}$, and $dR_{Mode3}$. When the duty ratio setting signal $dR_{Mode}$ is $dR_{Mode0}$, it is assumed that the display mode is a normal display mode and the duty ratio of the emission period of the display element 10 is, for example, 0.8. When the duty ratio setting signal $dR_{Mode}$ is $dR_{Mode1}$, $dR_{Mode2}$, or $dR_{Mode3}$, it is assumed that the display mode is a cinema mode and the duty ratio of the emission period of the display element 10 is, for example, 0.4 for the signal $dR_{Mode1}$, 0.3 for the signal $dR_{Mode2}$, and 0.2 for the signal $dR_{Mode3}$.

The duty ratio of the emission period corresponding to the duty ratio setting signal $dR_{Mode}$ is represented by reference sign $DR_{Mode}$. In the above-mentioned example, the duty ratio $DR_{Mode0}$=0.8, the duty ratio $DR_{Mode1}$=0.4, the duty ratio $DR_{Mode2}$=0.3, and the duty ratio $DR_{Mode3}$=0.2 are set.

The number of the duty ratio setting signals $dR_{Mode}$ switched is not limited to four. The duty ratio $DR_{Mode}$ are not limited to the above-mentioned values. These can be appropriately set depending on the design of the display apparatus.

The power supply unit 100 changes the voltage changing time in the power supply line PS1 shown in FIG. 1 depending on the value of the duty ratio setting signal $dR_{Mode}$ and controls the duty ratio of the emission period to be the above-mentioned values.

The power supply unit 100 and the scanning circuit 101 can have widely-known configurations or structures. The signal output circuit 102 includes a D/A converter or a latch circuit not shown, generates a video signal voltage $V_{Sig}$ based on the gradation value of a video signal $VD_{Sig}$, holds the video signal voltage $V_{Sig}$ corresponding to one row, and supplies the video signal voltage $V_{Sig}$ to N data lines DTL. The signal output circuit 102 includes a selector circuit not shown and is switched between a state where the video signal voltage $V_{Sig}$ is supplied to the data lines DTL and a state where a reference voltage $V_{Ofs}$ to be described later is supplied to the data lines DTL by the switching of the selector circuit. The power supply unit 100, the scanning circuit 101, and the signal output circuit 102 can be constructed using widely-known circuit elements and the like.

The display apparatus 1 according to Example 1 is a monochrome display apparatus including plural display elements 10 (for example, N×M=640×480). Each display element 10 constitutes a pixel. In the display area, the pixel are arranged in a two-dimensional matrix in the row direction and the column direction.

The display apparatus 1 is line-sequentially scanned by rows by a scanning signal from the scanning circuit 101. A display element 10 located at the n-th position of the M-th row is hereinafter referred to as a (n, m)-th display element 10 or a (n, m)-th pixel. The input signal $vD_{Sig}$ corresponding to the (n, m)-th display element 10 is represented by $vD_{Sig(n,m)}$ and the video signal $VD_{Sig}$, which is corrected by the luminance correcting unit 110, corresponding to the (n, m)-th display element 10 is represented by $VD_{Sig(n,m)}$. The video signal voltage based on the video signal $VD_{Sig(n,m)}$ is represented by $V_{Sig(n,m)}$.

As described above, the luminance correcting unit 110 corrects the gradation value of the input signal $vD_{Sig}$ and outputs the corrected input signal as the video signal $VD_{Sig}$.

For purposes of ease of expanation, it is assumed that the number of gradation bits of the input signal $vD_{Sig}$ is 8 bits. The gradation value of the input signal $vD_{Sig}$ is one of 0 to 255 depending on the luminance of an image to be displayed. Here, it is assumed that the luminance of the image to be displayed becomes higher as the gradation value becomes greater.

For purposes of ease of expanation, it is assumed that the number of gradation bits of the video signal $VD_{Sig}$ is 9 bits. The gradation value of the video signal $VD_{Sig}$ is one of 0 to 511 depending on the temporal variation of the display element 10 and the gradation value of the input signal $vD_{Sig}$. The display element 10 in the initial state, that is, the display element 10 in which the luminance variation due to the temporal variation does not occur, is supplied with the video signal $VD_{Sig}$ of the same gradation value as the gradation value of the input signal $vD_{Sig}$ from the luminance correcting unit 110.

Figure 2:
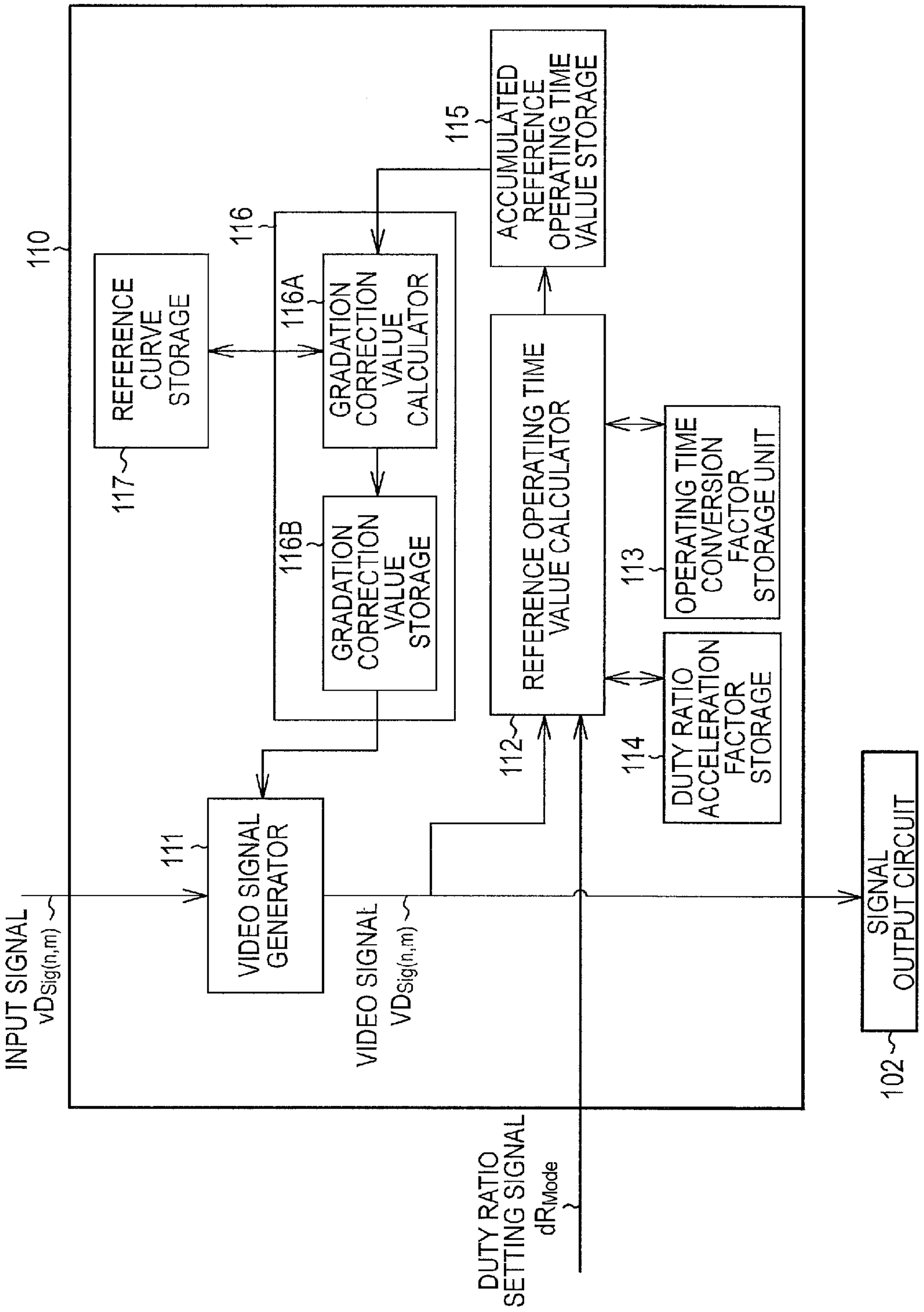
FIG. 2 is a block diagram schematically illustrating the configuration of a luminance correcting unit.

FIG. 2 is a block diagram schematically illustrating the configuration of the luminance correcting unit 110. The operation of the luminance correcting unit 110 will be described in detail later with reference to FIGS. 17 to 22. The luminance correcting unit 110 will be schematically described below.

The luminance correcting unit 110 includes a reference operating time calculator 112, an accumulated reference operating time storage 115, a reference curve storage 117, a gradation correction value holder 116, and a video signal generator 111 and further includes an operating time conversion factor storage 113 and a duty ratio acceleration factor storage 114. These are constructed by a calculation circuit or a memory device (memory) and can be constructed by widely-known circuit elements.

The reference operating time calculator 112 calculates the value of a reference operating time in which the temporal variation in luminance of each display element 10 when the corresponding display element 10 operates for a predetermined unit time on the basis of the video signal $VD_{Sig}$ in a state where the duty ratio of the emission period is set to a certain duty ratio is equal to the temporal variation in luminance of the corresponding display element 10 when it is assumed that the corresponding display element 10 operates on the basis of the video signal $VD_{Sig}$ of a predetermined reference gradation value in a state where the duty ratio of the emission period is set to a predetermined reference duty ratio. The "predetermined unit time", the "predetermined reference duty ratio", and the "predetermined reference gradation value" will be described later.

The operating time conversion factor storage 113 stores as an operating time conversion factor the ratio of the values of the operating times until the temporal variation in luminance reaches a certain value by causing each display element 10 to operate on the basis of the video signal $VD_{Sig}$ of various gradation values in the state where the duty ratio of the emission period is set to a predetermined reference duty ratio and the value of an operating time until the temporal variation in luminance by causing the corresponding display element 10 to operate on the basis of the video signal $VD_{Sig}$ of the predetermined reference gradation value in the state where the duty ratio of the emission period is set to a predetermined reference duty ratio. Specifically, the operating time conversion factor storage 113 stores functions $f_{CSC}$ representing the relationship shown in the graph of FIG. 17 as a table in advance.

The operating time conversion factor storage 113 can be constructed by a memory device such as a so-called nonvolatile memory. The same is true of the duty ratio acceleration factor storage 114 or the reference curve storage 117.

The duty ratio acceleration factor storage 114 stores as a duty ratio acceleration factor the ratio of a second operating time conversion factor and an operating time conversion factor when the ratio of the value of each operating time until the temporal variation in luminance reaches a certain value by causing each display element 10 to operate on the basis of the video signal $VD_{Sig}$ of various gradation values in the state where the duty ratio of the emission period is set to a duty ratio different from the predetermined reference duty ratio and the value of the operating time until the temporal variation in luminance reaches the certain value by causing the corresponding display element 10 to operate on the basis of the video signal $VD_{Sig}$ of the predetermined reference gradation value in the state where the duty ratio of the emission period is set to the predetermined reference duty ratio is defined as the second operating time conversion factor. Specifically, the duty ratio acceleration factor storage 114 stores a table of the duty ratio acceleration factors expressed by functions $f_{DRC}$ shown in the graph of FIG. 18 in advance.

The reference operating time calculator 112 calculates the value of the reference operating time by referring to the value stored in the operating time conversion factor storage 113 to correspond to the gradation value of the video signal $VD_{Sig}$ and the value stored in the duty ratio acceleration factor storage 114 to correspond to the duty ratio of the emission period during operation and multiplying the value of the unit time by the stored values.

The accumulated reference operating time storage 115 stores an accumulated reference operating time value obtained by accumulating the value of the reference operating time calculated by the reference operating time calculator 112 for each display element 10. The accumulated reference operating time value is a value reflecting the operation history of the display apparatus 1 and is not reset by turning off the display apparatus 1 or the like. The accumulated reference operating time storage 115 is constructed by a rewritable nonvolatile memory device including memory areas corresponding to the display elements 10 and stores the data shown in FIG. 19.

The reference curve storage 117 stores a reference curve representing the relationship between the operating time of each display element 10 and the temporal variation in luminance of the corresponding display element 10 when the corresponding display element 10 operates on the basis of the video signal $VD_{Sig}$ of the predetermined reference gradation value in the state where the duty ratio of the emission period is set to a predetermined reference duty ratio. Specifically, the reference curve storage 117 stores functions $f_{REF}$ representing the reference curve shown in FIG. 20 as a table in advance.

The functions $f_{CSC}$, the functions $f_{DRC}$, and the functions $f_{REF}$ are determined in advance on the basis of data measured or the like by the use of a display apparatus with the same specification.

In Example 1, the "predetermined unit time" is defined as the time occupied by a so-called one frame period, the "predetermined reference duty ratio" is set to the duty ratio $DR_{Mode0}$ (=0.8) corresponding to the duty ratio setting signal $dR_{Mode0}$, and the "predetermined reference gradation value" is set to 500, but the present disclosure is not limited to these set values. Desirable values can be selected as these set values depending on the design of the display apparatus.

The gradation correction value holder 116 calculates a correction value of a gradation value used to compensate for the temporal variation in luminance of each display element 10 with reference to the accumulated reference operating time storage 115 and the reference curve storage 117 and holds the correction value of the gradation value corresponding to each display element 10. The gradation correction value holder 116 includes a gradation correction value calculator 116A and a gradation correction value storage 116B. The gradation correction value calculator 116A is constructed by a calculation circuit. The gradation correction value storage 116B includes memory areas corresponding to the display elements 10, is constructed by a rewritable memory device, and stores the data shown in FIG. 22.

The video signal generator 111 corrects the gradation value of the input signal $vD_{Sig}$ corresponding to each display element 10 on the basis of the correction value of the gradation value held by the gradation correction value holder 116 and outputs the corrected input signal as the video signal $VD_{Sig}$.

Hitherto, the luminance correcting unit 110 has been schematically described. The configuration of the display apparatus 1 will be described below.

Figure 3:
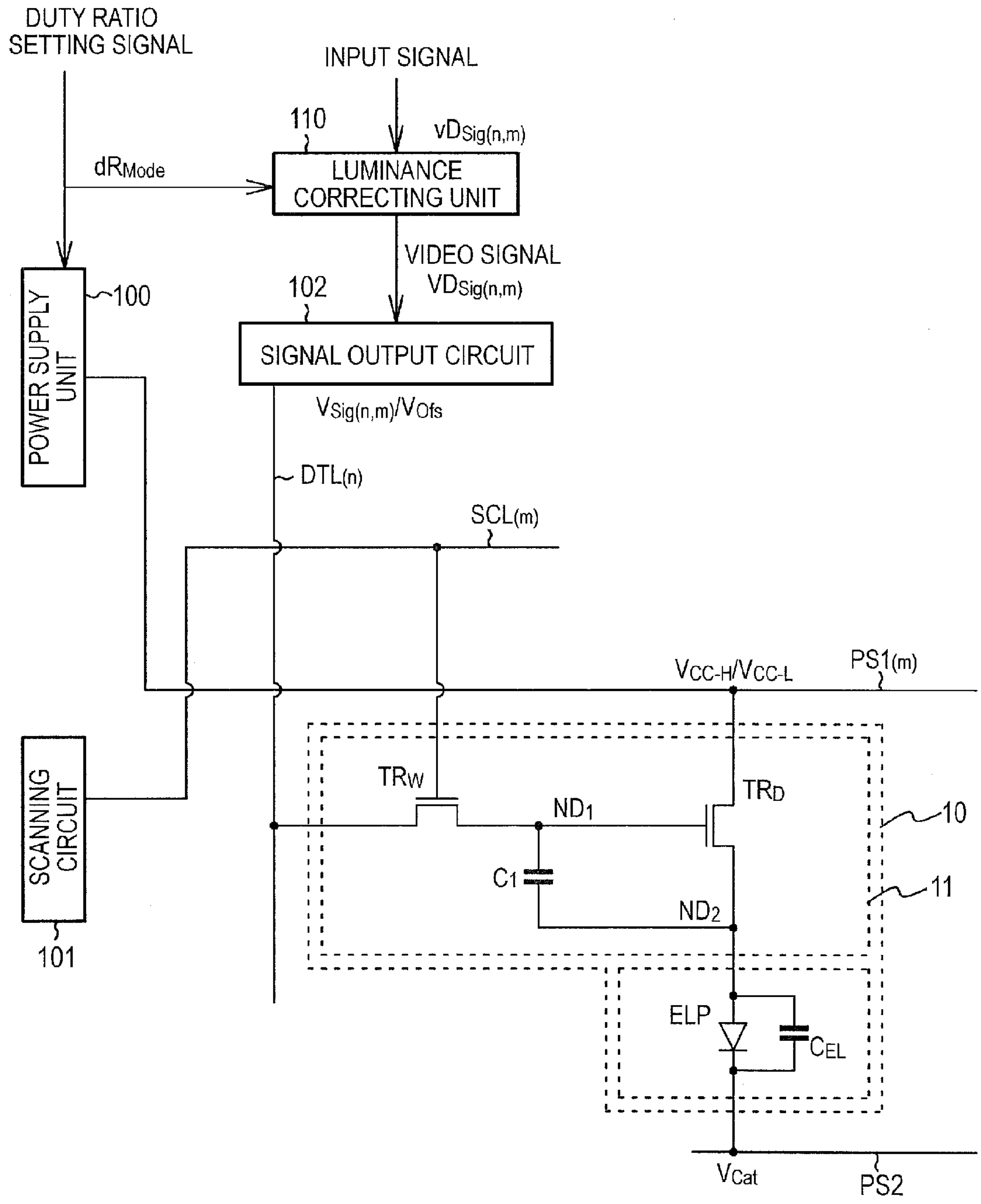
FIG. 3 is an equivalent circuit diagram of a display element constituting a display panel.

FIG. 3 is an equivalent circuit diagram of a display element 10 constituting the display panel 20.

Each display element 10 includes a current-driven light-emitting portion ELP and a driving circuit 11. The driving circuit 11 includes at least a driving transistor $TR_D$ having a gate electrode and source/drain regions and a capacitor $C_1$. A current flows in the light-emitting portion ELP via the source/drain regions of the driving transistor $TR_D$. Although described later in detail with reference FIG. 4, the display element 10 has a structure in which a driving circuit 11 and a light-emitting portion ELP connected to the driving circuit 11 are stacked.

Figure 39:
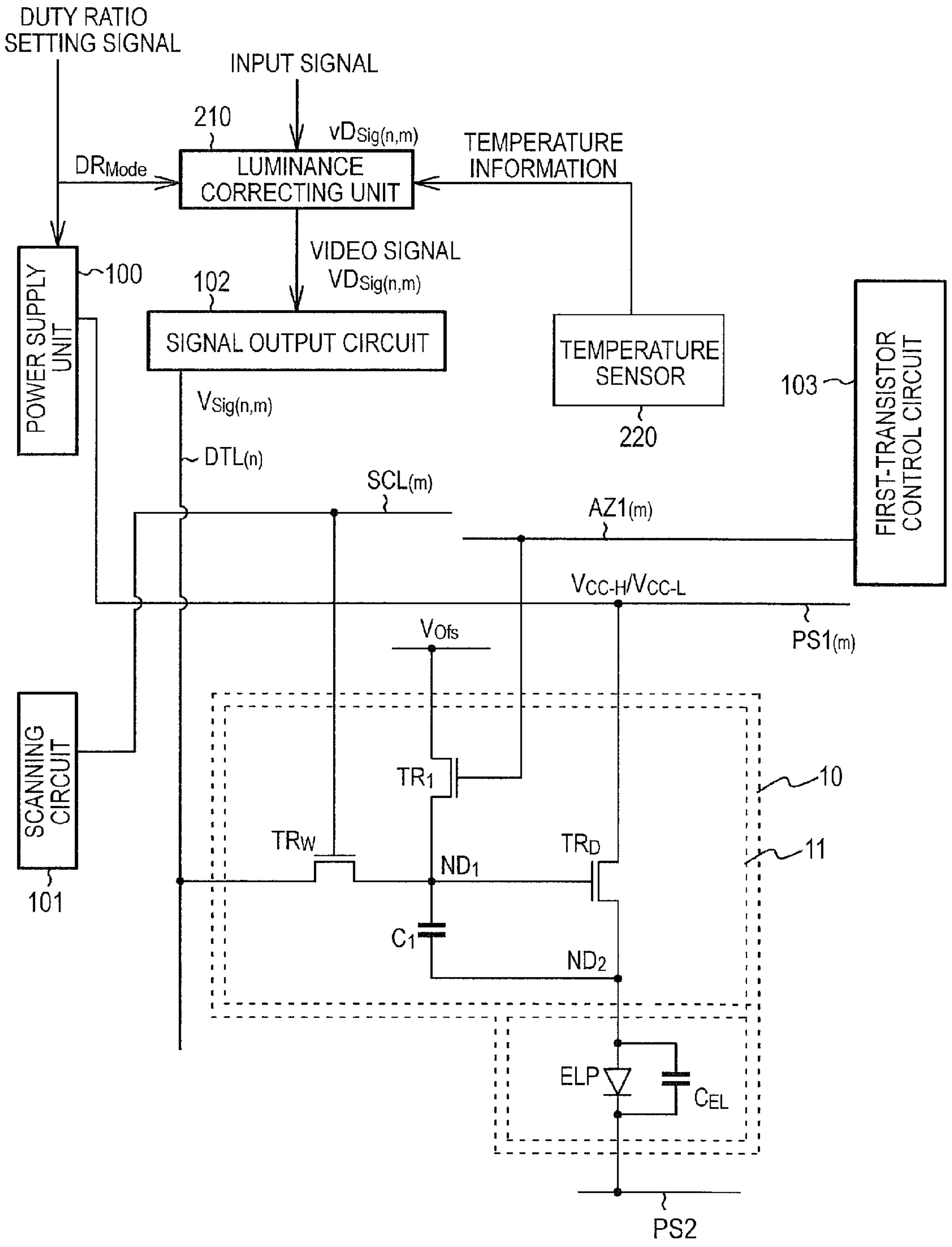
FIG. 39 is an equivalent circuit diagram of a display element including a driving circuit.
Figure 40:
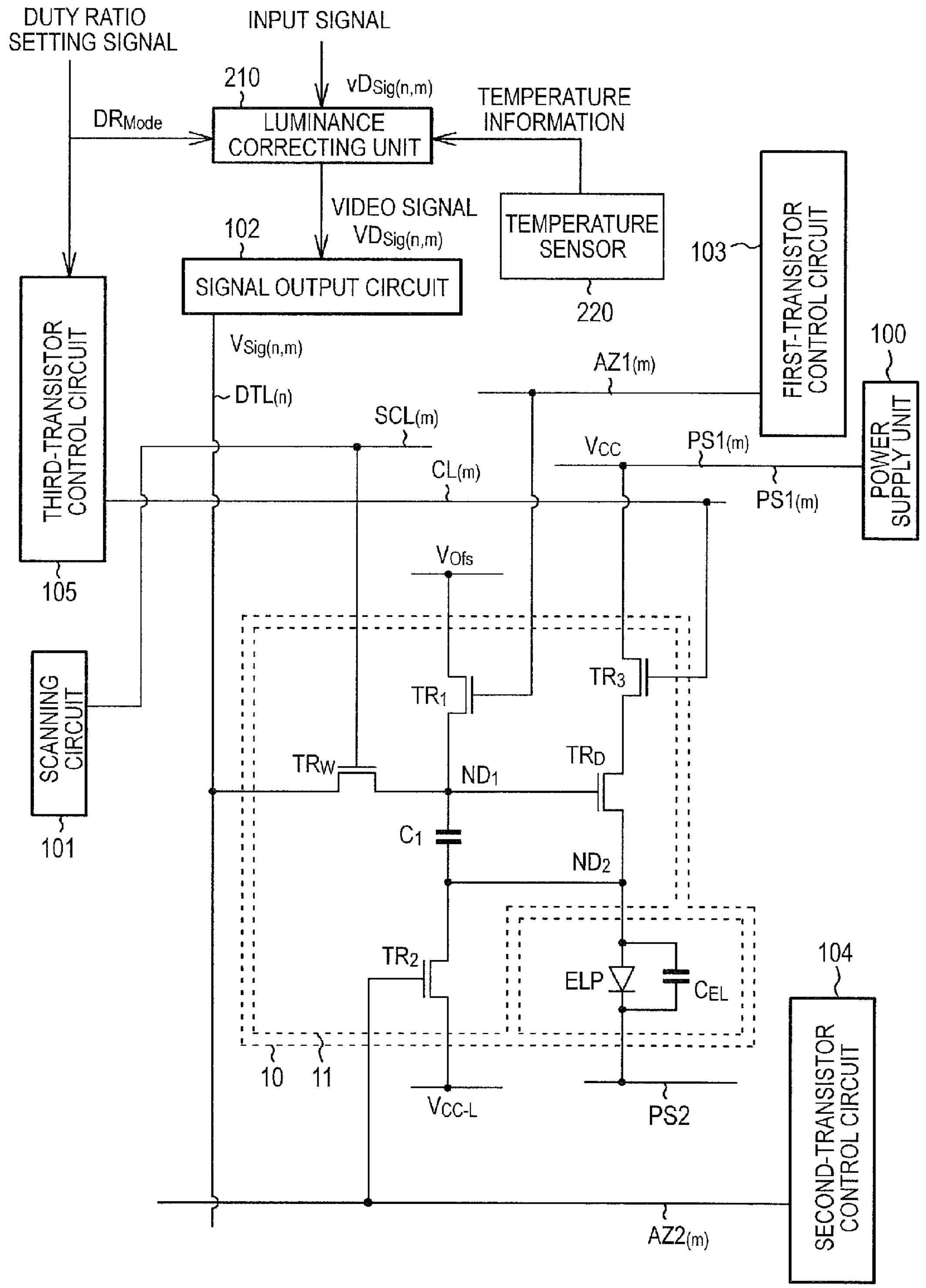
FIG. 40 is an equivalent circuit diagram of a display element including a driving circuit.
Figure 41A:
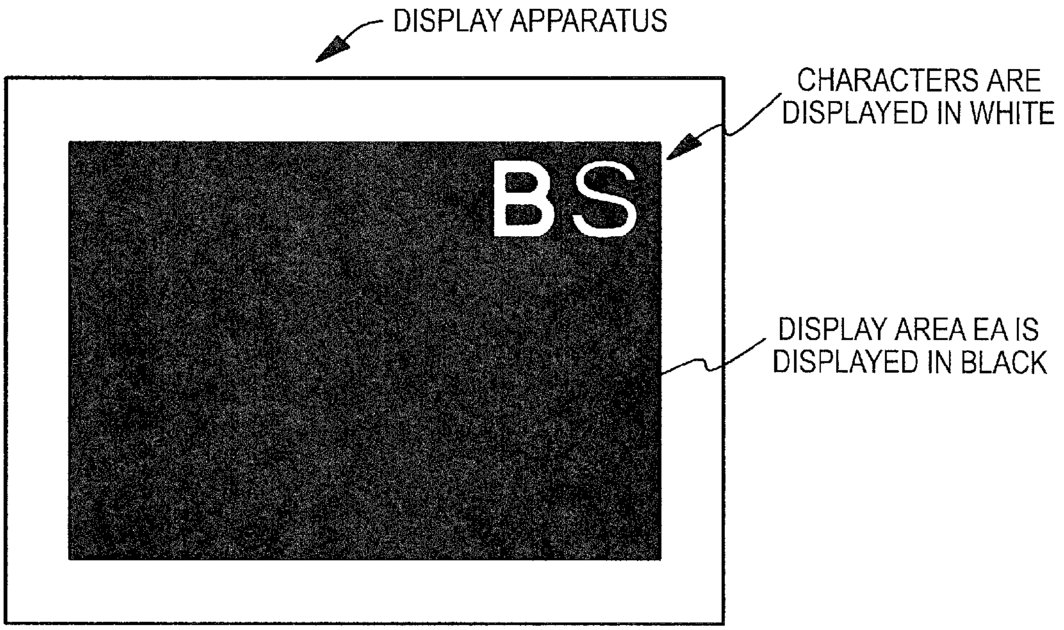
FIGS. 41A and 41B are schematic front views of a display area illustrating a burn-in phenomenon in a display apparatus.
Figure 41B:
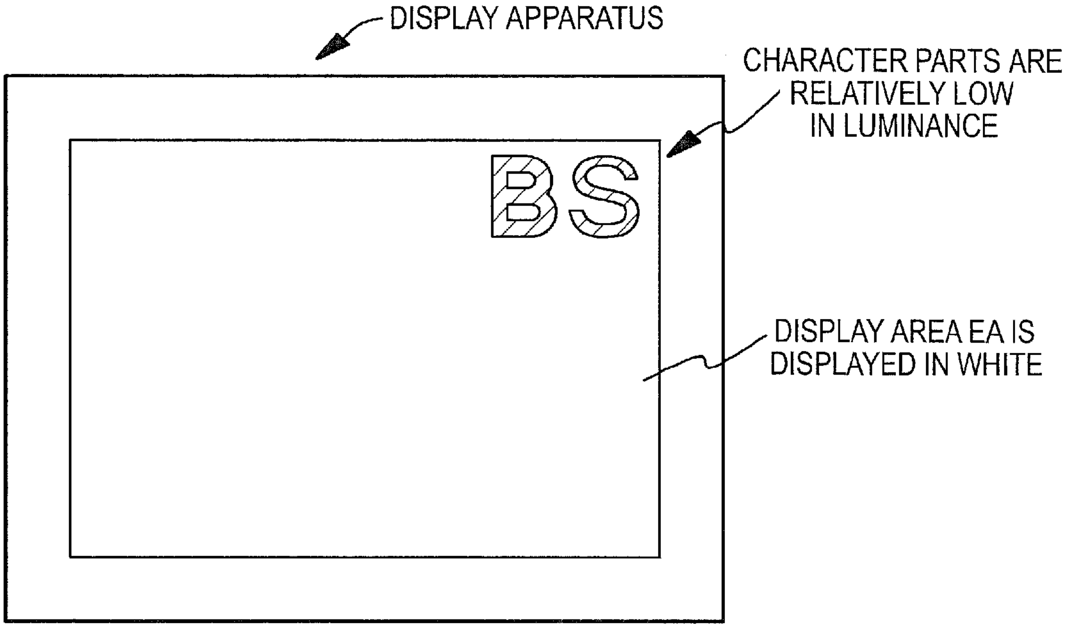

The driving circuit 11 further includes a writing transistor $TR_W$ in addition to the driving transistor $TR_D$. The driving transistor $TR_D$ and the writing transistor $TR_W$ are formed of an n-channel TFT. For example, the writing transistor $TR_W$ may be formed of a p-channel TFT. The driving circuit 11 may further include another transistor, for example, as shown in FIGS. 39 and 40.

The capacitor $C_1$ is used to maintain a voltage (a so-called gate-source voltage) of the gate electrode with respect to the source region of the driving transistor $TR_D$. In this case, the "source region" means a source/drain region serving as the "source region" when the light-emitting portion ELP emits light. When the display element 10 is in an emission state, one source/drain region (the region connected to the power supply line PS1 in FIG. 3) of the driving transistor $TR_D$ serves as a drain region and the other source/drain region (the region connected to an end of the light-emitting portion ELP, that is, the anode electrode) serves as a source region. One electrode and the other electrode of the capacitor $C_1$ are connected to the other source/drain region and the gate electrode of the driving transistor $TR_D$, respectively.

The writing transistor $TR_W$ includes a gate electrode connected to the scanning line SCL, one source/drain region connected to the data line DTL, and the other source/drain region connected to the gate electrode of the driving transistor $TR_D$.

The gate electrode of the driving transistor $TR_D$ constitutes a first node $ND_1$ in which the other source/drain region of the writing transistor $TR_W$ is connected to the other electrode of the capacitor $C_1$. The other source/drain region of the driving transistor $TR_D$ constitutes a second node $ND_2$ in which one electrode of the capacitor $C_1$ are connected to the anode electrode of the light-emitting portion ELP.

The other end (specifically, the cathode electrode) of the light-emitting portion ELP is connected to a second power supply line PS2. As shown in FIG. 1, a second power supply line PS2 is common to all the display elements 10.

A predetermined voltage $V_{cat}$ described later is supplied to the cathode electrode of the light-emitting portion ELP form the second power supply line PS2. The capacitance of the light-emitting portion ELP is represented by reference sign $C_{EL}$. The threshold voltage necessary for the emission of light of the light-emitting portion ELP is represented by $V_{th\text{-}EL}$. That is, when a voltage equal to or higher than $V_{th\text{-}EL}$ is applied across the anode electrode and the cathode electrode of the light-emitting portion ELP, the light-emitting portion ELP emits light.

The light-emitting portion ELP has, for example, a widely-known configuration or structure including an anode electrode, a hole transport layer, a light-emitting layer, an electron transport layer, and a cathode electrode.

The driving transistor $TR_D$ shown in FIG. 3 is set in voltage so as to operate in a saturated region when the display element 10 is in the emission state, and is driven so as to flow the drain current $I_{ds}$ as expressed by Expression 1. As described above, when the display element 10 is in the emission state, one source/drain region of the driving transistor $TR_D$ serves a drain region and the other source/drain region thereof serves as a source region. For purposes of ease of expanation, one source/drain region of the driving transistor $TR_D$ may be simply referred to as a drain region and the other source/drain region may be simply referred to as a source region. The reference signs are defined as follows.

μ: effective mobility

L: channel length

W: channel width $V_{gs}$ voltage of gate electrode with respect to source region $V_{th}$: threshold voltage $C_{ox}$: (specific dielectric constant of gate insulating layer)×(dielectric constant of vacuum)/(thickness of gate insulating layer)

$$k\equiv(1/2)\cdot(W/L)\cdot C_{ox}$$

$$I_{ds}=k\cdot\mu\cdot(V_{gs}-V_{th})^2 \qquad (1)$$

By causing the drain current $I_{ds}$ to flow in the light-emitting portion ELP, the light-emitting portion ELP of the display element 10 emits light. The light intensity (luminance) from the light-emitting portion ELP of the display element 10 is controlled depending on the magnitude of the drain current $I_{ds}$.

The ON/OFF state of the writing transistor $TR_W$ is controlled by the scanning signal from the scanning line SCL connected to the gate electrode of the writing transistor $TR_W$, that is, the scanning signal from the scanning circuit 101.

Various signals or voltages are applied to one source/drain region of the writing transistor $TR_W$ from the data line DTL on the basis of the operation of the signal output circuit 102. Specifically, a video signal voltage $V_{Sig}$ and a predetermined reference voltage $V_{ofs}$ are applied thereto from the signal output circuit 102. In addition to the video signal voltage $V_{Sig}$ and the reference voltage $V_{ofs}$, other voltages may be applied thereto.

The display apparatus 1 is line-sequentially scanned by rows by the scanning signals from the scanning circuit 101. In each horizontal scanning period, the reference voltage $V_{ofs}$ is first supplied to the data lines DTL and the video signal voltage $V_{Sig}$ is supplied thereto.

Figure 4:
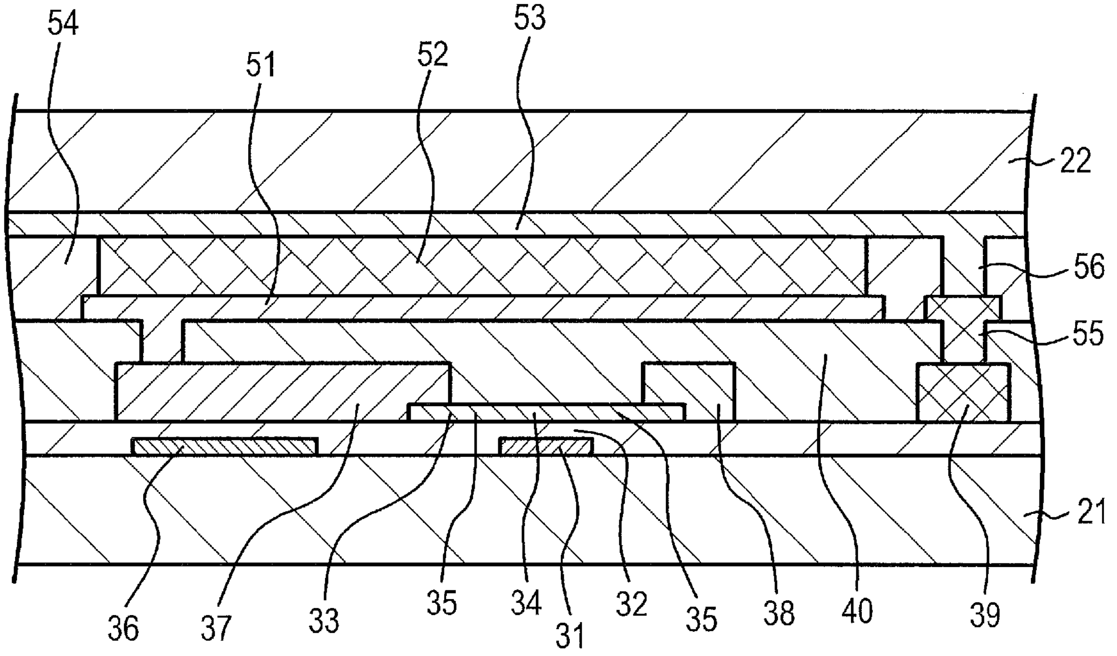
FIG. 4 is a partial sectional view schematically illustrating the display panel constituting the display apparatus.

FIG. 4 is a partial sectional view schematically illustrating a part of the display panel 20 of the display apparatus 1. The transistors $TR_D$ and $TR_W$ and the capacitor $C_1$ of the driving circuit 11 are formed on a base 21 and the light-emitting portion ELP is formed above the transistors $TR_D$ and $TR_W$ and the capacitor $C_1$ of the driving circuit 11, for example, with an interlayer insulating layer 40 interposed therebetween. The other source/drain region of the driving transistor $TR_D$ is connected to the anode electrode of the light-emitting portion ELP via a contact hole. In FIG. 4, only the driving transistor TRD is shown. The other transistors are not shown.

More specifically, the driving transistor $TR_D$ includes a gate electrode 31, a gate insulating layer 32, source/drain regions 35 and 35 formed in a semiconductor layer 33, and a channel formation region 34 corresponding to a part of the semiconductor layer 33 between the source/drain regions 35 and 35. On the other hand, the capacitor $C_1$ includes the other electrode 36, a dielectric layer formed of an extension of the gate insulating layer 32, and one electrode 37. The gate electrode 31, a part of the gate insulating layer 32, and the other electrode 36 of the capacitor $C_1$ are formed on the base 21. One source/drain region 35 of the driving transistor $TR_D$ is connected to a wire 38 (corresponding to the power supply line PS1) and the other source/drain region 35 is connected to one electrode 37. The driving transistor $TR_D$ and the capacitor $C_1$ are covered with an interlayer insulating layer and a light-emitting portion ELP including an anode electrode 51, a hole transport layer, a light-emitting layer, an electron transport layer, and a cathode electrode 53 is formed on the interlayer insulating layer 40. In the drawing, the hole transport layer, the light-emitting layer, and the electron transport layer are shown as a single layer 52. A second interlayer insulating layer 54 is formed on the interlayer insulating layer 40 not provided with the light-emitting portion ELP, a transparent substrate 22 is disposed on the second interlayer insulating layer 54 and the cathode electrode 53, and light emitted from the light-emitting layer is output to the outside via the substrate 22. One electrode 37 and the anode electrode 51 are connected to each other via a contact hole formed in the interlayer insulating layer 40. The cathode electrode 53 is connected to a wire 39 (corresponding to the second power supply line PS2) formed on the extension of the gate insulating layer 32 via contact holes 56 and 55 formed in the second interlayer insulating layer 54 and the interlayer insulating layer 40.

A method of manufacturing the display apparatus 1 including the display panel 20 shown in FIG. 4 will be described below. First, various wires such as the scanning lines SCL, the electrodes constituting the capacitor C1, the transistors formed of a semiconductor layer, the interlayer insulating layers, the contact holes, and the like are appropriately formed on the base 21 by the use of widely-known methods. A temperature-detecting transistor is also formed in the part surrounding the display area in which the display elements 10 are arranged through the use of the transistor forming process. By performing film forming and patterning processes by the use of widely-known methods, the light-emitting portions ELP arranged in a matrix are formed. The base 21 and the substrate 22 having been subjected to the above-mentioned processes are disposed to each other, the periphery thereof is sealed, and the inside is connected to external circuits, whereby a display apparatus 1 is obtained.

A method of driving the display apparatus 1 according to Example 1 (hereinafter, also simply abbreviated as a driving method according to Example 1) will be described below. The display frame rate of the display apparatus 1 is set to FR (/sec). The display elements 10 constituting N pixels arranged in the m-th row are simultaneously driven. In other words, in N display elements 10 arranged in the first direction, the emission/non-emission times thereof are controlled in the units of rows to which the display elements belong. The scanning period of each row when line-sequentially scanning the display apparatus 1 by rows, that is, one horizontal scanning period (so-called 1H), is less than (1/FR)×(1/M) sec.

In the following description, the values of voltages or potentials are as follows. However, these values are only examples and the voltages or potentials are not limited to these values.

$V_{Sig}$: video signal voltage, 0 volts (gradation value 0) to 10 volts (gradation value 511)

$V_{ofs}$: reference voltage to be applied to the gate electrode (first node $ND_1$) of a driving transistor $TR_D$, 0 volts $V_{CC-H}$: driving voltage causing a current to flow in a light-emitting portion ELP, 20 volts $V_{CC-L}$: initializing voltage for initializing a potential of the other source/drain region (second node $ND_2$) of a driving transistor $TR_D$, −10 volts $V_{th}$: threshold voltage of a driving transistor $TR_D$, 3 volts $V_{Cat}$ voltage applied to a cathode electrode of a light-emitting portion ELP, 0 volts $V_{th-EL}$: threshold voltage of a light-emitting portion ELP, 4 volts The operation of the (n, m)-th display element 10 will be described in detail later with reference FIGS. 32 to 38. First, the duty ratio of the emission period will be described.

Figure 32:
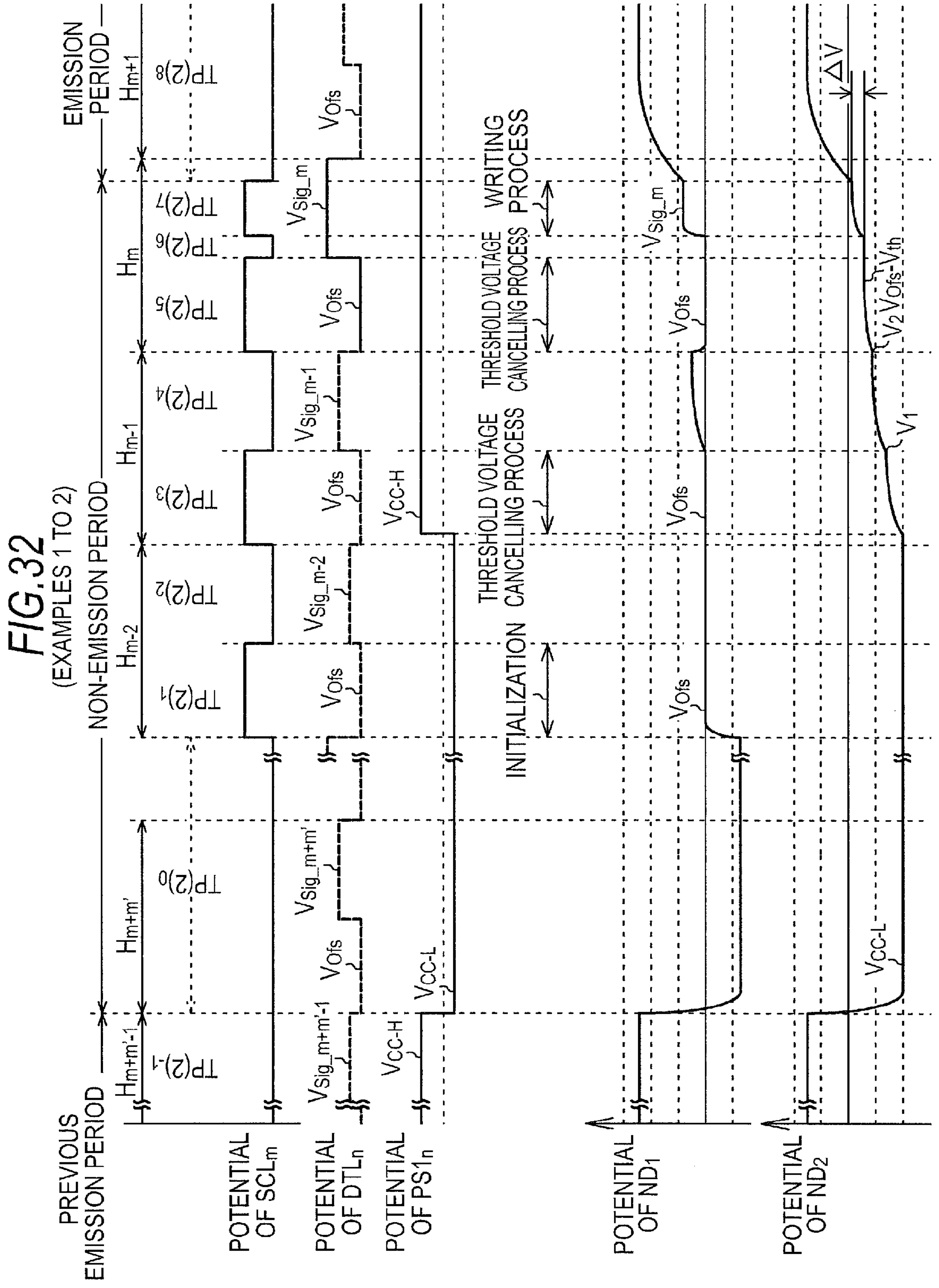
FIG. 32 is a timing diagram schematically illustrating the operation of a display element in a display apparatus driving method according to Example 1 or 2.

As described in the BACKGROUND and as shown in the timing diagram of FIG. 32, a threshold voltage cancelling process is performed in period $TP(2)_3$ and period $TP(2)_5$. Then, a writing process is performed in period $TP(2)_7$ and the drain current $I_{ds}$ flowing from the drain region to the source region of a driving transistor $TR_D$ flows in a light-emitting portion ELP in period $TP(2)_8$, whereby the light-emitting portion ELP emits light.

The emission of light of the light-emitting portion ELP is maintained to the end of period $TP(2)_8$ (the end of period $TP(2)_{-1}$ in the subsequent frame). Accordingly, period $TP(2)_8$ corresponds to the emission period of the display element 10. The end of period $TP(2)_8$ is determined depending on the time of changing the voltage of the power supply line PS1 from the driving voltage $V_{CC-H}$ to the initializing voltage $V_{CC-L}$.

Figure 5:
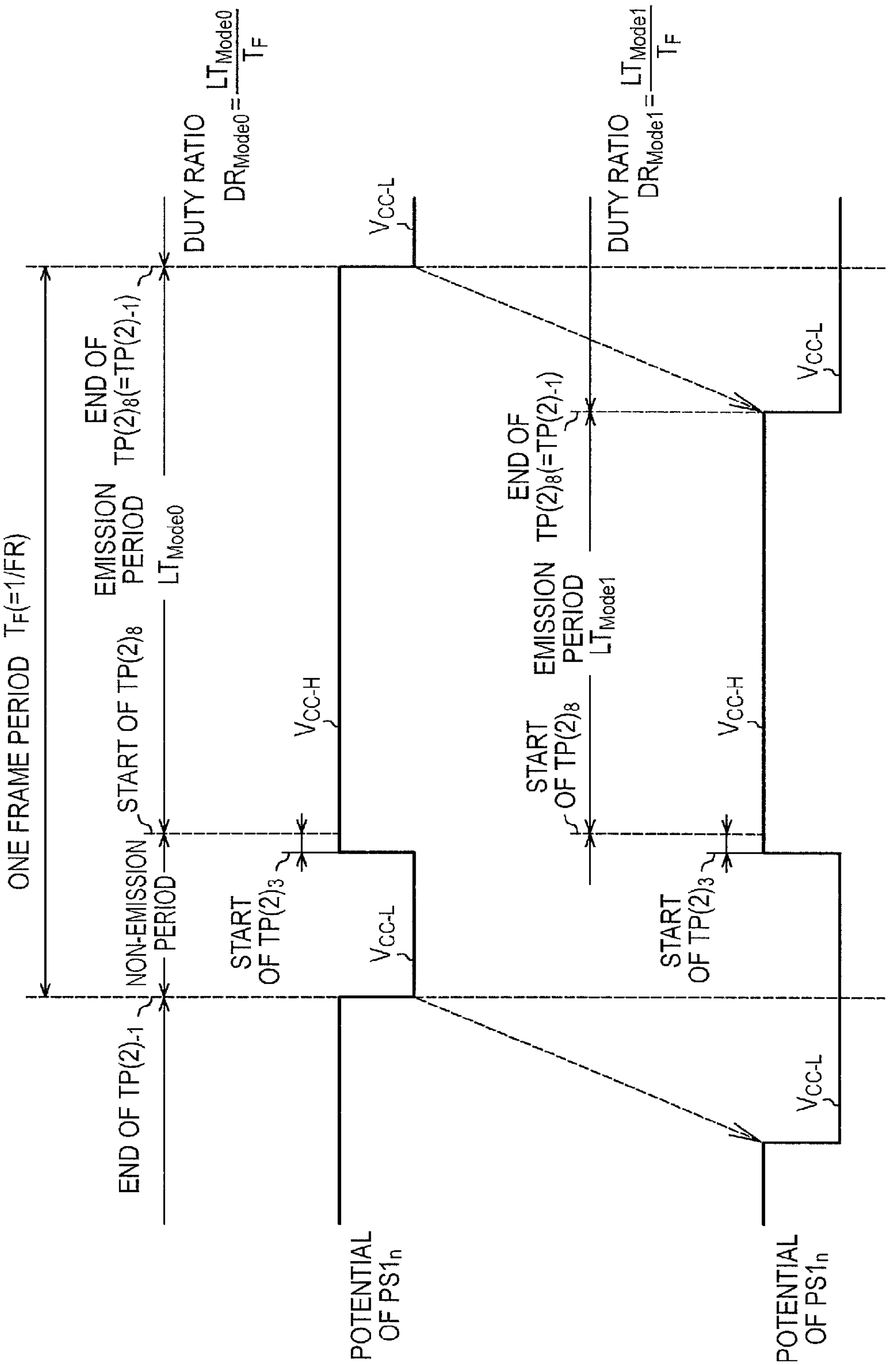
FIG. 5 is a timing diagram schematically illustrating the relationship between a voltage changing time of a power supply line shown in FIG. 1 and the duty ratio of an emission period of a display element.

FIG. 5 is a timing diagram schematically illustrating the relationship between the voltage changing time of the power supply line PS1 shown in FIG. 1 and the duty ratio of the emission period of the display element 10.

The power supply unit 100 shown in FIG. 1 changes the time of changing the voltage of the power supply line PS1 from the driving voltage $V_{CC-H}$ to the initializing voltage $V_{CC-L}$, that is, the end of the emission period (=period $TP(2)_8$), depending on the value of the duty ratio setting signal $dR_{Mode}$.

Since the display frame rate is FR (/sec), $T_F$=1/FR (sec) can be established, where $T_F$ represents the time occupied by a so-called one frame period, as shown in FIG. 5. It is assumed that the length of the emission period when the duty ratio setting signal $dR_{Mode}$ is the signal $dR_{Mode0}$ is represented by reference sign $LT_{Mode0}$, the duty ratio $DR_{Mode0}$ is calculated by $DR_{Mode0}=LT_{Mode0}/T_F$ (see the upside of the timing diagram shown in FIG. 5). Similarly, it is assumed that the length of the emission period when the duty ratio setting signal $dR_{Mode}$ is the signal $dR_{Mode1}$ is represented by reference sign $LT_{Mode1}$, the duty ratio $DR_{Mode1}$ is calculated by $DR_{Mode1}=LT_{Mode1}/T_F$ (see the downside of the timing diagram shown in FIG. 5). The case where the duty ratio setting signal $dR_{Mode}$ is the signals $dR_{Mode2}$ and $dR_{Mode3}$ is not shown in FIG. 5, but the above-mentioned expressions can be appropriately changed and thus description thereof will not be repeated.

As can be clearly seen from the timing diagram of FIG. 5, as the duty ratio $DR_{Mode}$ increases, the period in which the display element 10 emits light in one frame period is elongated and the screen becomes brighter as a whole. Conversely, as the duty ratio $DR_{Mode}$ decreases, the period in which the display element 10 emits light in one frame period is shortened and thus the screen becomes darker as a whole. Accordingly, by reducing the duty ratio of the emission period, it is possible to display an image suitable for observation in a low-illuminance environment.

The duty ratio of the emission period has been described hitherto. The principle of the temporal variation in luminance of a display element 10 and a method of compensating for the temporal variation in luminance will be described below.

In period $TP(2)_8$, the drain current $I_{ds}$ flowing in the light-emitting portion ELP of the (n, m)-th display element can be expressed by Expression 5. The derivation of Expression 5 will be described later in detail with reference to FIGS. 32 to 38.

$$I_{ds}=k\cdot\mu\cdot(V_{Sig\_m}-V_{Ofs}-\Delta V)^2 \quad (5)$$

In Expression 5, "$V_{Sig\_m}$" represents the video signal voltage $V_{Sig(n, m)}$ of the (n, m)-th display element 10 and "ΔV" represents a potential increment ΔV (potential correction value) of the second node $ND_2$. The potential correction value ΔV will be described in detail later with reference to FIG. 37B.

For purposes of ease of expanation, it is assumed that the value of "ΔV" is sufficiently smaller than $V_{Sig\_m}$. As described above, since $V_{Ofs}$ is 0 volts, Expression 5 can be modified to Expression 5'.

$$I_{ds}=k\cdot\mu\cdot V_{Sig\_m}^2 \quad (5')$$

As can be seen from Expression 5', the drain current $I_{ds}$ is proportional to the square of the value of the video signal voltage $V_{Sig(n, m)}$. The display element 10 emits light with the luminance corresponding to the product of the emission efficiency of the light-emitting portion ELP and the value of the drain current $I_{ds}$ flowing in the light-emitting portion ELP. Accordingly, the value of the video signal voltage $V_{Sig}$ is basically set to be proportional to the square root of the gradation value of the video signal $VD_{Sig}$.

Figure 6A:
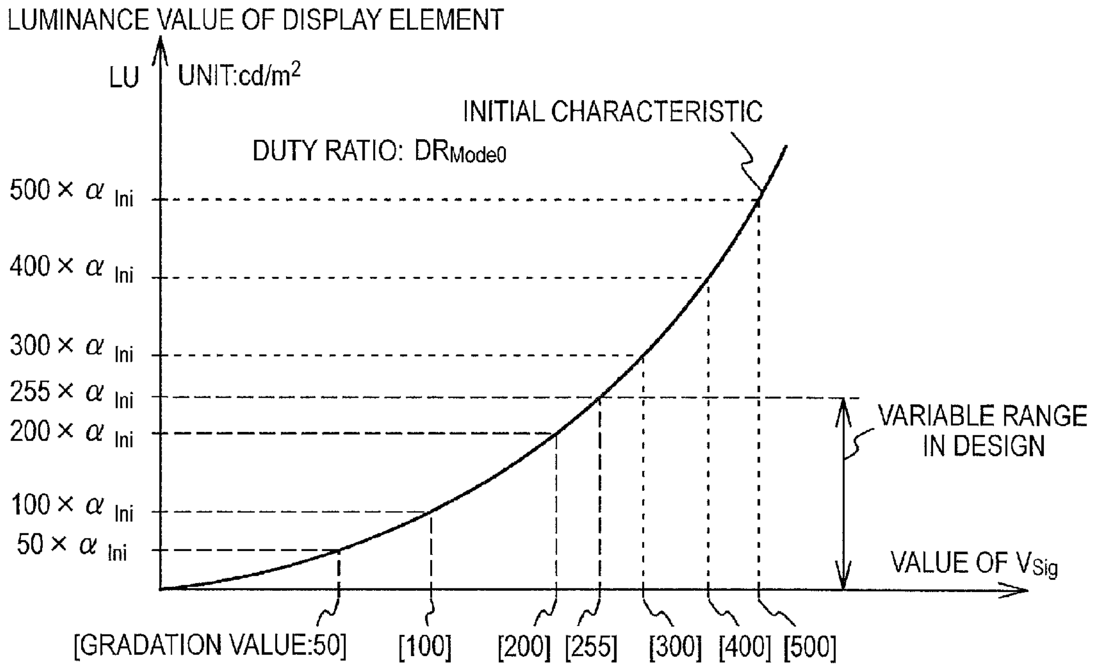
FIG. 6A is a graph illustrating the relationship between the value of a video signal voltage in a display element in an initial state and the luminance value of the display element in a state where the duty ratio of the emission period of the display element has a value $DR_{Mode0}$.

FIG. 6A is a graph illustrating the relationship between the value of the video signal voltage $V_{Sig}$ in the display element 10 in the initial state and the luminance value LU of the display element 10 in the state where the duty ratio of the emission period of the display element 10 is set to the value $DR_{Mode0}$.

In FIG. 6A, the horizontal axis represents the value of the video signal voltage $V_{Sig}$. In the horizontal axis, the gradation values of the corresponding video signals $VD_{Sig}$ are described within [ ]. The same is true of FIG. 6B to be described later. In the other drawings, the numerical value described within [ ] represents a gradation value.

When the coefficient determined depending on the emission efficiency in the initial state of the light-emitting portion ELP is defined as $\alpha_{Ini}$ along with the coefficients "k" and "μ", the luminance LU can be expressed by an expression such as $LU=(VD_{Sig}-\Delta D)\times\alpha_{Ini}$. Here, "ΔD" represents a so-called black gradation and is determined depending on the specification or design of the display apparatus 1. When $VD_{Sig}<\Delta D$, the value of LU in the expression is negative (−) but the LU in this case is considered as "0".

For purposes of ease of expanation, it is assumed that the value of ΔD is 0. In this case, an expression $LU=VD_{Sig}\times\alpha_{Ini}$, is established. For example, when $\alpha_{Ini}=1.2$ is assumed and an image is displayed on the basis of the video signal $VD_{Sig}$ of a gradation value 500 in the display apparatus 1 in the initial state, the luminance of the image is substantially 600 cd/$m^2$. In Example 1, the maximum luminance value in the specification of the display apparatus 1 is $255\times\alpha_{Ini}$.

Figure 6B:
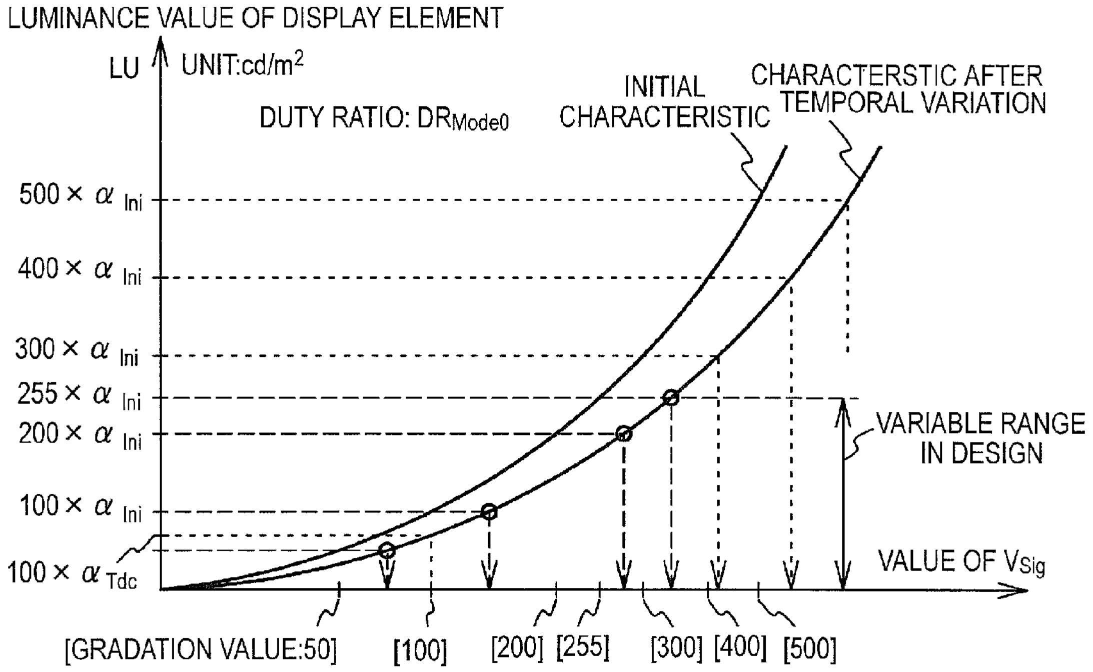
FIG. 6B is a graph illustrating the relationship between the value of a video signal voltage in a display element in which a temporal variation occurs and the luminance value of the display element in the state where the duty ratio of the emission period of the display element has a value $DR_{Mode0}$.

FIG. 6B is a graph illustrating the relationship between the value of the video signal voltage $V_{Sig}$ in a display element 10 in which the temporal variation occurs and the luminance value of the display element 10 in the state where the duty ratio of the emission period of the display element 10 is set to the value $DR_{Mode0}$.

The display element 10 in which the temporal variation occurs is lower in luminance than that in the initial state. Specifically, as shown in FIG. 6B, the characteristic curve after the temporal variation is slower than the initial characteristic curve. As the temporal variation proceeds, the characteristic curve becomes slower.

When the coefficient determined depending on the emission efficiency after the temporal variation in the light-emitting portion ELP is defined as $\alpha_{Tdc}$ along with the coefficients "k" and "μ", the luminance LU can be expressed by an expression such as $LU=VD_{Sig}\times\alpha_{Tdc}$. Here, $\alpha_{Tdc}<\alpha_{Ini}$ is valid. In order to compensate for the temporal variation in luminance of the display element 10, the display element 10 has only to operate by multiplying the gradation value of the video signal $VD_{Sig}$ by $\alpha_{Ini}/\alpha_{Tdc}$.

Hitherto, the principle of the method of compensating for the temporal variation in luminance of a display element 10 has been described. The temporal variation in luminance of a display element 10 depends on the history of the duty ratio of the emission period of the display elements 10, in addition to the histories of the luminance of an image displayed by the display apparatus 1 and the operating time. The temporal variation in luminance of a display element 10 varies depending on the display elements 10. Therefore, to compensate for the burn-in phenomenon of the display apparatus 1, it is necessary to control the gradation value of the video signal $VD_{Sig}$ for each display element 10.

The compensation of the burn-in phenomenon in the display apparatus 1 will be schematically described with reference to FIG. 2. The correction value of the gradation value corresponding to each display element 10 is calculated with reference to the reference curve storage 117 on the basis of the data stored in the accumulated reference operating time storage 115. The gradation value of the input signal $vD_{Sig}$ is corrected on the basis of the correction value of the gradation value and the corrected input signal is output as a video signal $VD_{Sig}$.

Here, The accumulated reference operating time storage 115 stores the value obtained by accumulating the value of the reference operating time value calculated by the reference operating time calculator 112. The reference operating time calculator 112 calculates the value of the reference operating time by referring to the value stored in the operating time conversion factor storage 113 to correspond to the gradation value of the video signal $VD_{Sig}$ and the value stored in the duty ratio acceleration factor storage 114 to correspond to the duty ratio $DR_{Mode}$ of the emission period during operation and multiplying the value of the unit time by the stored values.

The compensation of the burn-in in the display apparatus 1 will be described below in detail.

First, the method of calculating the reference operating time when the duty ratio of the emission period is constant (for purposes of ease of expanation, which is assumed as the reference duty ratio $DR_{Mode0}$) will be described with reference to FIGS. 7 to 12. The method of calculating the reference operating time when the duty ratio is changed to various values will be then described with reference to FIGS. 13 to 16. Thereafter, the driving method of compensating for the burn-in in the display apparatus 1 will be described with reference to FIG. 2 and FIGS. 17 to 22.

Figure 7:
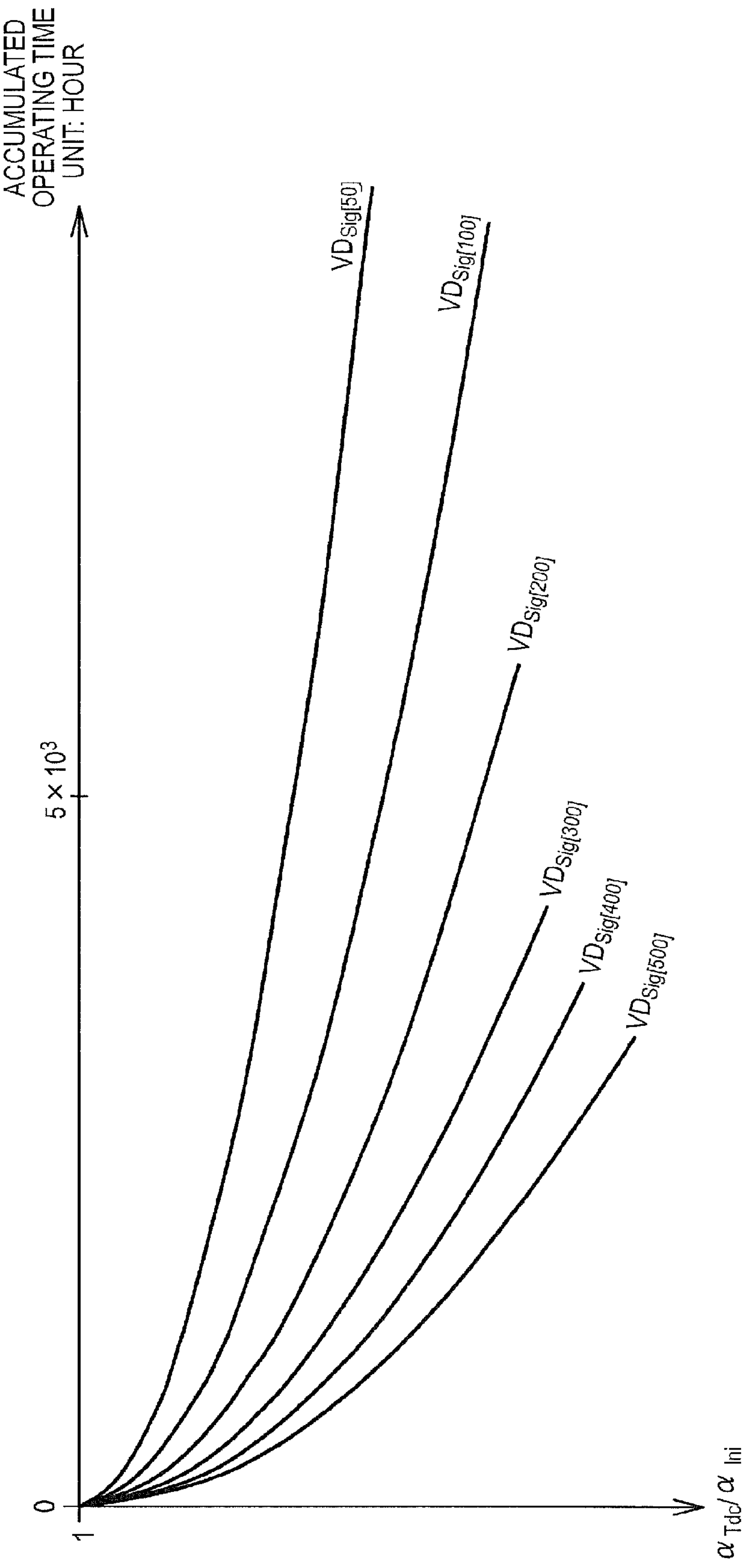
FIG. 7 is a graph schematically illustrating the relationship between an accumulated operating time when a display element is made to operate on the basis of video signals of various gradation values and the relative luminance variation of the display element due to the temporal variation in a state where the temperature condition of the display panel has a certain value t1 and the duty ratio of the emission period of the display element has a value $DR_{Mode0}$.

FIG. 7 is a graph schematically illustrating the relationship between the accumulated operating time when a display element 10 is made to operate on the basis of the video signals $VD_{Sig}$ of various gradation values and the relative variation in luminance of the display element 10 due to the temporal variation in a state where the temperature condition of the display panel 20 has a certain value t1 (for example, 40° C.) and the duty ratio of the emission period of the display panel 10 is set to the value $DR_{Mode0}$.

The graph shown in FIG. 7 will be described in detail. By the use of the display apparatus 1 in the initial state, first to sixth areas included in the display area are made to operate on the basis of the video signals $VD_{Sig}$ of gradation values 50, 100, 200, 300, 400, and 500, and the length of the accumulated operating time and the ratios of the luminance after the temporal variation to the luminance in the initial state of the display elements 10 constituting the first to sixth regions are measured. The length of the accumulated operating time is plot as the value of the horizontal axis and the ratios of the luminance after the temporal variation to the luminance in the initial state of the display elements 10 divided into the first to sixth regions are plotted as the value of the vertical axis. Since it is necessary to maintain the gradation value of the video signal $VD_{Sig}$ at the above-mentioned gradation values, the luminance correcting unit 110 shown in FIG. 1 is not made to operate, the video signals $VD_{Sig}$ of the gradation values are generated by a particular circuit and are supplied to the signal output circuit 102, and then the measurement is performed.

The value of the vertical axis in the graph shown in FIG. 7 corresponds to the ratio of the coefficient $\alpha_{Tdc}$ and the coefficient $\alpha_{Ini}$. As can be clearly seen from the graph, the relative variation in luminance to the luminance in the initial state increases as the gradation value of the video signal $VD_{Sig}$ increases. Similarly, the relative variation in luminance to the luminance in the initial state increases as the accumulated operating time increases.

Therefore, the luminance variation in a display element 10 depends on the gradation value of the video signal $VD_{Sig}$ when the display element 10 operates and the length of the operating time. The temporal variation when the display element 10 is made to operate while changing the gradation value of the video signal $VD_{Sig}$ will be described below with reference to FIG. 8.

Figure 8:
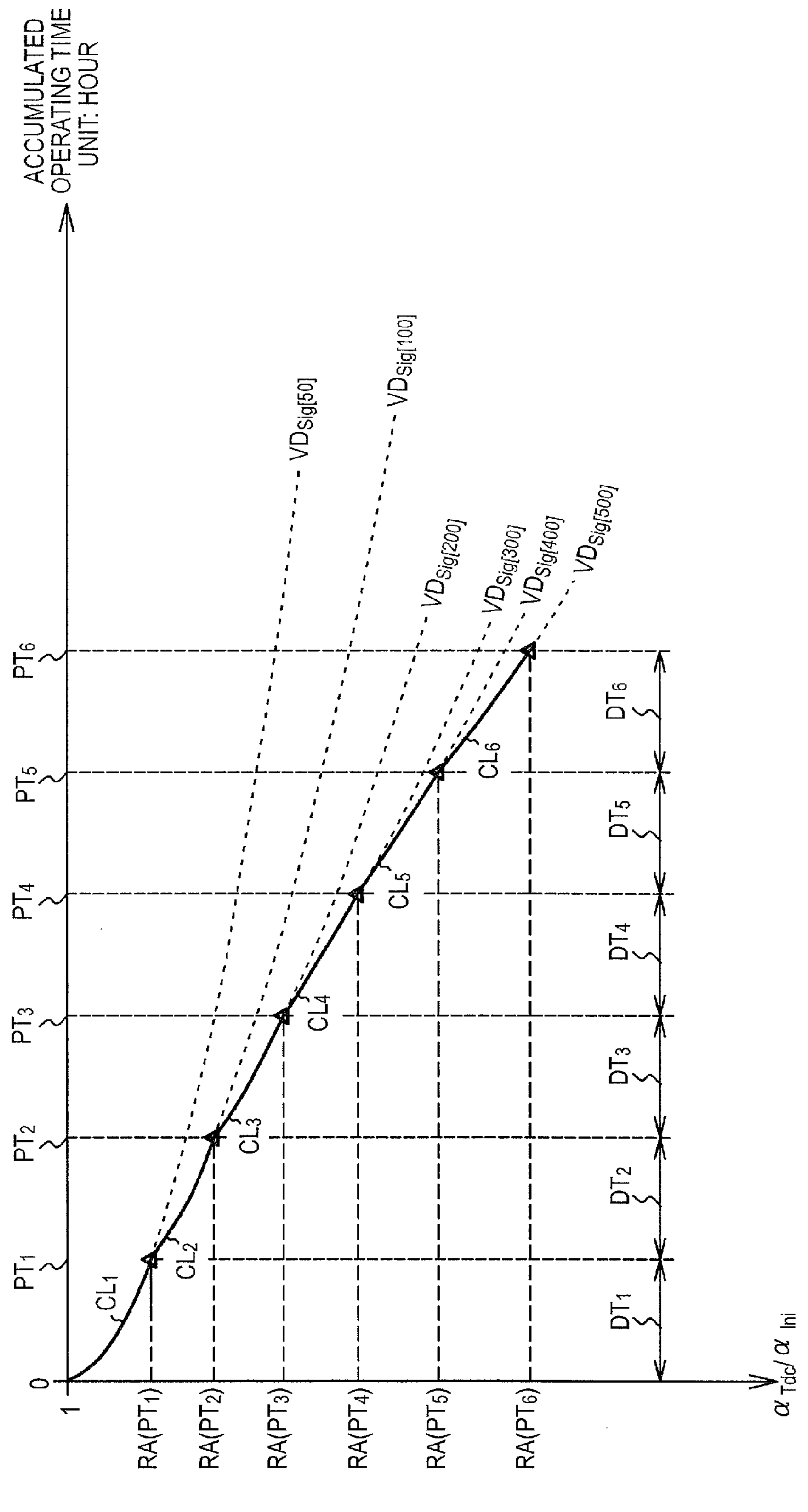
FIG. 8 is a graph schematically illustrating the relationship between an operating time when a display element is made to operate while changing a gradation value of a video signal and the relative luminance variation of the display element due to the temporal variation in a state where the temperature condition of the display panel has a certain value t1 and the duty ratio of the emission period of the display element has a value $DR_{Mode0}$.

FIG. 8 is a graph schematically illustrating the relationship between the operating time and the relative luminance variation of the display element 10 due to the temporal variation when the display element 10 is made to operate while changing the gradation value of the video signal $VD_{Sig}$ in the state where the temperature condition of the display panel 20 has a value t1 and the duty ratio of the emission period of the display element 10 is set to the value $DR_{Mode0}$.

Specifically, the graph shown in FIG. 8 is a graph in which the length of the accumulated operating time is plotted as the value of the horizontal axis and the ratio of the luminance after the temporal variation to the luminance in the initial state of the display element 10 is plotted as the value of the vertical axis on the basis of data when the display element 10 is made to operate on the basis of the video signals $VD_{Sig}$ of the gradation value 50 for the operating time $DT_1$, the gradation value 100 for the operating time $DT_2$, the gradation value 200 for the operating time $DT_2$, the gradation value 300 for the operating time $DT_4$, the gradation value 400 for the operating time $DT_5$, and the gradation value 500 for the operating time $DT_6$ by the use of the display apparatus 1 in the initial state. As described with reference to FIG. 7, the luminance correcting unit 110 shown in FIG. 1 is not made to operate, the video signals $VD_{Sig}$ of the gradation values are generated by a particular circuit and are supplied to the signal output circuit 102, and then the measurement is performed.

In FIG. 8, reference signs $PT_1$, $PT_2$, $PT_2$, $PT_4$, $PT_5$, and $PT_6$ represent the value of the accumulated operating time at that time. Time $PT_6$ is the total sum of the lengths of the operating time $DT_1$ to the operating time $DT_6$.

In FIG. 8, the values of the vertical axis corresponding to $PT_1$, $PT_2$, $PT_3$, $PT_4$, $PT_5$, and $PT_6$ are represented by $RA(PT_1)$, $RA(PT_2)$, $RA(PT_3)$, $RA(PT_4)$, $RA(PT_5)$, and $RA(PT_6)$, respectively. In the graph shown in FIG. 8, the part from time 0 to time $PT_1$, the part from time $PT_1$ to time $PT_2$, the part from $PT_2$ to time $PT_2$, the part from $PT_3$ to time $PT_4$, the part from $PT_4$ to time $PT_5$, and the part from $PT_5$ to time $PT_6$ are represented by reference signs $CL_1$, $CL_2$, $CL_3$, $CL_4$, $CL_5$, and $CL_6$, respectively. The graph shown in FIG. 8 can be said to be obtained by appropriately connecting the parts of the graph shown in FIG. 7.

Figure 9:
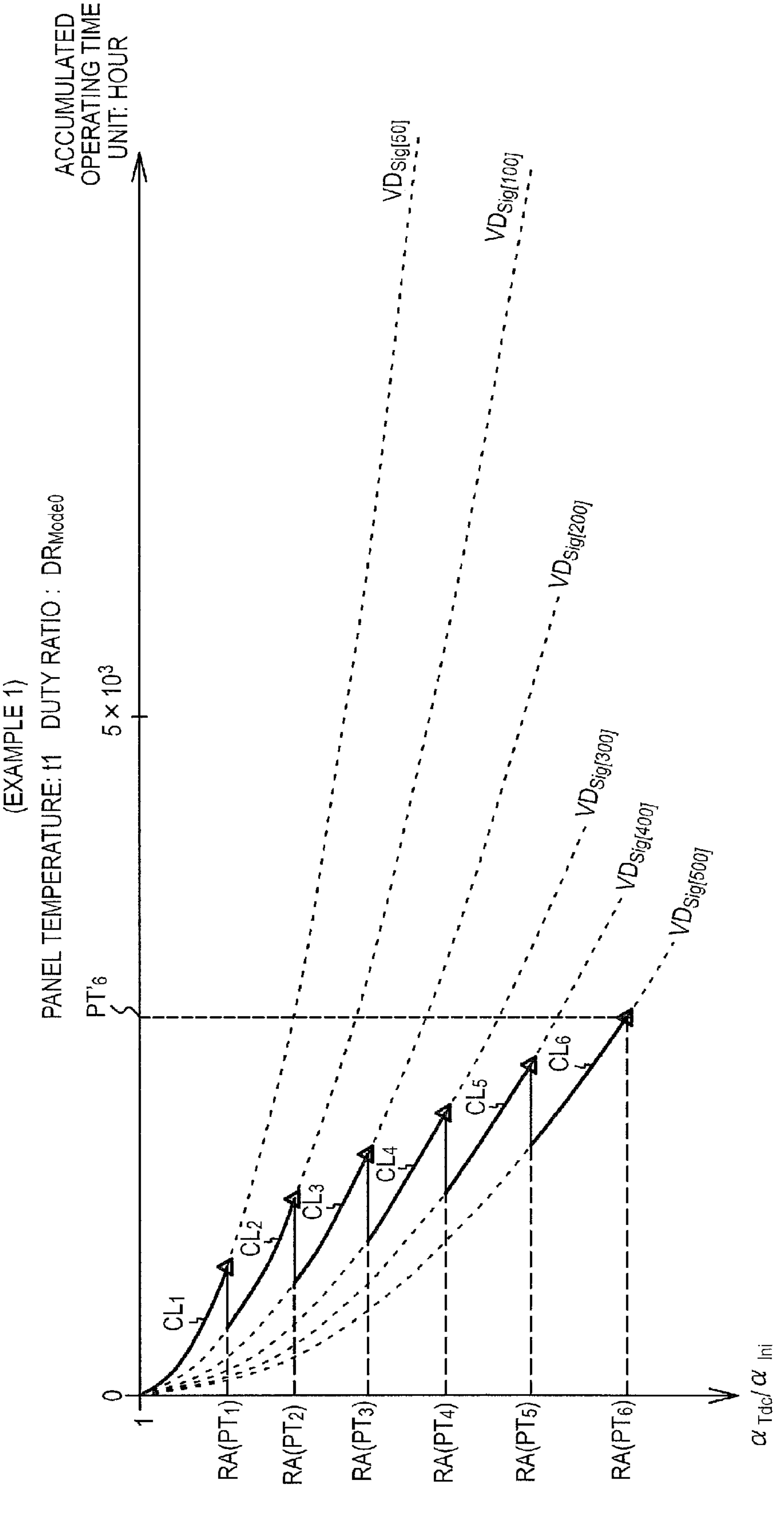
FIG. 9 is a diagram schematically illustrating the correspondence between graph parts indicated by reference signs $CL_1$, $CL_2$, $CL_3$, $CL_4$, $CL_5$, and $CL_6$ in FIG. 8 and the graph shown in FIG. 7.

FIG. 9 is a diagram schematically illustrating the correspondence between the graph parts represented by the reference signs $CL_1$, $CL_2$, $CL_3$, $CL_4$, $CL_5$, and $CL_6$ in FIG. 8 and the graph shown in FIG. 7.

As shown in FIG. 9, the graph part represented by reference sign $CL_1$ in FIG. 8 corresponds to the part when the value of the vertical axis becomes from the range of 1 to $RA(PT_1)$ in the graph of the gradation value 50 in FIG. 7. The graph part represented by reference sign $CL_2$ corresponds to the part when the vertical axis in the range of $RA(PT_1)$ to $RA(PT_2)$ in the graph of the gradation value 100 in FIG. 7. The graph part represented by reference sign $CL_3$ corresponds to the part when the value of the vertical axis becomes from the range of $RA(PT_2)$ to $RA(PT_3)$ in the graph of the gradation value 200 in FIG. 7.

Similarly, the graph part represented by reference sign $CL_4$ in FIG. 8 corresponds to the part when the value of the vertical axis becomes from the range of $RA(PT_3)$ to $RA(PT_4)$ in the graph of the gradation value 300 in FIG. 7. The graph part represented by reference sign $CL_5$ corresponds to the part when the value of the vertical axis becomes from the range of $RA(PT_4)$ to $RA(PT_5)$ in the graph of the gradation value 400 in FIG. 7. The graph part represented by reference sign $CL_6$ corresponds to the part when the value of the vertical axis becomes from the range of $RA(PT_5)$ to $RA(PT_6)$ in the graph of the gradation value 500 in FIG. 7.

On the other hand, the temporal variation in luminance of the display element 10 at time $PT_6$ shown in FIG. 8 corresponds to the temporal variation in luminance of the display element 10 when it is assumed that the display element 10 is made to operate on the basis of the video signal $VD_{Sig}$ of the gradation value 500 from time 0 to time $PT_6'$. Time $PT_6'$ represents the accumulated reference operating time when the value of the vertical axis is $RA(PT_6)$ in the graph of the gradation value 500 shown in FIG. 7.

Therefore, when the value of time $PT_6'$ (the accumulated reference operating time) can be calculated on the basis of the operation history shown in FIG. 8, the temporal variation in luminance of the display element 10 at time $PT_6$ shown in FIG. 8 can be calculated on the basis of the value of time $PT_6'$ and the curve of the gradation 500 shown in FIG. 7.

The accumulated reference operating time $PT_6'$ can be calculated on the basis of the lengths of the operating times $DT_1$ to $DT_6$ shown in FIG. 8 and a predetermined coefficient (the operating time conversion factor) in which the gradation value of the video signal $VD_{Sig}$ is reflected. The operating time conversion coefficient will be described below with reference to FIGS. 10 to 12.

Figure 10:
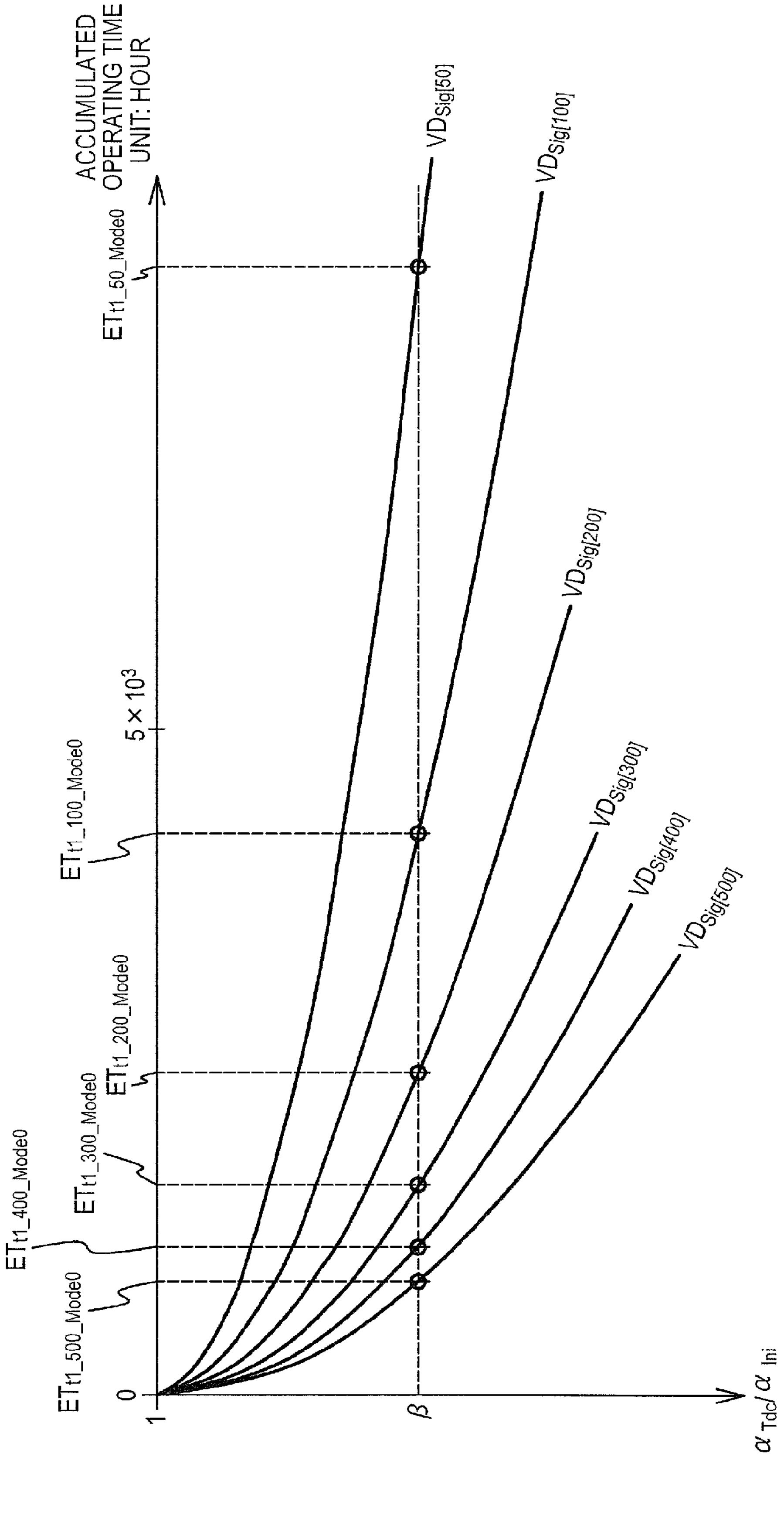
FIG. 10 is a graph schematically illustrating the relationship between an accumulated operating time until the relative luminance variation of a display element due to the temporal variation reaches a certain value "β" by causing a display element to operate on the basis of a video signal and the gradation value of the video signal in a state where the temperature condition of the display panel has a certain value t1 and the duty ratio of the emission period of the display element has a value $DR_{Mode0}$.

FIG. 10 is a graph schematically illustrating the relationship between the accumulated operating time until the relative luminance variation of the display element 10 due to the temporal variation reaches a certain value "β" by causing the display element 10 to operate on the basis of the video signal $VD_{Sig}$ in the state where the temperature condition of the display panel 20 has a value t1 and in the state where the duty ratio of the emission period of the display element 10 is set to the value $DR_{Mode0}$ and the gradation value of the video signal $VD_{Sig}$. The graphs corresponding to the gradation values are the same as the graphs shown in FIG. 7. In addition, $1>\beta>0$ is satisfied.

In FIG. 10, reference sign $ET_{t1\_500\_Mode0}$ represents the accumulated operating time when the value of the vertical axis is "β" at the gradation value 500 and reference sign $ET_{t1\_400\_Mode0}$ represents the accumulated operating time when the value of the vertical axis is "β" at the gradation value 400. The same is true of reference signs $ET_{t1\_300\_Mode0}$, $ET_{t2\_200\_Mode0}$, $ET_{t1\_100\_Mode0}$, and $ET_{t1\_50\_Mode0}$.

The mutual ratio of the accumulated operating times $ET_{t1\_500\_Mode0}$, $ET_{t1\_400\_Mode0}$, $ET_{t1\_300\_Mode0}$, $ET_{t1\_200\_Mode0}$, $ET_{t1\_100\_Mode0}$, $ET_{t1\_50\_Mode0}$ is substantially constant regardless of the value of "β". Conversely, it is considered that the display element 10 varies with ages so as to satisfy such a condition.

Figure 11:
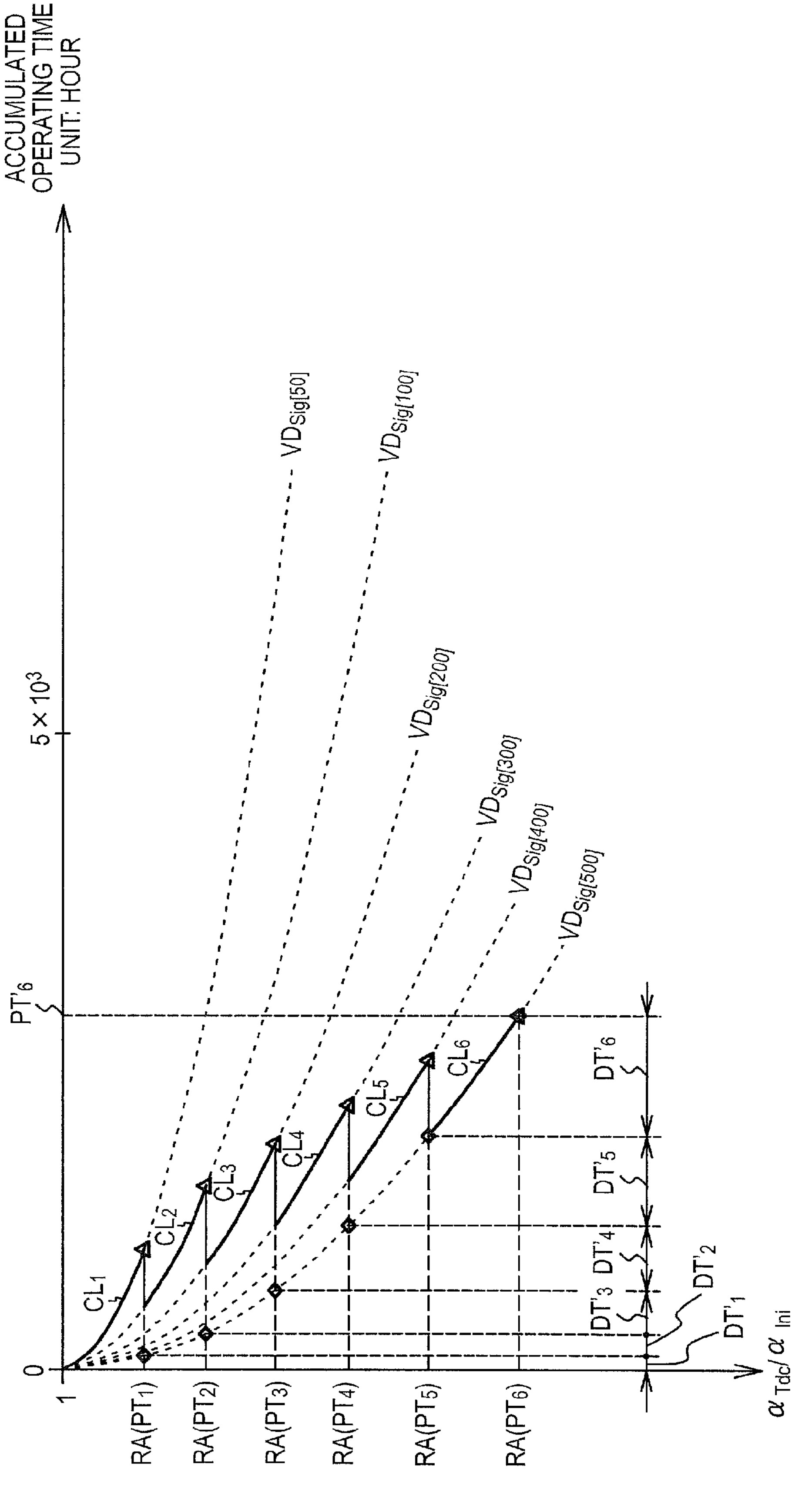
FIG. 11 is a graph schematically illustrating a method of converting the operating time when a display element is made to operate on the basis of the operation history shown in FIG. 8 into a reference operating time when it is assumed that the display element is made to operate on the basis of a video signal of a predetermined reference gradation value.

FIG. 11 is a graph schematically illustrating the method of converting the operating time when a display element 10 is made to operate on the basis of the operation history shown in FIG. 8 into the reference operating time when it is assumed that the display element is made to operate on the basis of the video signal $VD_{Sig}$ of a predetermined reference gradation value, that is, the gradation value 500.

The reference operating times $DT_1'$, $DT_2'$, $DT_3'$, $DT_4'$, $DT_5'$, and $DT_6'$ shown in FIG. 11 correspond to the values into which the operating times $DT_1$, $DT_2$, $DT_3$, $DT_4$, $DT_5$, and $DT_6$ shown in FIG. 8 are converted.

For example, the reference operating time $DT_1'$ can be calculated by $DT_1'=DT_1\cdot(ET_{t1\_500\_Mode0}/ET_{t1\_50\_Mode0})$. $(ET_{t1\_500\_Mode0}/ET_{t1\_50\_Mode0})$ corresponds to the operating time conversion factor at the gradation value 50.

Similarly, the reference operating time $DT_2'$ can be calculated by $DT_2'=DT_2\cdot(ET_{t1\_500\_Mode0}/ET_{t1\_100\_Mode0})$.

$(ET_{t1\_500\_Mode0}/ET_{t1\_100\_Mode0})$ corresponds to the operating time conversion factor at the gradation value 100.

The reference operating times $DT_3'$, $DT_4'$, $DT_5'$, and $DT_6'$ can be calculated in the same way as described above.

That is, the reference operating times $DT_3'$, $DT_4'$ $DT_5'$, and $DT_6'$ can be calculated by $DT_3\cdot(ET_{t1\_500\_Mode0}/ET_{t1\_200\_Mode0})$, $DT_4\cdot(ET_{t1\_500\_Mode0}/ET_{t1\_300\_Mode0})$, $DT_5\cdot(ET_{t1\_500\_Mode0}/ET_{t1\_400\_Mode0})$, and $DT_6\cdot(ET_{t1\_500\_Mode0}/ET_{t1\_500\_Mode0})$ respectively. The operating time conversion factors at the gradation values 200, 300, 400, and 500 are given as $(ET_{t1\_500\_Mode0}/ET_{t1\_200\_Mode0})$, $(ET_{t1\_500\_Mode0}/ET_{t1\_300\_Mode0}$, and $(ET_{t1\_500\_Mode0}/ET_{t1\_400\_Mode0})$, $(ET_{t1\_500\_Mode0}/ET_{t1\_500\_Mode0})$. The accumulated reference operating time $PT_6'$ can be calculated as the total sum of the reference operating times $DT_1'$, $DT_2'$, $DT_3'$, $DT_4'$, $DT_5'$, and $DT_6'$.

Figure 12:
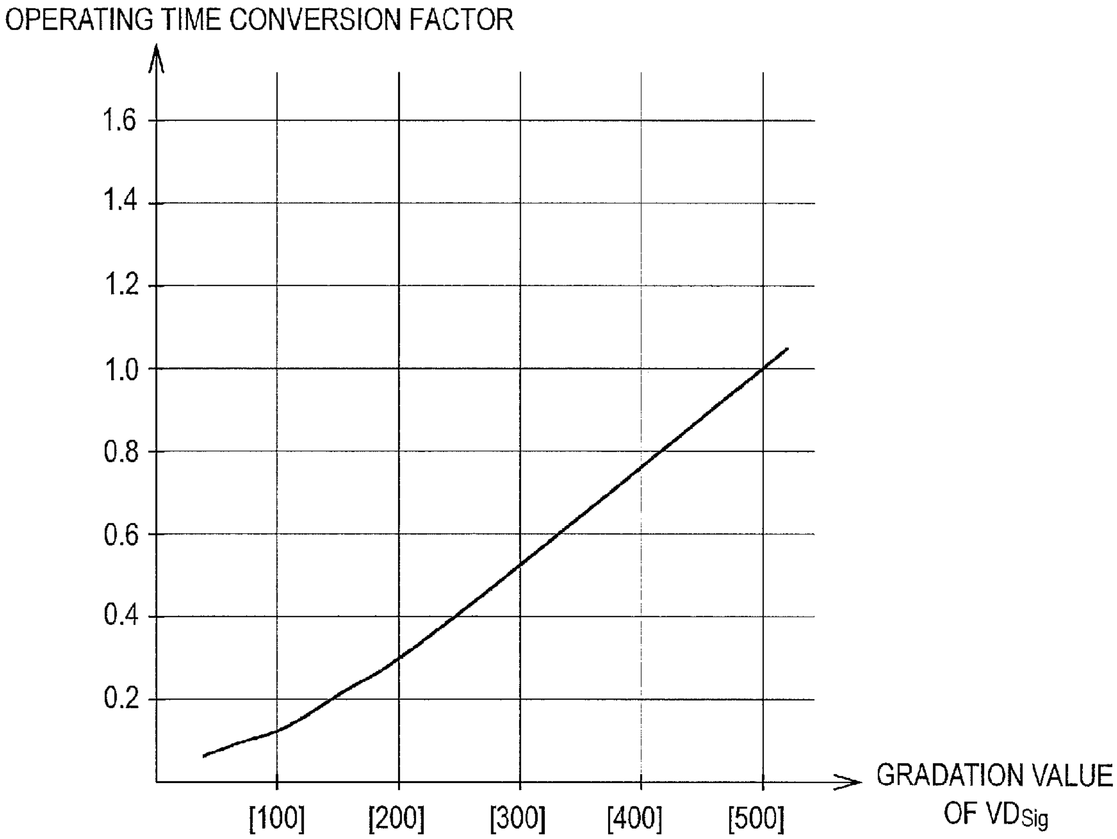
FIG. 12 is a graph illustrating the relationship between a gradation value of a video signal and an operating time conversion factor, which are measured in a state where the temperature condition of the display panel is t1 and the duty ratio of the emission period of the display element has a value $DR_{Mode0}$.

The operating time conversion factor varies depending on the gradation value. FIG. 12 is a graph illustrating the relationship between the gradation value of the video signal $VD_{Sig}$ and the operating time conversion factor which are measured in the state where the temperature condition of the display panel 20 has a value t1 and the duty ratio of the emission period of the display element 10 is set to the value $DR_{Mode0}$.

The reference operating time calculating method when the duty ratio of the emission period is constant has been described above. The reference operating time calculating method when the duty ratio is changed to various values will be described below with reference to FIGS. 13 to 16.

As described with reference to FIG. 5, when the operating times are the same but the duty ratio of the emission period decreases, the total length of the period in which the display element 10 actually emits light decreases. Accordingly, as the duty ratio of the emission period decreases, the temporal variation becomes slower. Conversely, as the duty ratio of the emission period increases, the temporal variation becomes more remarkable.

Figure 13:
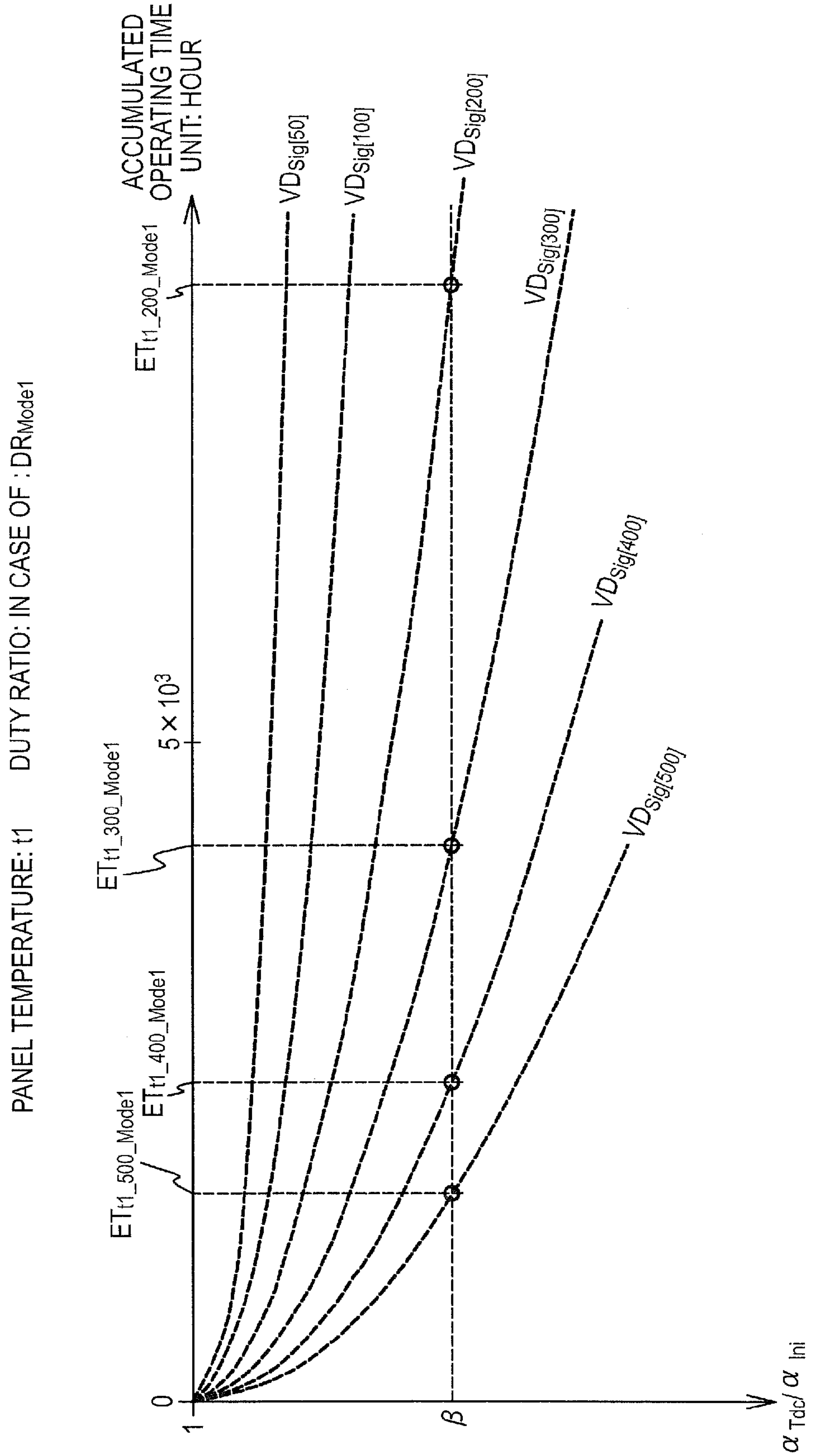
FIG. 13 is a graph schematically illustrating the relationship between the accumulated operating time until the relative luminance variation of a display element due to the temporal variation reaches a certain value "β" by causing a display element to operate on the basis of a video signal and the gradation value of the video signal in a state where the temperature condition of the display panel has a value t1 and the duty ratio of the emission period of the display element has a value $DR_{Mode1}$(<$DR_{Mode0}$).

FIG. 13 is a graph schematically illustrating the relationship between the accumulated operating time until the relative luminance variation of a display element 10 due to the temporal variation reaches a certain value "β" by causing the display element 10 to operate on the basis of the video signal $VD_{Sig}$ in the state where the temperature condition of the display panel 20 has a value t1 and the duty ratio of the emission period of the display element 10 is set to the value $DR_{Mode1}$ ($<DR_{Mode0}$) and the gradation value of the video signal $VD_{Sig}$. For purposes of ease of comparison with FIG. 10, the graph is indicated by a broken line.

In FIG. 13, reference sign $ET_{t1\_500\_Mode1}$ represents the accumulated operating time when the value of the vertical axis is "β" at the gradation value 500 and reference sign $ET_{t1\_400\_Mode1}$ represents the accumulated operating time when the value of the vertical axis is "β" at the gradation value 400. Reference sign $ET_{t1\_300\_Mode1}$ represents the accumulated operating time when the value of the vertical axis is "β" at the gradation value 300 and reference sign $ET_{t1\_200\_Mode1}$ represents the accumulated operating time when the value of the vertical axis is "β" at the gradation value 200. Since the accumulated operating times represented by reference sign $ET_{t1\_100\_Mode1}$ and reference sign $ET_{t1\_50\_Mode1}$ depart from the graph, they are not shown in FIG. 13. As can be clearly seen from the comparison of FIG. 13 with FIG. 10, the accumulated operating time until the value of the vertical axis reaches "β" becomes shorter as the duty ratio of the emission period of the display element 10 decreases.

Therefore, even when the gradation value is constant, the luminance of a display element 10 varies with age for a longer operating time as the duty ratio of the emission period decreases. Conversely, even when the length of the actual operating time is constant, the reference operating time becomes shorter as the duty ratio of the emission period decreases. This will be described below with reference to FIG. 14.

Figure 14:
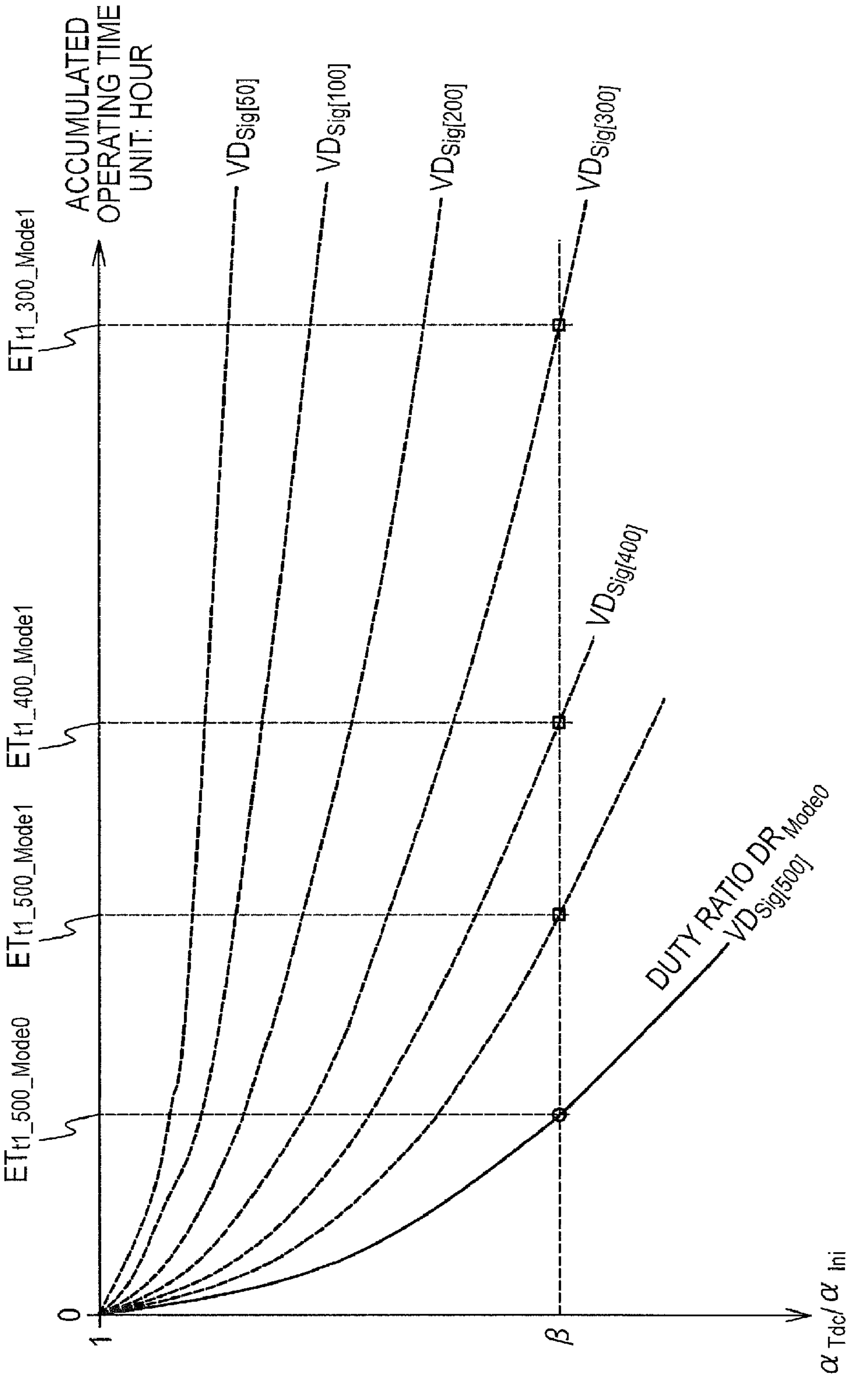
FIG. 14 is a graph in which the graph of a gradation value 500 shown in FIG. 10 is superimposed on the graphs corresponding to the gradation values shown in FIG. 13.

FIG. 14 is a graph in which the curve of the gradation value 500 shown in FIG. 10 is superimposed on the curves corresponding to the gradation values shown in FIG. 13.

For purposes of ease of drawing, FIG. 14 magnifies the vertical axis and the horizontal axis to be double with respect to FIGS. 13 and 10. When the duty ratio of the emission period has the value $DR_{Mode1}$ the second operating time conversion factor at the gradation value 500 is given as $(ET_{t1\_500\_Mode0}/ET_{t1\_500\_Mode1})$ and the second operating time conversion factor at the gradation value 400 is given as $(ET_{t1\_500\_Mode0}/ET_{t2\_400\_Mode1})$. Similarly, the second operating time conversion factors at the gradation values 300, 200, 100, and 50 are given as $(ET_{t1\_500\_Mode0}/ET_{t2\_300\_Mode1})$, $(ET_{t1\_500\_Mode0}/ET_{t2\_200\_Mode1})$, $(ET_{t1\_500\_Mode1}/ET_{t2\_100\_Mode1})$, and $(ET_{t1\_500\_Mode0}/ET_{t2\_50\_Mode1})$, respectively.

Figure 15:
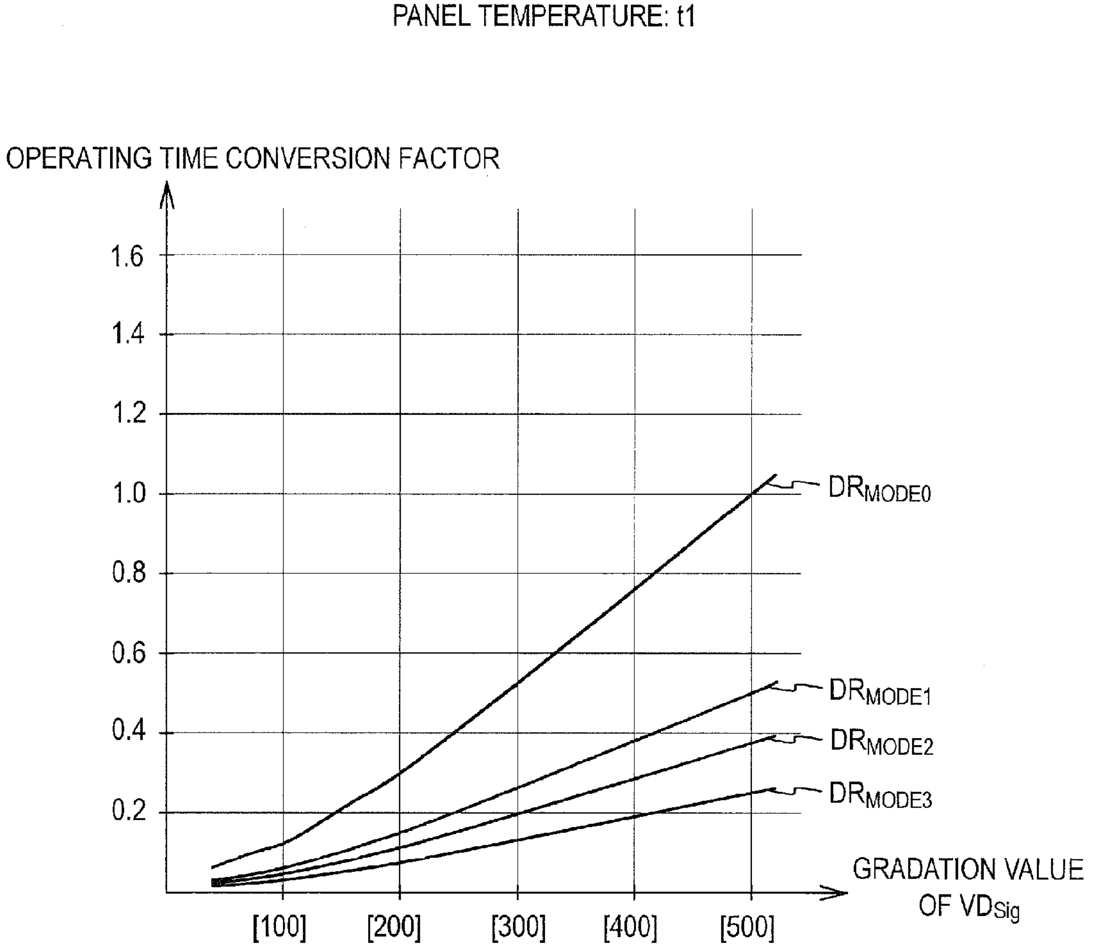
FIG. 15 is a graph illustrating the operating time conversion factors when the temperature condition of the display panel is t1 and the duty ratio of the emission period of the display element has values $DR_{Mode0}$, $DR_{Mode1}$, $DR_{Mode2}$, and $DR_{Mode3}$.

FIG. 15 is a graph illustrating the operating time conversion factors when the temperature condition of the display panel 20 has a value t1 and the duty ratio of the emission period has the values $DR_{Mode0}$, $DR_{Mode1}$, $DR_{Mode2}$, and $DR_{Mode3}$.

As shown in FIG. 15, the slope of the graph increases when the duty ratio of the emission period increases, and the slope of the graph decreases when the duty ratio of the emission period decreases.

Therefore, the second operating time conversion factors corresponding to the gradation values when the duty ratio of the emission period is different from a predetermined reference duty ratio can be calculated by multiplying the operating time conversion factors corresponding to the gradation values when the duty ratio of the emission period is the predetermined reference duty ratio by a constant (duty ratio acceleration factor) corresponding to the duty ratio of the emission period during operation.

The duty ratio acceleration factor when the duty ratio of the emission period is set to the value $DR_{Mode1}$ is the ratio of the second operating time conversion factor and the operating time conversion factor and can be calculated, for example, by $(ET_{t1\_500\_Mode0}/ET_{t1\_500\_Mode1})/(ET_{t1\_500\_Mode0}/ET_{t1\_500\_Mode0})$ $(ET_{t1\_500\_Mode0}/ET_{t2\_500\_Mode1})$. For example, the above-mentioned calculation may be performed for the gradation values and the average value thereof may be used as the duty ratio acceleration factor.

Figure 16:
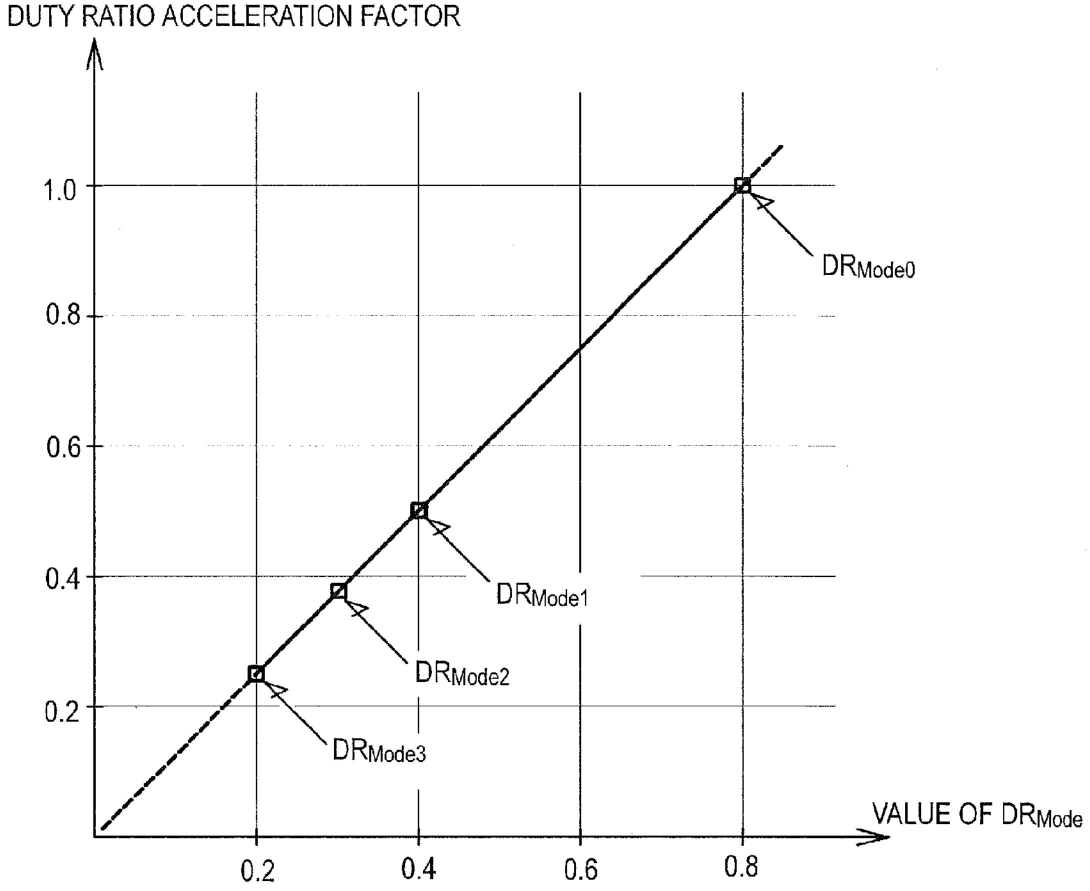
FIG. 16 is a graph illustrating the relationship between the duty ratio and the duty ratio acceleration factor in the state where the temperature condition of the display panel has a value t1.

FIG. 16 is a graph illustrating the relationship between the duty ratio $DR_{Mode}$ and the duty ratio acceleration factor in the state where the temperature condition of the display panel 20 has a value t1.

Qualitatively, when the duty ratio of the emission period is half the reference duty ratio $DR_{Mode0}$, the length of the reference operating time is reduced approximately to a half. When the duty ratio of the emission period is quarter the reference duty ratio $DR_{Mode0}$, the length of the reference operating time is reduced approximately to a quarter. Therefore, the reference operating time can be basically calculated by multiplying the operating time conversion factor shown in FIG. 12 by the duty ratio acceleration factor of a value "$DR_{Mode}/DR_{Mode0}$". FIG. 16 is a graph illustrating the relationship between the duty ratio $DR_{Mode}$ and the duty ratio acceleration factor in the state where the temperature condition of the display panel 20 has a value t1.

As described above, the reference operating time can be calculated by multiplying the actual operating time by the operating time conversion factor and the duty ratio acceleration factor corresponding to the duty ratio of the emission period.

The driving method of compensating for the burn-in of the display apparatus 1 will be described below with reference to FIG. 2 and FIGS. 17 to 22.

Figure 17:
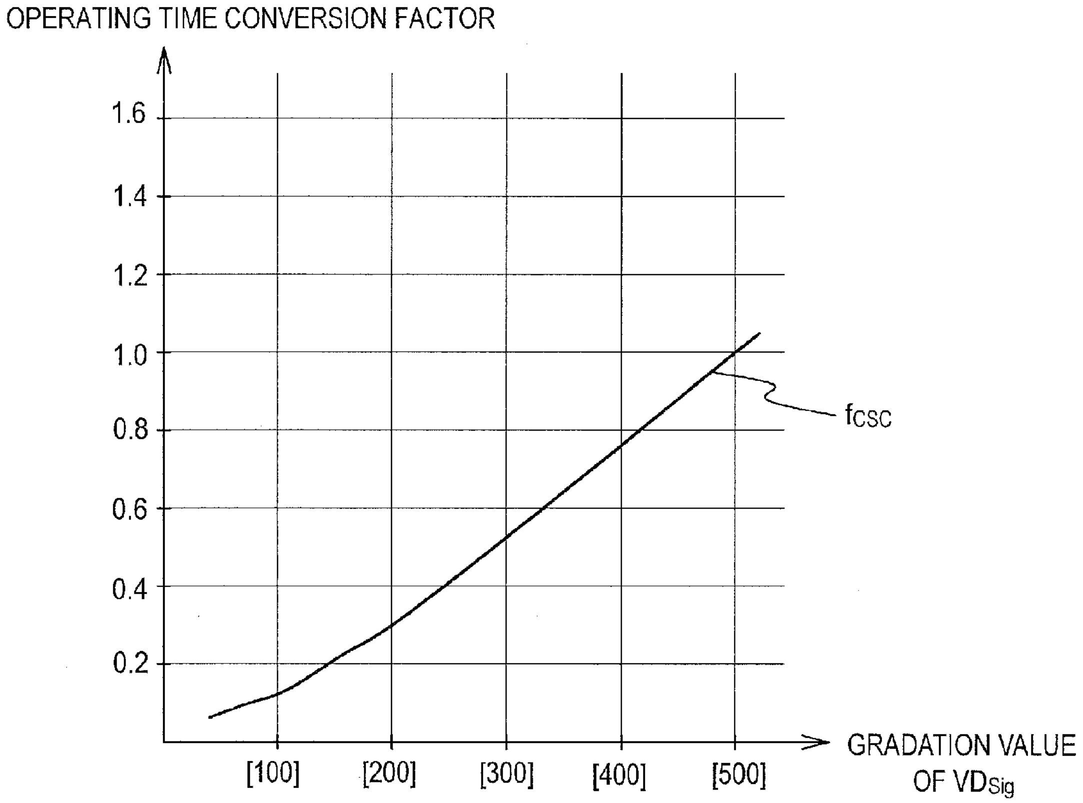
FIG. 17 is a graph schematically illustrating data stored in an operating time conversion factor storage shown in FIG. 2.

FIG. 17 is a graph schematically illustrating data stored in the operating time conversion factor storage 113 shown in FIG. 2.

The luminance correcting unit 110 shown in FIG. 2 has been described in brief above, and the operating time conversion factor storage 113 stores the functions $f_{CSC}$ representing the relationship indicated by the graph of FIG. 17 as a table in advance. This table shows the relationship between the gradation value of the video signal $VD_{Sig}$ and the operating time conversion factor, which is shown in FIG. 12.

Figure 18:
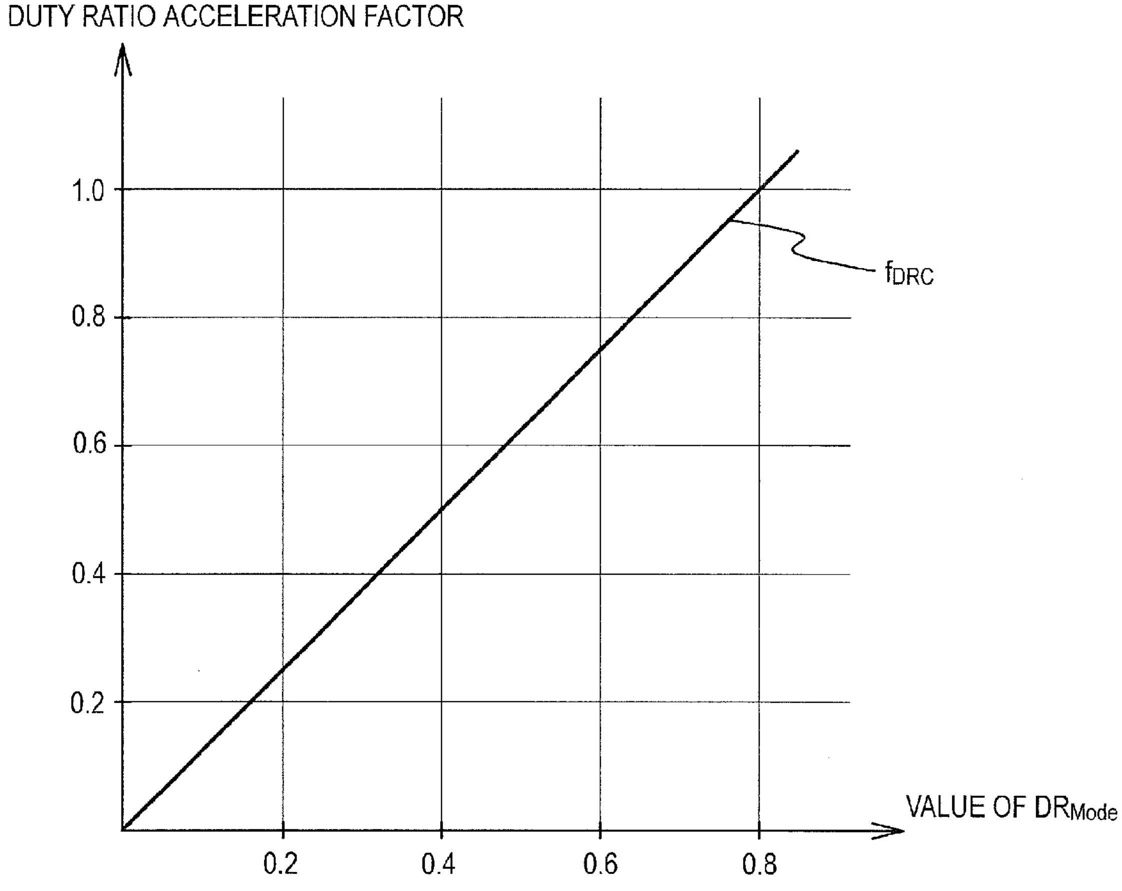
FIG. 18 is a graph schematically illustrating data stored in a duty ratio acceleration factor storage shown in FIG. 2.

FIG. 18 is a graph schematically illustrating data stored in the duty ratio acceleration factor storage 114 shown in FIG. 2.

The duty ratio acceleration factor storage 114 shown in FIG. 2 stores the functions $f_{DRC}$ representing the relationship indicated by the graph of FIG. 18 as a table in advance. This table shows the relationship between the duty ratio of the emission period and the duty ratio acceleration factor, which is shown in FIG. 16.

FIG. 19 is a diagram schematically illustrating data stored in the accumulated reference operating time storage 115 shown in FIG. 2.

The accumulated reference operating time storage 115 includes the memory areas corresponding to the display elements 10, is constructed by a rewritable nonvolatile memory device, and stores data SP(1, 1) to SP(N, M) indicating the accumulated reference operating time value and being shown in FIG. 19.

Figure 20:
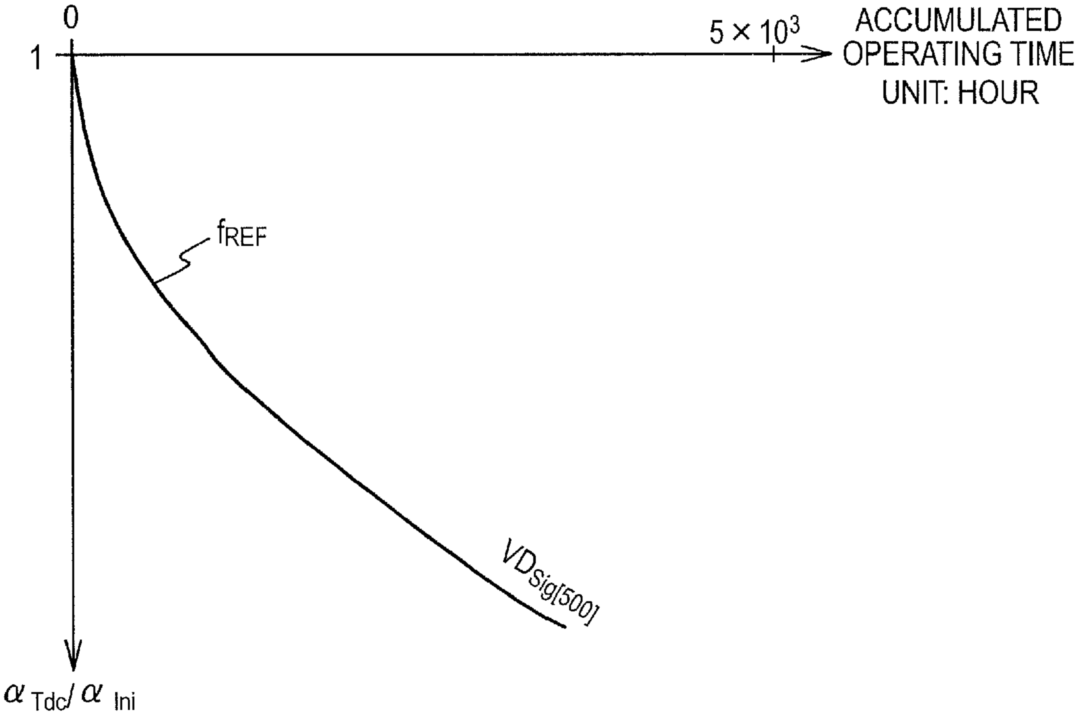
FIG. 20 is a graph schematically illustrating data stored in a reference curve storage shown in FIG. 2.

FIG. 20 is a graph schematically illustrating data stored in the reference curve storage 117 shown in FIG. 2.

The reference curve storage 117 stores the functions $f_{REF}$ representing the reference curve shown in FIG. 20 as a table in advance. This reference curve indicates the curve when t1=40° C. at the gradation value 500 in FIG. 10.

FIG. 22 is a diagram schematically illustrating data stored in the gradation correction value storage 116B of the gradation correction value holder 116 shown in FIG. 2.

The gradation correction value storage 116B includes memory areas corresponding to the display elements 10, is constructed by a rewritable memory device, and stores data LC(1, 1) to LC(N, M) indicating the correction values of the gradation values and being shown in FIG. 22.

A driving method according to Example 1 includes a luminance correcting step of correcting the luminance of the display elements 10 when displaying an image on the display panel 20 by correcting a gradation value of an input signal $vD_{Sig}$ on the basis of the operation of the luminance correcting unit 110 and outputting the corrected input signal as the video signal $VD_{Sig}$, and the luminance correcting step includes: a reference operating time value calculating step of calculating the value of a reference operating time in which the temporal variation in luminance of each display element 10 when the corresponding display element 10 operates for a predetermined unit time on the basis of the video signal $VD_{Sig}$ in a state where the duty ratio of an emission period is set to a certain duty ratio $DR_{Mode}$ is equal to the temporal variation in luminance of each display element 10 when it is assumed that the corresponding display element 10 operates on the basis of the video signal $VD_{Sig}$ of a predetermined reference gradation value in a state where the duty ratio $DR_{Mode}$ of the emission period is set to a predetermined reference duty ratio $DR_{Mode0}$; an accumulated reference operating time value storing step of storing an accumulated reference operating time value obtained by accumulating the value of the calculated reference operating time for each display element 10; a gradation correction value holding step of calculating a correction value of a gradation value used to compensate for the temporal variation in luminance of each display element 10 with reference to a reference curve representing the relationship between the operating time of each display element 10 and the temporal variation in luminance of the corresponding display element 10 when the corresponding display element 10 operates on the basis of the video signal $VD_{Sig}$ of a predetermined reference gradation value in the state where the duty ratio $DR_{Mode}$ of the emission period is set to the predetermined reference duty ratio $DR_{Mode0}$ on the basis of the accumulated reference operating time value and holding the correction value of the gradation value corresponding to the respective display elements 10; and a video signal generating step of correcting the gradation value of the input signal $vD_{Sig}$ corresponding to the respective display elements 10 on the basis of the correction values of the gradation values and outputting the corrected input signal as the video signal $VD_{Sig}$.

Here, the luminance correcting step for the (n, m)-th display element 10 when the display of the first to (Q−1)-th frames is ended cumulatively from the initial state of the display apparatus 1 and the writing process of displaying the Q-th (where Q is a natural number equal to or greater than 2) frame is performed will be described below.

The input signal $vD_{Sig}$ and the video signal $VD_{Sig}$ in the q-th frame (where q=1, 2, . . . , Q) of the (n, m)-th display element 10 are represented by $VD_{Sig(n, m)\_q}$ and $VD_{Sig(n, m)\_q}$. When the q-th frame is displayed, the data representing the accumulated reference operating time value corresponding to the (n, m)-th display element 10 is expressed by $SP(n, m)_{\_q}$. As described above, the time occupied by a so-called one frame period is represented by reference sign $T_F$. In the initial state, "0" as an initial value is stored in advance in data SP(1, 1) to SP(N, M) and "1" as an initial value is stored in advance in data LC(1, 1) to LC(N, M).

In the (Q−1)-th display frame, the reference operating time calculator 112 shown in FIG. 2 performs the reference operating time value calculating step on the basis of the video signal $VD_{Sig(n, m)\_Q\text{-}1}$ and the duty ratio $DR_{Mode}$ during operation set on the basis of the duty ratio setting signal $dR_{Mode}$.

Specifically, the reference operating time calculator 112 calculates the function value $f_{CSC}(VD_{Sig(n, m)\_Q\text{-}1})$ with reference to the operating time conversion factor storage 113 on the basis of the video signal $VD_{Sig(n, m)\_Q\text{-}1}$. The reference operating time calculator 112 calculates the function value $f_{DRC}(DR_{Mode})$ with reference to the duty ratio acceleration factor storage 114 on the basis of the duty ratio $DR_{Mode}$ during operation. The calculation of the reference operating time$=T_F \cdot f_{DRC}(DR_{Mode}) \cdot f_{CSC}(VD_{Sig(n, m)_Q\text{-}1})$ is performed for the (Q−1)-th display frame.

The accumulated reference operating time storage 115 performs the accumulated reference operating time storing step of storing the accumulated reference operating time value which is obtained by accumulating the reference operating time value calculated by the reference operating time calculator 112 for each display element 10.

Specifically, in the (Q−1)-th display frame, the accumulated reference operating time storage 115 adds the reference operating time in the (Q−1)-th display frame to the previous data $SP(n, m)_{\_Q\text{-}2}$. Specifically, the calculation of $SP(n, m)_{\_Q\text{-}1}=SP(n, m)_{\_Q\text{-}2}+T_F \cdot f_{DRC}(DR_{Mode}) \cdot$ $f_{CSC}(VD_{Sig(n,\,m)\_Q\text{-}1})$ is performed. Accordingly, the accumulated reference operating time value which is obtained by accumulating the reference operating time value calculated by the reference operating time calculator 112 for each display element 10 is stored in the accumulated reference operating time storage 115.

The gradation correction value holder 116 performs the gradation correction value storing step of storing the correction value of the gradation value corresponding to each display element 10.

Figure 21:
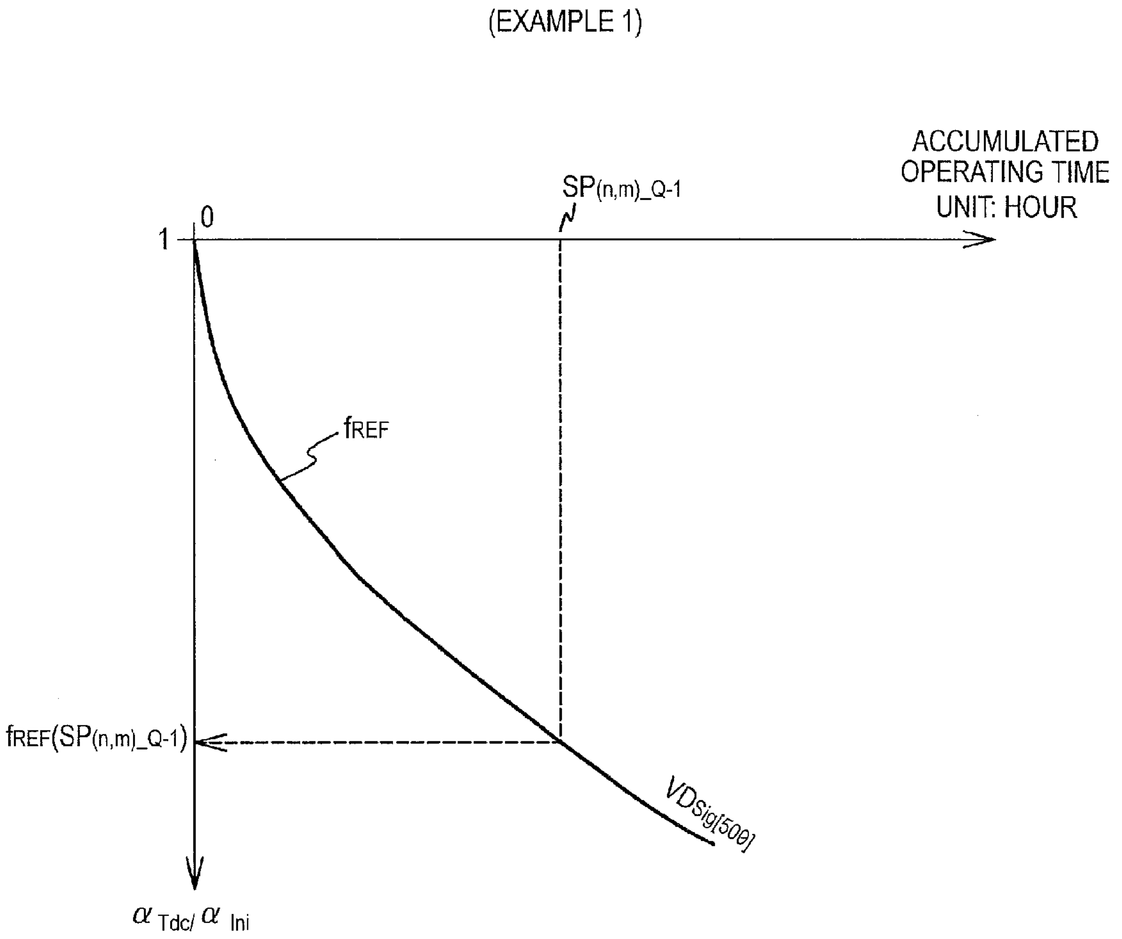
FIG. 21 is a graph schematically illustrating the operation of a gradation correction value calculator of a gradation correction value holder shown in FIG. 2.

FIG. 21 is a graph schematically illustrating the operation of the gradation correction value calculator 116A of the gradation correction value holder 116 shown in FIG. 2.

Specifically, the gradation correction value calculator 116A calculates the function value $f_{REF}(SP(n, m)__{Q\text{-}1})$ with reference to the reference curve storage 117 (see FIG. 21) on the basis of the data $SP(n, m)__{Q\text{-}1}$ stored in the accumulated reference operating time storage 115. The reciprocal of the function value $f_{REF}(SP(n, m)__{Q\text{-}1})$ is stored as the correction value of the gradation value in the data $LC(n, m)__{Q\text{-}1}$ of the gradation correction value storage 116B.

The video signal generator 111 performs the video signal generating step of correcting the gradation value of the input signal $vD_{Sig}$ corresponding to each display element 10 on the basis of the correction value of the gradation value and outputting the corrected input signal as the video signal $VD_{Sig}$.

That is, just before the Q-th frame, the accumulated reference operating time storage 115 stores data $SP(1, 1)__{Q\text{-}3}$ to $SP(N, M)__{Q\text{-}1}$ and the gradation correction value storage 116B of the gradation correction value holder 116 stores data $LC(1, 1)__{Q\text{-}1}$ to $LC(N, M)__{Q\text{-}1}$.

The video signal generator 111 performs the calculation of the video signal $VD_{Sig(n,\,m)_Q}=V_{DSig(n,\,m)_Q}\cdot LC(n, m)__{Q\text{-}1}$ with reference to the input signal $vD_{Sig(n,\,m)\_Q}$ and the data $LC(n, m)__{Q\text{-}1}$ in the gradation correction value storage 116B and supplies the generated video signal $VD_{Sig(n,\,m)\_Q}$ to the signal output circuit 102.

Then, the Q-th frame display is performed. Thereafter, the above-mentioned operation is repeatedly performed in the (Q+1)-th frame or the frames subsequent thereto.

In the display apparatus 1 according to Example 1, the reference operating time value is calculated with reference to the operating time conversion factor storage 113 and the duty ratio acceleration factor storage 114, the calculated value is stored as the accumulated reference operating time value, and the correction value of the gradation value is calculated with reference to the reference curve storage 117 on the basis of the accumulated reference operating time value. The duty ratio acceleration factor corresponding to the duty ratio of the emission period in addition to the gradation value of the video signal $VD_{Sig}$ is reflected in the reference operating time value.

Therefore, the history of the duty ratio of the emission period in addition to the history of the gradation value of the video signal $VD_{Sig}$ is reflected in the accumulated reference operating time value in which the value of the reference operating time is accumulated. Accordingly, the luminance variation due to the temporal variation is compensated for in consideration of the history of the duty ratio of the emission period, thereby displaying an image with good quality.

It has been stated above that the display apparatus 1 is a monochrome display apparatus, but a color display apparatus may be used. In this case, for example, when the tendency of the temporal variation of a display element 10 varies depending on emission colors, the operating time conversion factor storage 113, the duty ratio acceleration factor storage 114, and the reference curve storage 117 shown in FIG. 2 have only to be individually provided for each emission color.

The compensation of the burn-in in the display apparatus 1 has been described in detail above. The details of the operation except for the burn-in compensation of the (n, m)-th display element 10 are the same in Example 1 and Example 2 to be described later. For purposes of ease of expanation, the operation except for the burn-in compensation of the (n, m)-th display element 10 will be described in detail in the second half of Example 2.

EXAMPLE 2

Example 2 relates to a display apparatus and a display apparatus driving method.

In Example 1, the temperature condition of the display panel during operation is not considered in calculating the reference operating time. In practice, the fall in luminance of a display element is affected by the temperature condition of a display panel. In Example 2, since the reference operating time can be calculated in consideration of the temperature condition of the display panel during operation, it is possible to compensate for the luminance variation due to the temporal variation in consideration of the history of the temperature condition, thereby displaying an image with high quality.

Figure 23:
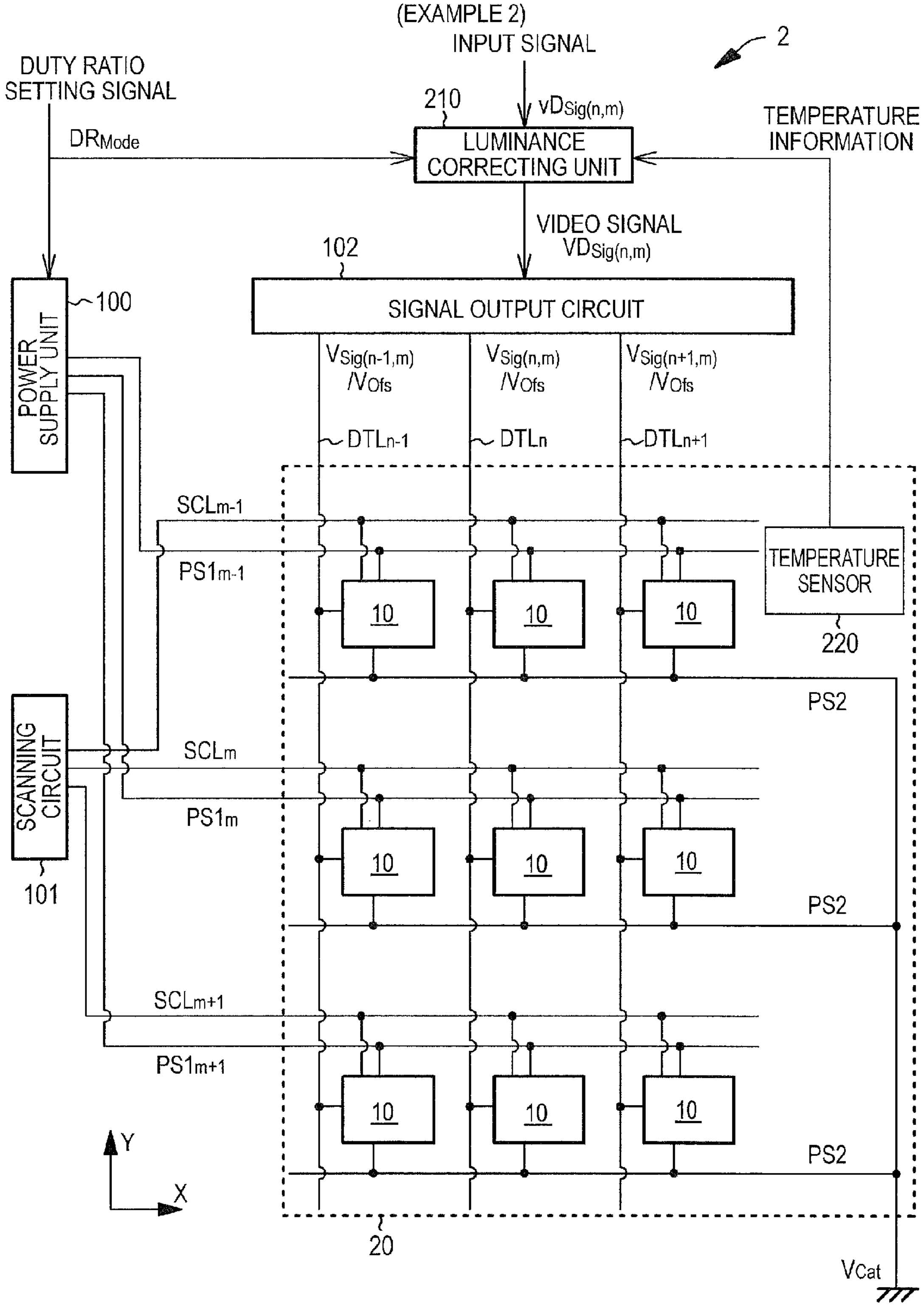
FIG. 23 is a conceptual diagram illustrating a display apparatus according to Example 2.

FIG. 23 is a conceptual diagram illustrating the configuration of a display apparatus 2 according to Example 2.

The display apparatus 2 according to Example 2 includes a display panel 20 in which display elements 10 each having a current-driven light-emitting portion are arranged in a two-dimensional matrix in a first direction and a second direction and that displays an image on a video signal $VD_{Sig}$ and a luminance correcting unit 210 that corrects the luminance of the display elements 10 when displaying an image on the display panel 20 by correcting the gradation value of the input signal $vD_{Sig}$ and outputting the corrected input signal as the video signal $VD_{Sig}$.

The display apparatus 2 according to Example 2 further includes a temperature sensor 220. The temperature sensor 220 is disposed in the display panel 20. The temperature sensor 220 is constructed by a temperature-detecting transistor formed in a part surrounding the display area in which the display elements 10 are arranged through the use of the transistor forming process at the time of manufacturing the display panel 20. In Example 2, the number of the temperature sensors 220 is one, but the present disclosure is not limited to this number.

Except that the temperature sensor 220 is provided, the configuration of the display panel 20 is the same as described in Example 1. The constituent elements of the display panel 20 are referenced by the same reference numerals and signs as in Example 1. The description of the constituent elements is the same as in Example 1 and thus will not be repeated.

Figure 24:
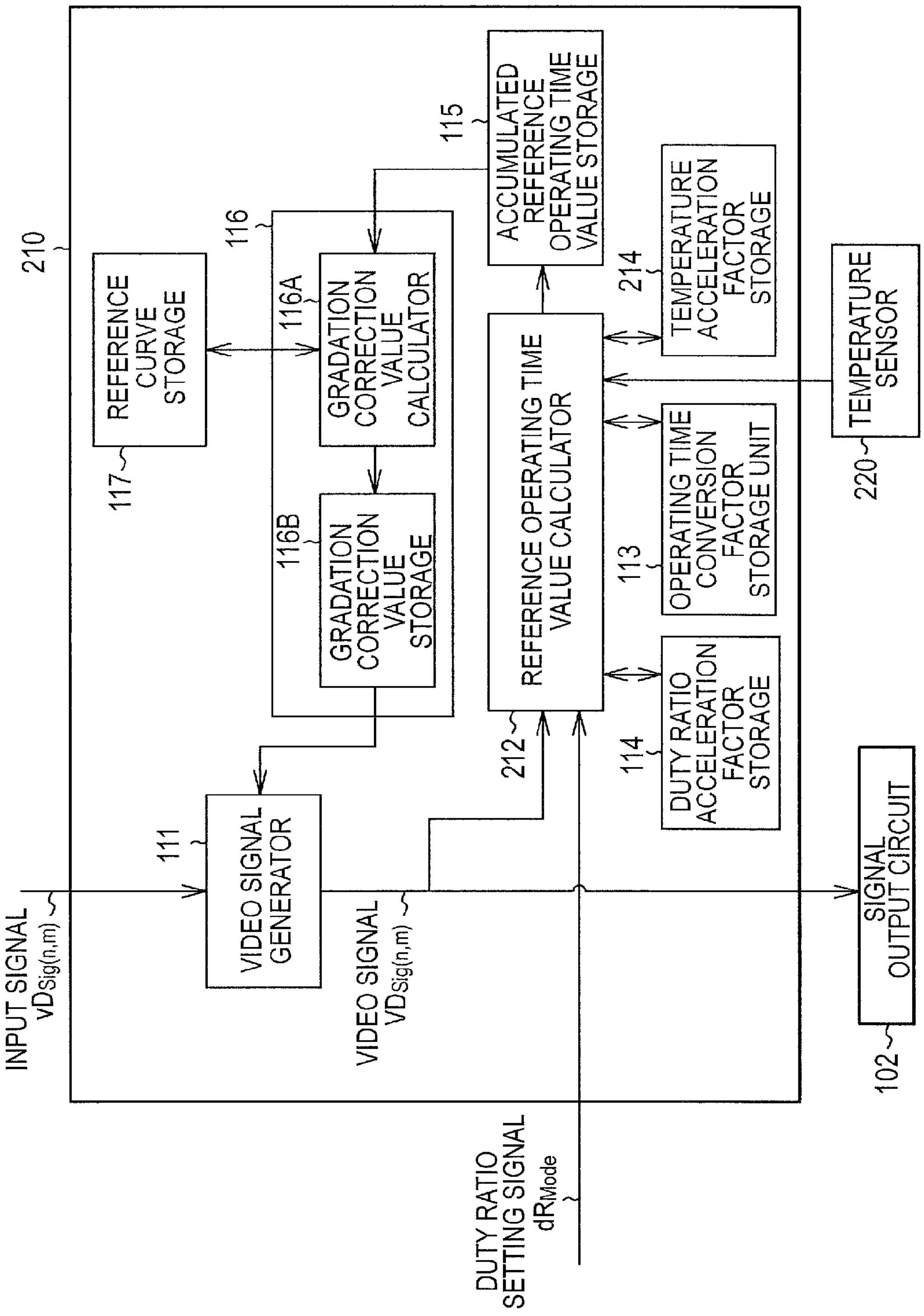
FIG. 24 is a block diagram schematically illustrating the configuration of a luminance correcting unit.
Figure 25:
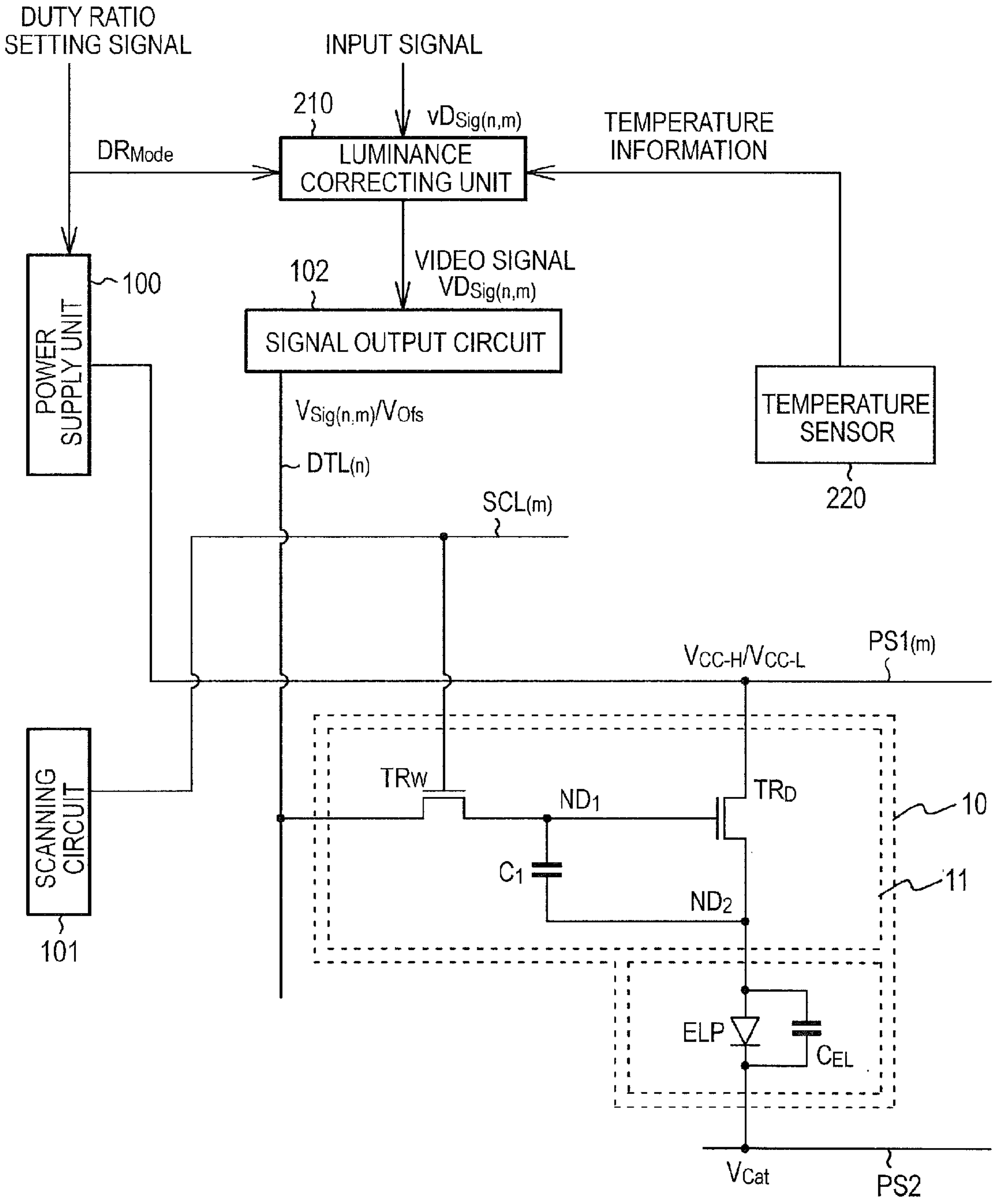
FIG. 25 is an equivalent circuit diagram of a display element constituting a display panel.

FIG. 24 is a block diagram schematically illustrating the configuration of a luminance correcting unit 210. FIG. 25 is an equivalent circuit diagram of a display element 10 in the display panel 20.

The operation of the luminance correcting unit 210 will be described later in detail with reference to FIGS. 30 and 31. Here, the configuration of the luminance correcting unit 210 will be described in brief.

Compared with the luminance correcting unit 110 described in Example 1, the luminance correcting unit 210 further includes a temperature acceleration factor storage 214. The operating time conversion factor stored in the operating time conversion factor storage 113 is an operating time conversion factor when a display element 10 operates under a predetermined temperature condition. The "predetermined temperature condition" will be described later.

The temperature acceleration factor storage 214 stores as a temperature acceleration factor the ratio of a third operating time conversion factor and an operating time conversion factor when the ratio of the value of each operating time until the temporal variation in luminance reaches a certain value by causing each display element 10 to operate on the basis of the video signal $VD_{Sig}$ of various gradation values in the state where the duty ratio of an emission period is set to a predetermined reference duty ratio under a temperature condition different from the predetermined temperature condition and the value of the operating time until the temporal variation in luminance reaches the certain value by causing the corresponding display element 10 to operate on the basis of the video signal $VD_{Sig}$ of the predetermined reference gradation value in the state where the duty ratio of the emission period is set to a predetermined reference duty ratio under the predetermined temperature condition is defined as the third operating time conversion factor.

The temperature acceleration factor storage 214 is constructed by a memory device such as a so-called nonvolatile memory and can be constructed by widely-known circuit elements.

The reference operating time calculator 212 shown in FIG. 24 calculates the value of the reference operating time by referring to the value stored in the operating time conversion factor storage 113 to correspond to the gradation value of the video signal $VD_{Sig}$, the value stored in the duty ratio acceleration factor storage 114 to correspond to the duty ratio of the emission period during operation, and the value stored in the temperature acceleration factor storage 214 to correspond to the temperature information from the temperature sensor and multiplying the value of the unit time by the stored values.

The configuration of the luminance correcting unit 210 is equal to the configuration of the luminance correcting unit 110 described in Example 1, except that it further includes the temperature acceleration factor storage 214 and the value stored in the temperature acceleration factor storage 214 to correspond to the temperature information from the temperature sensor is referred to and is additionally multiplied in calculating the reference operating time in the reference operating time calculator 212. The same elements as the luminance correcting unit 110 will be referenced by the same reference numerals and signs as in Example 1. The description of these constituent elements is the same as described in Example 1 and thus will not be repeated.

In Example 2, it is assumed that the "temperature" of the "predetermined temperature condition" is 40° C., but the temperature is not limited to the temperature value. In Example 2, the "predetermined unit time" is defined as the time occupied by a so-called one frame period and the "predetermined reference gradation value" is defined as 500, but the present disclosure is not limited to this definition.

A method of calculating a reference operating time when an actual temperature condition is different from a predetermined temperature condition will be described below with reference to FIGS. 26 and 27.

The temporal variation in luminance due to the operation of a display element 10 depends on the temperature condition during operation. In general, the temporal variation becomes more remarkable as the temperature condition during operation becomes higher.

Figure 26:
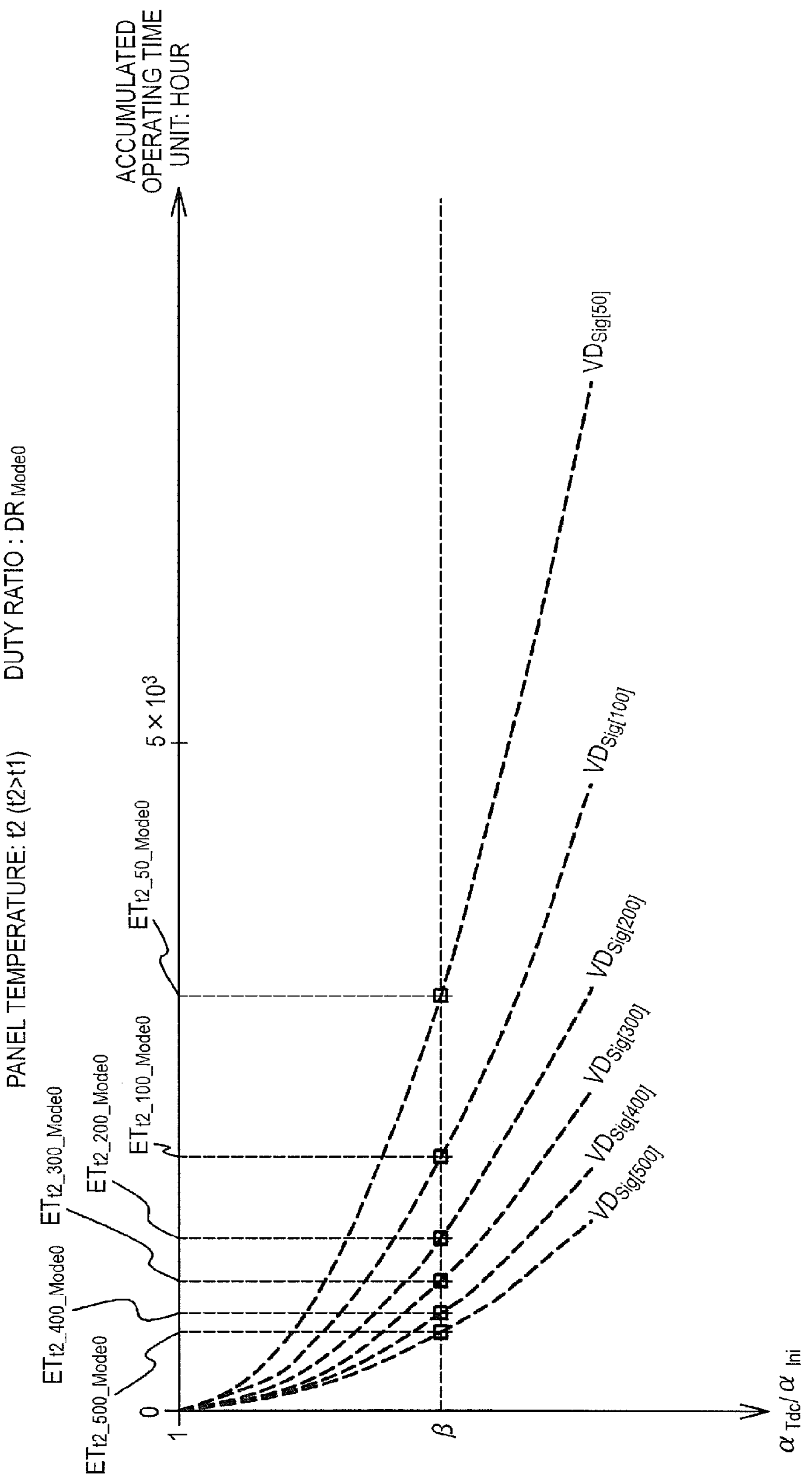
FIG. 26 is a graph schematically illustrating the relationship between the accumulated operating time until the relative luminance variation of a display element due to the temporal variation reaches a certain value "β" by causing a display element to operate on the basis of a video signal and the gradation value of the video signal in a state where the temperature condition of the display panel has a certain value t2 (where t2>t1) and the duty ratio of the emission period of the display element has a value $DR_{Mode1}$.

FIG. 26 is a graph schematically illustrating the relationship between the accumulated operating time until the relative luminance variation of a display element 10 due to the temporal variation reaches a certain value "β" by causing the display element 10 to operate on the basis of the video signal $VD_{Sig}$ in the state where the temperature condition of the display panel 20 has a certain value t2 (where t2>t1) and the duty ratio of the emission period of the display element 10 is set to the value $DR_{Mode0}$ and the gradation value of the video signal $VD_{Sig}$. For purposes of ease of comparison with FIG. 10, the graph is indicated by a broken line.

The graph shown in FIG. 26 corresponds to the graph shown in FIG. 10 when the temperature condition is changed.

In FIG. 26, reference sign $ET_{t2\_500\_Mode0}$ represents the accumulated operating time when the value of the vertical axis is "β" at the gradation value 500 and reference sign $ET_{t2\_400\_Mode0}$ represents the accumulated operating time when the value of the vertical axis is "β" at the gradation value 400. The same is true of reference signs $ET_{t2\_300\_Mode0}$, $ET_{t2\_200\_Mode0}$, $ET_{t2\_100\_Mode0}$, and $ET_{t2\_50\_Mode0}$. As can be clearly seen from the comparison of FIG. 26 with FIG. 10, the accumulated operating time until the value of the vertical axis reaches "β" becomes shorter as the temperature condition of the display panel 20 becomes higher.

Therefore, even when the gradation value is constant, the luminance of a display element 10 varies with age for a shorter operating time as the temperature condition of the display panel 20 becomes higher. Conversely, even when the length of the actual operating time is constant, the reference operating time becomes longer as the temperature condition of the display panel 20 becomes higher. This will be described below with reference to FIG. 27.

Figure 27:
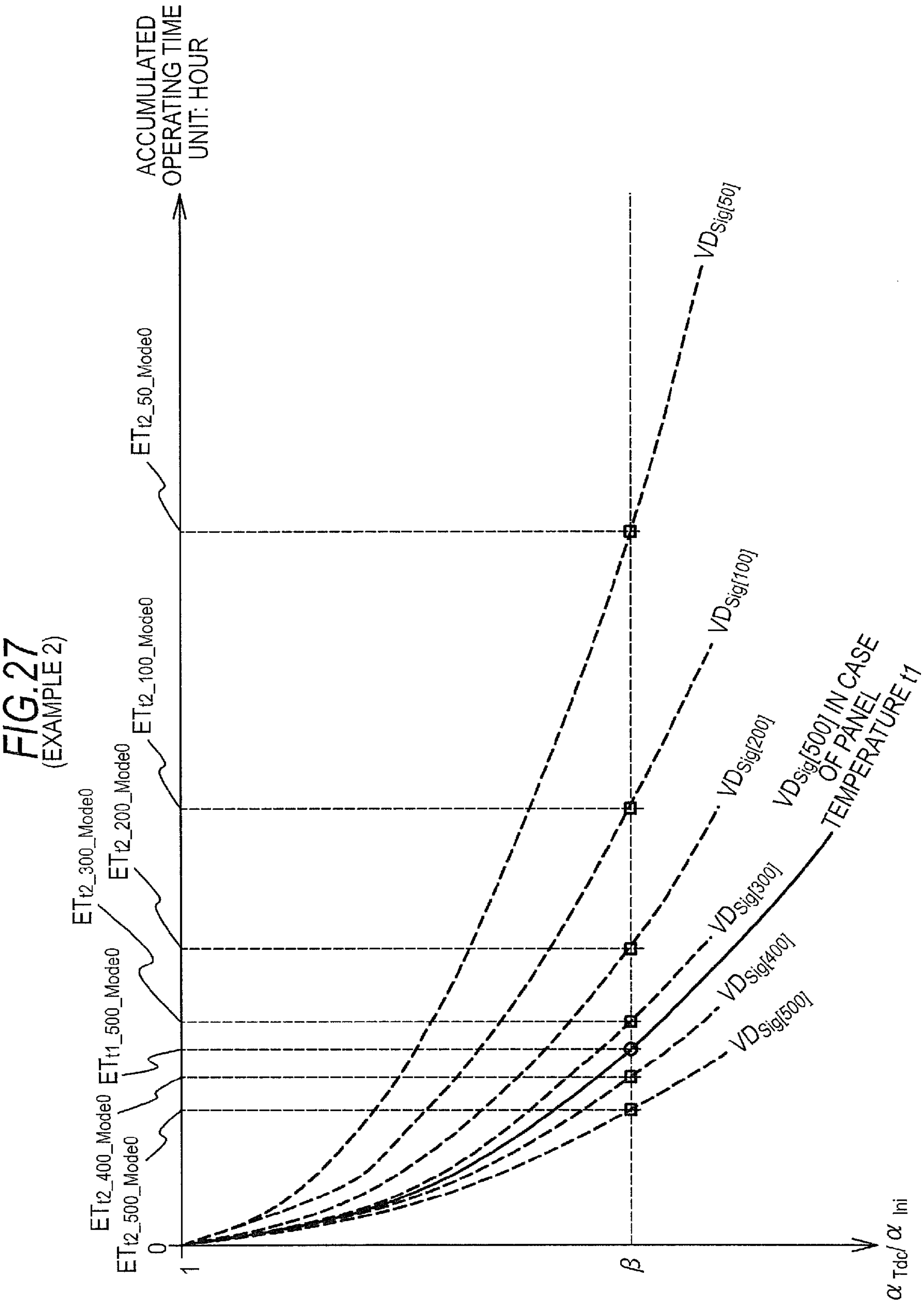
FIG. 27 is a graph in which the graph of a gradation value 500 shown in FIG. 10 is superimposed on the graphs corresponding to the gradation values shown in FIG. 26.

FIG. 27 is a graph in which the curve of the gradation value 500 shown in FIG. 10 is superimposed on the curves corresponding to the gradation values shown in FIG. 26.

For purposes of ease of drawing, FIG. 27 magnifies the vertical axis and the horizontal axis to be double with respect to FIGS. 26 and 10. When the temperature condition of the display panel 20 has a value t2, the third operating time conversion factor at the gradation value 50 is given as $(ET_{t1\_500\_Mode0}/ET_{t2\_50\_Mode0})$ and the third operating time conversion factor at the gradation value 100 is given as $(ET_{t1\_500\_Mode0}/ET_{t2\_100\_Mode0})$. Similarly, the third operating time conversion factors at the gradation values 200, 300, 400, and 500 are given as $(ET_{t1\_500\_Mode0}/ET_{t2\_200\_Mode0})$, $(ET_{t1\_500\_Mode0}/ET_{t2\_300\_Mode0})$ $(ET_{t1\_500\_Mode0}/ET_{t2\_400\_Mode0})$, and $(ET_{t1\_500\_Mode0}/ET_{t2\_500\_Mode0})$, respectively.

Figure 28:
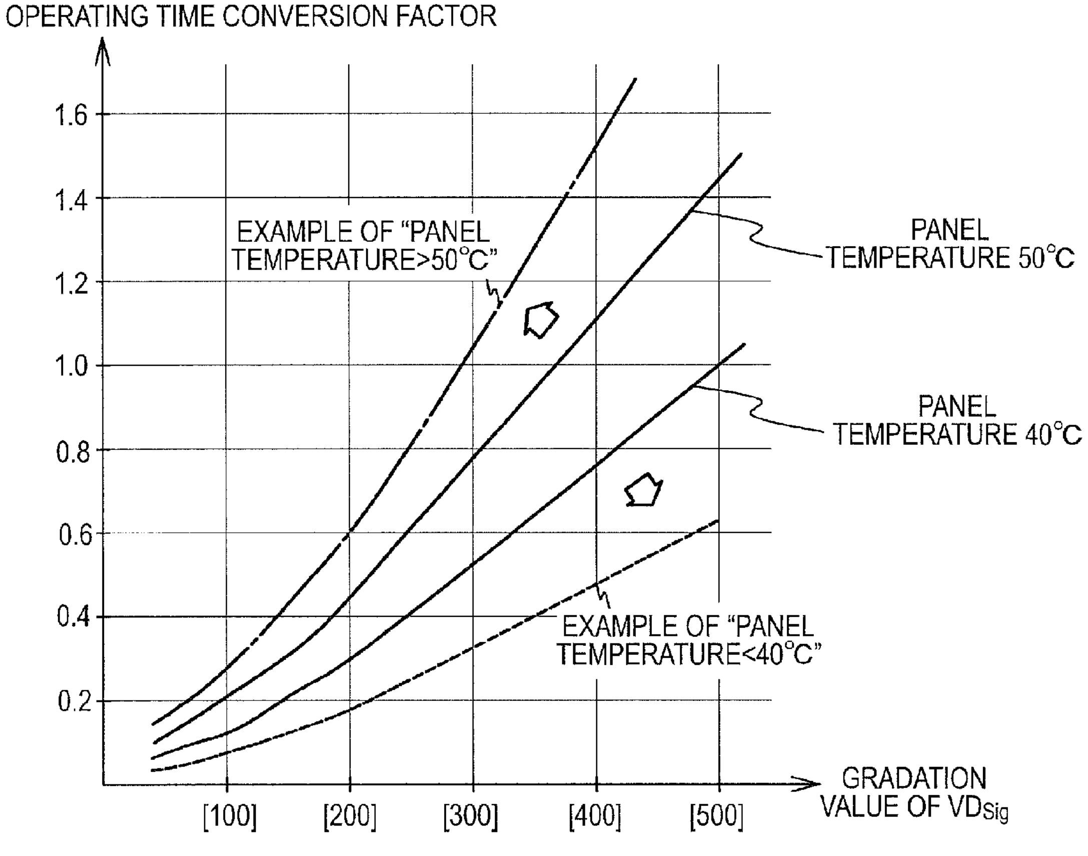
FIG. 28 is a graph illustrating the operating time conversion factors when the temperature condition of the display panel is 40° C. and when the temperature condition of the display panel is 50° C. in the state where the duty ratio of the emission period of the display element has a value $DR_{Mode0}$.

FIG. 28 is a graph illustrating the operating time conversion factor when the temperature condition of the display panel 20 is 40° C. (which is the predetermined temperature condition in Example 2) and the third operating time conversion factor when the temperature condition of the display panel 20 is 50° C. in the state where the duty ratio of the emission period of the display element 10 is set to the value $DR_{Mode0}$. In FIG. 28, the graph when the temperature condition is lower than 40° C. is schematically indicated by a broken line and the graph when the temperature condition is higher than 50° C. is schematically indicated by a one-dot chained line.

As shown in FIG. 28, the slope of the graph increases when the temperature condition of the display panel 20 becomes higher, and the slope of the graph decreases when the temperature condition of the display panel 20 becomes lower.

The graph of the third operating time conversion factor when the temperature condition of the display panel 20 is 50° C. has a shape obtained by magnifying the graph of the operating time conversion factor when the temperature condition of the display panel 20 is 40° C. along the vertical axis by a constant multiplication. The same is true of other temperature conditions. Conversely, it is considered that the display element 10 has temperature dependency satisfying such a condition.

Therefore, the third operating time conversion factors corresponding to the gradation values when the temperature condition of the display panel 20 is different from the predetermined temperature condition can be calculated by multiplying the operating time conversion factors corresponding to the gradation values when the display panel has the predetermined temperature condition by the temperature acceleration factor) corresponding to the temperature condition of the display panel 20.

The temperature acceleration factor when the temperature condition is 50° C. is the ratio of the third operating time conversion factor and the operating time conversion factor and can be calculated, for example, by $(ET_{t1\_500\_Mode0}/ET_{t2\_500\_Mode0})/(ET_{t1\_500\_Mode0}/ET_{t1\_500\_Mode0})=(ET_{t1\_500\_Mode0}/ET_{t2\_500\_Mode0})$. Incidentally, the above-mentioned calculation may be performed for the gradation values and the average value thereof may be used as the acceleration factor.

Figure 29:
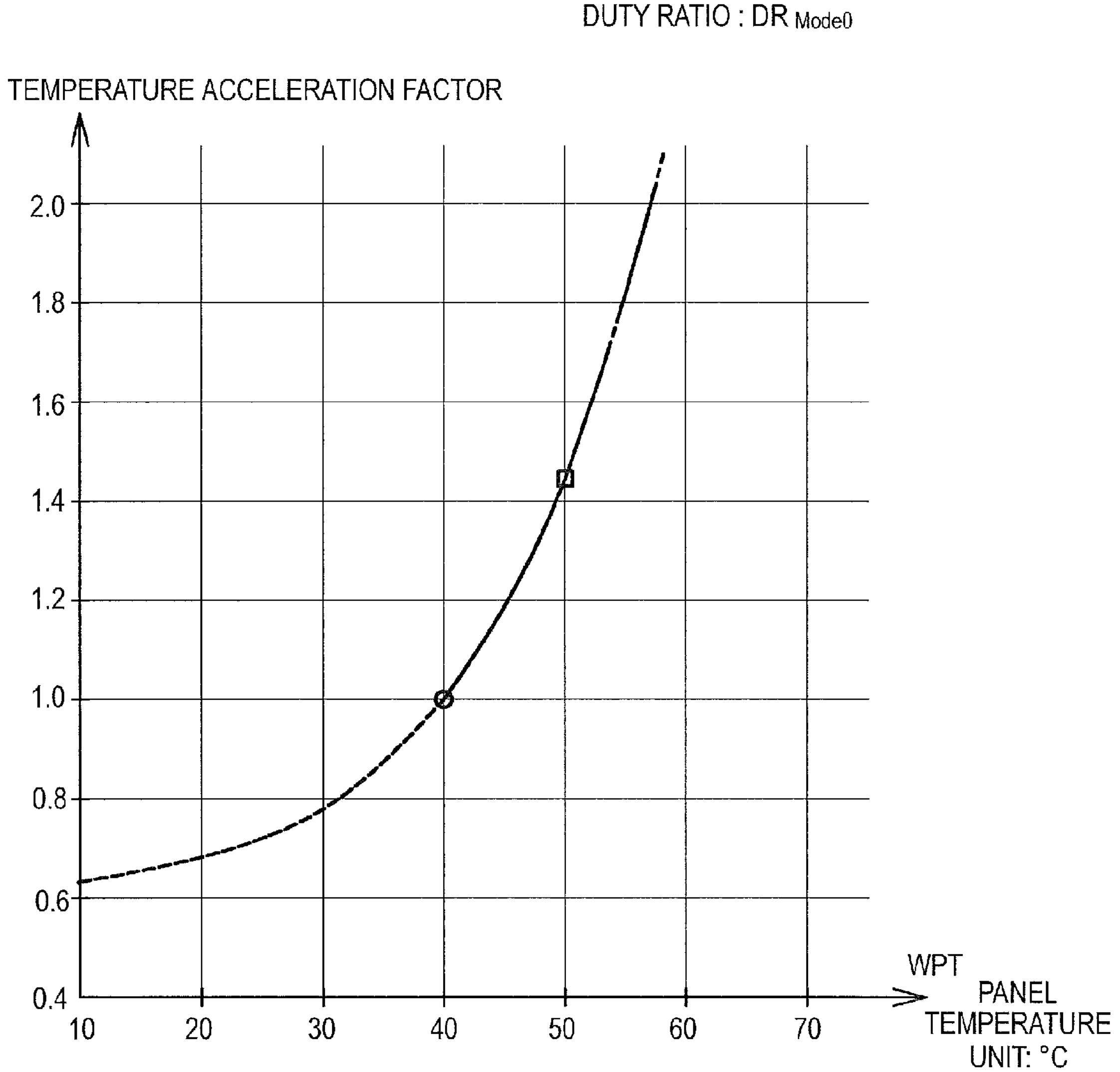
FIG. 29 is a graph schematically illustrating the relationship between the temperature condition during operation of the display panel and a temperature acceleration factor.

FIG. 29 is a graph schematically illustrating the relationship between the temperature condition during operation of the display panel 20 and the acceleration factor. By using the graph of the operating time conversion factor when the temperature condition of the display panel 20 is 40° C. (the predetermined temperature condition in Example 1) as a reference, the acceleration factor is approximately 1.45 when the temperature condition of the display panel 20 is 50° C. In FIG. 29, the curve when the temperature condition is lower than 40° C. is indicated by a broken line and the curve when the temperature condition is higher than 50° C. is indicated by a one-dot chained line.

As described above, when the actual temperature condition is different from the predetermined temperature condition, the reference operating time can be calculated by multiplying the operating time conversion factor under the predetermined temperature condition for an actual operating time by the acceleration factor corresponding to the temperature condition.

The driving method of compensating for the burn-in of the display apparatus 2 will be described below with reference to FIGS. 24, 30, and 31. The driving method according to Example 2 is equal to the driving method according to Example 1, except that the temperature acceleration factor is multiplied in calculating the reference operating time, and thus the description will be centered on the calculation of the reference operating time.

Similarly to Example 1, the input signal $vD_{Sig}$ and the video signal $VD_{Sig}$ in the q-th frame (where q=1, 2, . . . , Q) of the (n, m)-th display element 10 are represented by $vD_{Sig(n,\ m)\_q}$ and $VD_{Sig(n,\ m)\_q}$. When the q-th frame is displayed, the data representing the accumulated reference operating time value corresponding to the (n, m)-th display element 10 is expressed by $SP(n, m)_{\_q}$ and the temperature information from the temperature sensor 220 when displaying the q-th frame is represented by $WPT_{\_q}$. As described above, the time occupied by a so-called one frame period is represented by reference sign $T_F$. In the initial state, "0" as an initial value is stored in advance in data SP(1, 1) to SP(N, M) and "1" as an initial value is stored in advance in data LC(1, 1) to LC(N, M).

Figure 30:
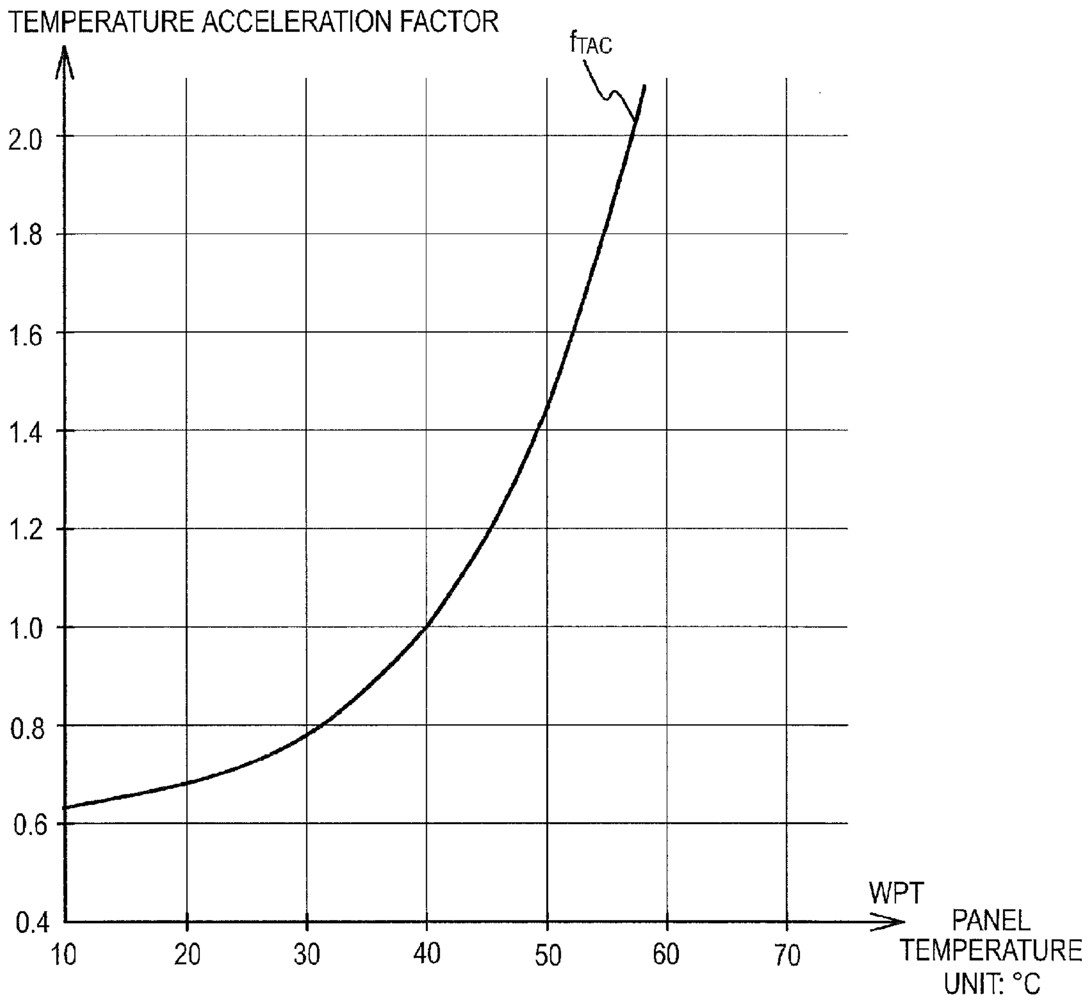
FIG. 30 is a graph schematically illustrating data stored in a temperature acceleration factor storage shown in FIG. 24.

FIG. 30 is a graph schematically illustrating data stored in the temperature acceleration factor storage 214 shown in FIG. 24.

The temperature acceleration factor storage 214 shown in FIG. 24 stores the functions $f_{TAC}$ representing the relationship indicated by the graph of FIG. 30 as a table in advance. This table shows the relationship between the temperature condition during operation of the organic electroluminescence display panel 20 and the acceleration factor, which is shown in FIG. 29.

FIG. 31 is a diagram schematically illustrating data stored in the accumulated reference operating time storage 115 shown in FIG. 24.

In the (Q−1)-th display frame, the reference operating time calculator 212 shown in FIG. 24 performs the reference operating time value calculating step on the basis of the video signal $VD_{Sig(n,\ m)\_Q\text{-}1}$, the duty ratio $DR_{Mode}$ during operation set on the basis of the duty ratio setting signal $dR_{Mode}$, and the temperature information $WPT_{\_Q\text{-}1}$ from the temperature sensor 220.

Specifically, the reference operating time calculator 212 calculates the function value $f_{CSC}(VD_{Sig(n,\ m)\_Q\text{-}1})$ with reference to the operating time conversion factor storage 113 on the basis of the video signal $VD_{Sig(n,\ m)\_Q\text{-}1}$. The reference operating time calculator 112 calculates the function value $f_{DRC}(DR_{Mode})$ with reference to the duty ratio acceleration factor storage 114 on the basis of the duty ratio $DR_{Mode}$ during operation. The function value $f_{TAC}(WPT_{\_Q\text{-}1})$ is calculated with reference to the temperature acceleration factor storage 214 on the basis of the temperature information $WPT_{\_Q\text{-}1}$. The calculation of the reference operating time$=T_F\cdot f_{DRC}(DR_{Mode})\cdot f_{CSC}(VD_{Sig(n,\ m)_Q\text{-}1})\cdot f_{TAC}(WPT_{_Q\text{-}1})$ is performed for the (Q−1)-th display frame.

The accumulated reference operating time storage 115 performs the accumulated reference operating time storing step of storing the accumulated reference operating time value which is obtained by accumulating the reference operating time value calculated by the reference operating time calculator 112 for each display element 10.

Specifically, in the (Q−1)-th display frame, the accumulated reference operating time storage 115 adds the reference operating time in the (Q−1)-th display frame to the previous data $SP(n, m)_{\_Q\text{-}2}$. Specifically, the calculation of $SP(n, m)_{\_Q\text{-}1}=SP(n, m)_{\_Q\text{-}2}+T_F\cdot f_{DRC}(DR_{Mode})\cdot f_{CSC}(VD_{Sig(n,\ m)\_Q\text{-}1})\cdot f_{TAC}(WPT_{\_Q\text{-}1})$ is performed. Accordingly, the accumulated reference operating time value which is obtained by accumulating the reference operating time value calculated by the reference operating time calculator 112 for each display element 10 is stored in the accumulated reference operating time storage 115.

The gradation correction value holder 116 performs the gradation correction value storing step of storing the correction value of the gradation value corresponding to each display element 10 and the video signal generator 111 performs a video signal generating step of correcting the gradation value of the input signal $vD_{Sig}$ corresponding to each display element 10 on the basis of the correction value of the gradation value and outputting the corrected input signal as a video signal $VD_{Sig}$. These steps are the same as described in Example 1 and thus will not be repeatedly described.

The compensation of the burn-in in the display apparatus 2 has been described in detail above. According to Example 2, since the burn-in is compensated so as to reflect the history of the temperature condition during operation in addition to the duty ratio of the emission period, it is possible to display an image with higher quality.

It has been stated above that the display apparatus 2 is a monochrome display apparatus, but a color display apparatus may be used. In this case, for example, when the tendency of the temporal variation of a display element 10 varies depending on emission colors, the operating time conversion factor storage 113, the duty ratio acceleration factor storage 114, the temperature acceleration factor storage 214, and the reference curve storage 117 shown in FIG. 2 have only to be individually provided for each emission color.

The details of the operation except for the burn-in compensation of the (n, m)-th display element 10 will be described below with reference to FIG. 32, FIGS. 33A and 33B, FIGS. 34A and 34B, FIGS. 35A and 35B, FIGS. 36A and 36B, FIGS. 37A and 37B, and FIG. 38. In the drawings or the following description, for purposes of ease of expanation, the video signal voltage $V_{Sig(n,\ m)}$ corresponding to the (n, m)-th display element 10 is defined as $V_{Sig\_m}$.

Figure 33A:
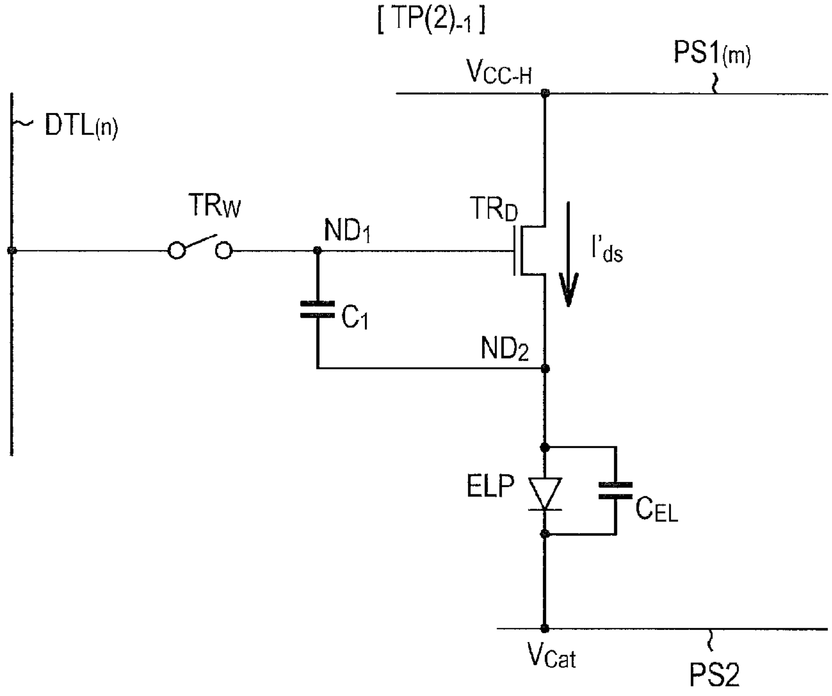
FIGS. 33A and 33B are diagrams schematically illustrating ON/OFF states of transistors in a driving circuit of a display element.

[Period $TP(2)_{-1}$] (see FIGS. 32 and 33A)

Period $TP(2)_{-1}$ indicates, for example, the operation in the previous display frame and is a period of time in which the (n, m)-th display element 10 is in an emission state after the previous processes are ended. That is, a drain current $I_{ds}$' based on Expression 5' flows in the light-emitting portion ELP of the display element 10 of the (n, m)-th pixel and the luminance of the display element 10 of the (n, m)-th pixel has a value corresponding to the drain current $I_{ds}$'. Here, the writing transistor $TR_W$ is in the OFF state and the driving transistor $TR_D$ is in the ON state. The emission state of the (n, m)-th display element 10 is maintained just before the horizontal scanning period of the display elements 10 in the (m+m')-th row is started.

As described above, the data line $DTL_n$ is supplied with the reference voltage $V_{Ofs}$ and the video signal voltage $V_{Sig}$ to correspond to the respective horizontal scanning periods. However, the writing transistor $TR_W$ is in the OFF state. Accordingly, even when the potential (voltage) of the data line $DTL_n$ varies in period $TP(2)_{-1}$, the potentials of the first node $ND_1$ and the second node $ND_2$ do not vary (a potential variation due to the capacitive coupling of a parasitic capacitor or the like may be caused in practice but can be neglected in general). The same is true in period $TP(2)_0$.

Periods $TP(2)_0$ to $TP(2)_6$ shown in FIG. 32 are operation periods just before the next writing process is performed after the previous processes are ended and the emission state is then ended. In periods $TP(2)_0$ to $TP(2)_7$, the (n, m)-th display element 10 is in the non-emission state. As shown in FIG. 32, period $TP(2)_5$, period $TP(2)_6$, and period $TP(2)_7$ are included in the m-th horizontal scanning period $H_m$.

In Periods $TP(2)_3$ and $TP(2)_5$, in a state where the reference voltage $V_{Ofs}$ is applied to the gate electrode of the driving transistor $TR_D$ from the data line $DTL_n$ via the writing transistor $TR_W$ turned on by the scanning signal from the scanning line SCL, the threshold voltage cancelling process of applying the driving voltage $V_{CC\text{-}H}$ to the other source/drain region of the driving transistor $TR_D$ from the power supply line PS1 and thus causing the potential of the other source/drain region of the driving transistor $TR_D$ to get close to the potential obtained by subtracting the threshold voltage of the driving transistor $TR_D$ from the reference voltage $V_{Ofs}$ is performed.

In Example 1 or Example 2, it is stated that the threshold voltage cancelling process is performed in plural horizontal scanning periods, that is, in the (m−1)-th horizontal scanning period $H_{m-1}$ and the m-th horizontal scanning period $H_m$, which do not limit the present disclosure.

In period $TP(2)_1$, the initializing voltage $V_{CC\text{-}L}$ the difference of which from the reference voltage $V_{Ofs}$ is greater than the threshold voltage of the driving transistor $TR_D$ is applied to one source/drain region of the driving transistor from the power supply line PS1 and the reference voltage $V_{Ofs}$ is applied to the gate electrode of the driving transistor $TR_D$ from the data line DTL via the writing transistor $TR_W$ turned on by the scanning signal from the scanning line $SCL_m$, whereby the potential of the gate electrode of the driving transistor $TR_D$ and the potential of the other source/drain region of the driving transistor $TR_D$ are initialized.

In FIG. 32, it is assumed that period $TP(2)_1$ corresponds to a reference voltage period (a period in which the reference voltage $V_{Ofs}$ is applied to the data line DTL) in the (m−2)-th horizontal scanning period $H_{m-2}$, period $TP(2)_8$ corresponds to the reference voltage period in the (m−1)-th horizontal scanning period $H_{m-1}$, and period $TP(2)_5$ corresponds to the reference voltage period in the m-th horizontal scanning period $H_m$.

The operations in periods $TP(2)_0$ to period $TP(2)_8$ will be described below with reference to FIG. 32 and the like.

Figure 33B:
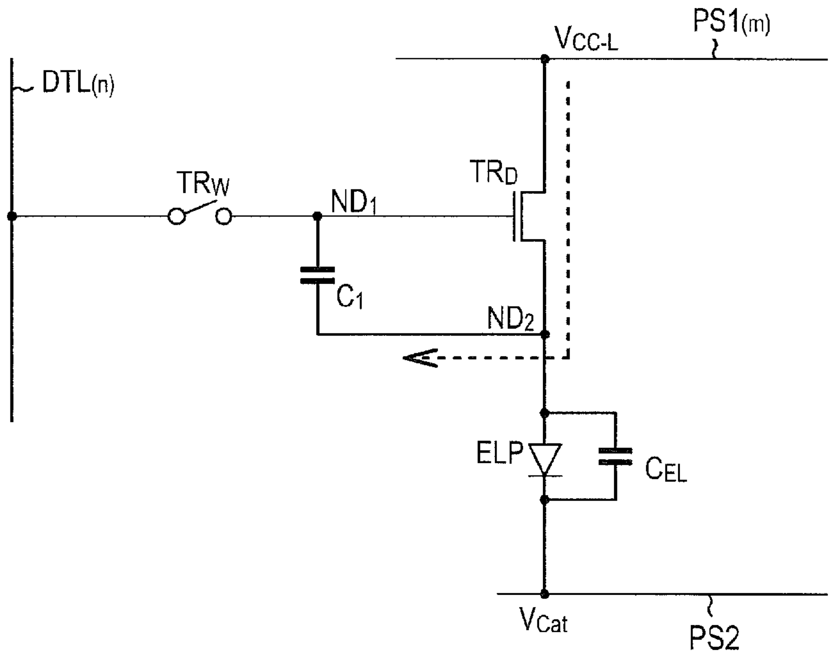

[Period $TP(2)_0$] (see FIGS. 32 and 33B)

The operation in period $TP(2)_0$ is an operation, for example, from the previous display frame to the present display frame. That is, period $TP(2)_0$ is a period from the start of the (m+m')-th horizontal scanning period $H_{m+m'}$ in the previous display frame to the end of the (m−3)-th horizontal scanning period in the present display frame. In period $TP(2)_0$, the (n, m)-th display element 10 is basically in the non-emission state. At the start of period $TP(2)_0$, the voltage supplied from the power supply unit 100 to the power supply line $\mathbf{PS1}_m$ is changed from the driving voltage $V_{CC\text{-}H}$ to the initializing voltage $V_{CC\text{-}L}$. As a result, the potential of the second node $ND_2$ is lower to $V_{CC\text{-}L}$ and a backward voltage is applied across the anode electrode and the cathode electrode of the light-emitting portion ELP, whereby the light-emitting portion ELP is changed to the non-emission state. The potential of the first node $ND_1$ (the gate electrode of the driving transistor $TR_D$) in a floating state is lowered to follow the lowering in potential of the second node $ND_2$.

Figure 34A:
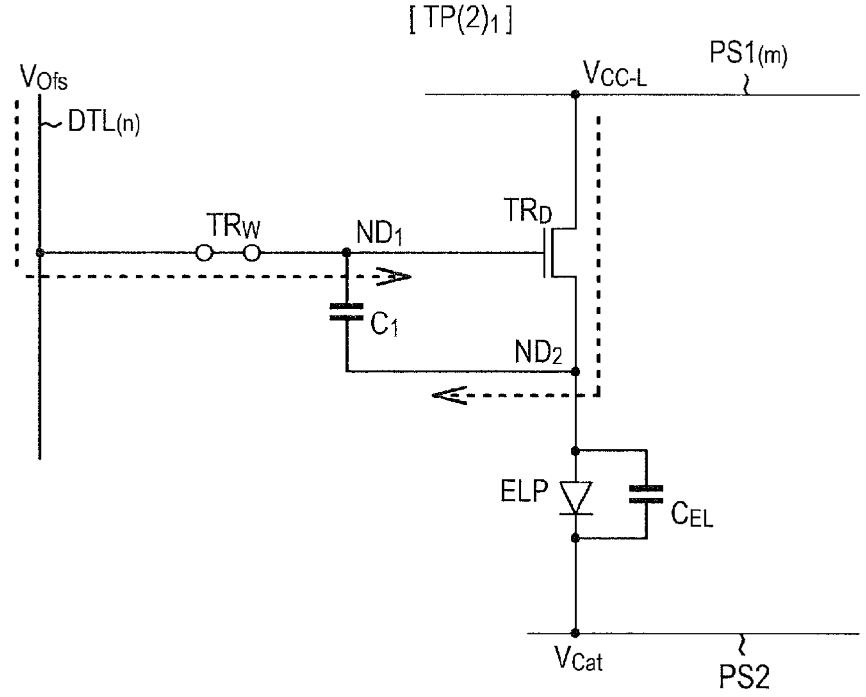
FIGS. 34A and 34B are diagrams schematically illustrating the ON/OFF states of the transistors in the driving circuit of the display element subsequently to FIG. 33B.

[Period $TP(2)_1$] (see FIGS. 32 and 34A)

The (m−2)-th horizontal scanning period $H_{m-2}$ in the present display frame is started. In period $TP(2)_1$, the scanning line $SCL_m$ is changed to a high level and the writing transistor $TR_W$ of the display element 10 is changed to the ON state. The voltage supplied from the signal output circuit 102 to the data line $DTL_n$ is the reference voltage $V_{Ofs}$. As a result, the potential of the first node $ND_1$ is $V_{Ofs}$ (0 volts). Since the initializing voltage $V_{CC\text{-}L}$ is applied to the second node $ND_2$ from the power supply line $\mathbf{PS1}_m$ by the operation of the power supply unit 100, the potential of the second node $ND_2$ is kept at $V_{CC\text{-}L}$ (−10 volts).

Since the potential difference between the first node $ND_1$ and the second node $ND_2$ is 10 volts and the threshold voltage $V_{th}$ of the driving transistor $TR_D$ is 3 volts, the driving transistor $TR_D$ is in the ON state. The potential difference between the second node $ND_2$ and the cathode electrode of the light-emitting portion ELP is −10 volts, which is not greater than the threshold voltage $V_{th\text{-}EL}$ of the light-emitting portion ELP. Accordingly, the potential of the first node $ND_1$ and the potential of the second node $ND_2$ are initialized.

Figure 34B:
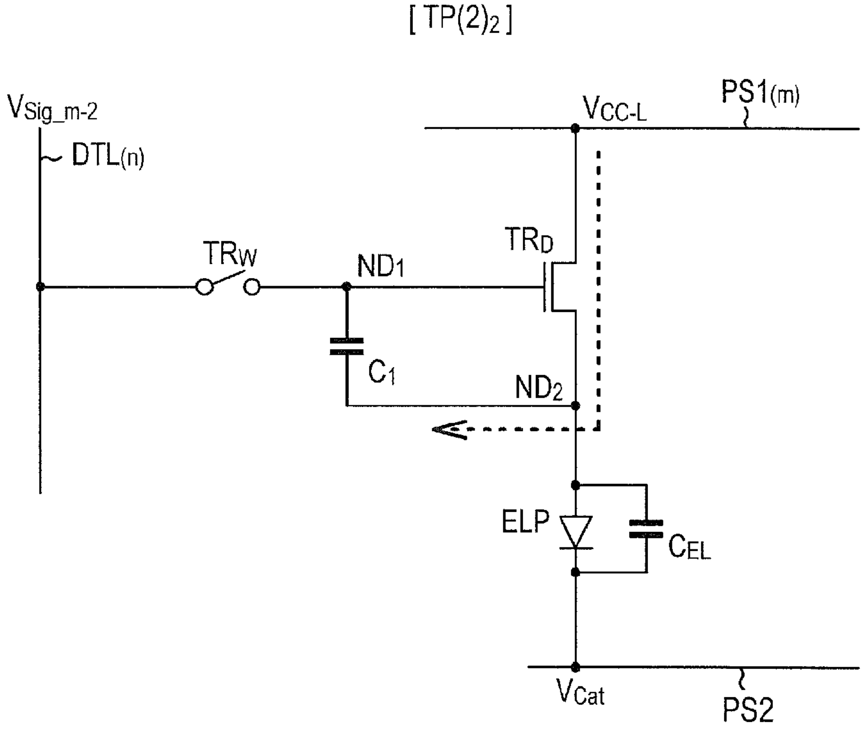

[Period $TP(2)_2$] (see FIGS. 32 and 34B)

In period $TP(2)_2$, the scanning line $SCL_m$ is changed to a low level. The writing transistor $TR_W$ of the display element 10 is changed to the OFF state. The potentials of the first node $ND_1$ and the second node $ND_2$ are basically maintained in the previous state.

Figure 35A:
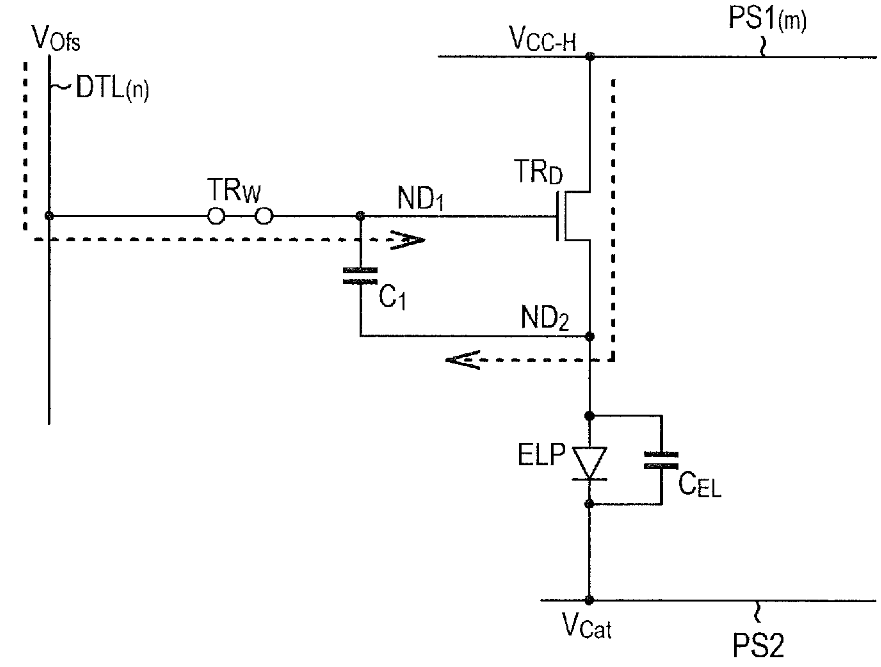
FIGS. 35A and 35B are diagrams schematically illustrating the ON/OFF states of the transistors in the driving circuit of the display element subsequently to FIG. 34B.

[Period $TP(2)_3$] (see FIGS. 32 and 35A)

In period $TP(2)_3$, the first threshold voltage cancelling process is performed. The scanning line $SCL_m$ is changed to a high level to turn on the writing transistor $TR_W$ of the display element 10. The voltage supplied from the signal output circuit 102 to the data line $DTL_n$ is the reference voltage $V_{Ofs}$. The potential of the first node $ND_1$ is $V_{Ofs}$ (0 volts).

The voltage supplied from the power supply unit 100 to the power supply line $\mathbf{PS1}_m$ is switched from the voltage $V_{CC\text{-}L}$ to the driving voltage $V_{CC\text{-}H}$. As a result, the potential of the first node $ND_1$ is not changed ($V_{Ofs}$=0 is maintained) but the potential of the second node $ND_2$ is changed to the potential obtained by subtracting the threshold voltage $V_{th}$ of the driving transistor $TR_D$ from the reference voltage $V_{Ofs}$. That is, the potential of the second node $ND_2$ is raised.

When period $TP(2)_3$ is sufficiently long, the potential difference between the gate electrode and the other source/drain region of the driving transistor $TR_D$ reaches $V_{th}$ and the driving transistor $TR_D$ is changed to the OFF state. That is, the potential of the second node $ND_2$ gets close to $(V_{Ofs}-V_{th})$ and finally becomes $(V_{Ofs}-V_{th})$. In the example shown in FIG. 32, however, the length of period $TP(2)_3$ is insufficient to change the potential of the second node $ND_2$ and the potential of the second node $ND_2$ reaches a certain potential $V_1$ satisfying the relation of $V_{CC\text{-}L}<V_1<(V_{Ofs}-V_{th})$ at the end of period $TP(2)_3$.

Figure 35B:
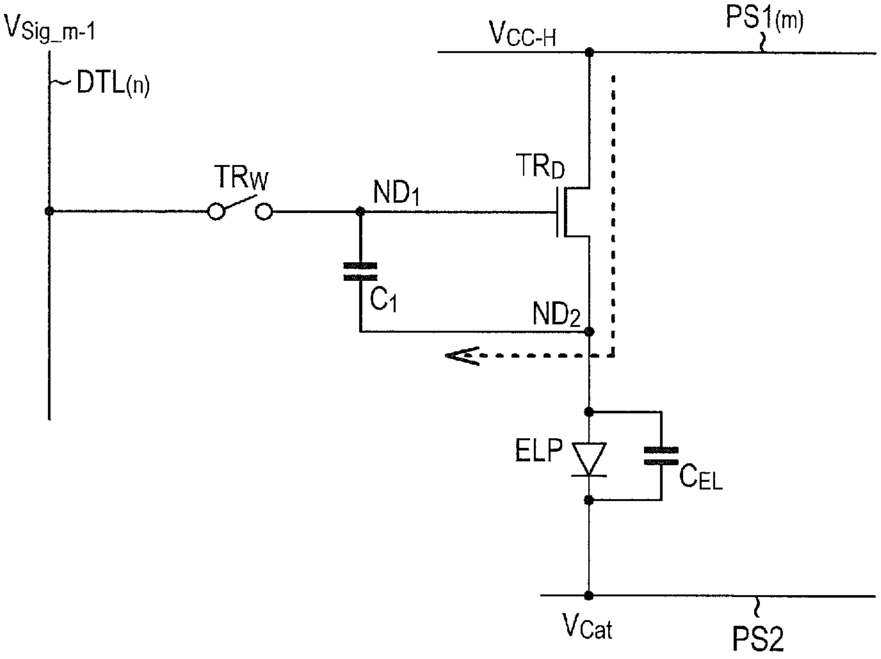

[Period $TP(2)_4$] (see FIGS. 32 and 35B)

In period $TP(2)_4$, the scanning line $SCL_m$ is changed to the low level to turn off the writing transistor $TR_W$ of the display element 10. As a result, the first node $ND_1$ is in the floating state.

Since the driving voltage $V_{CC\text{-}H}$ is applied to one source/drain region of the driving transistor $TR_D$ from the power supply unit 100, the potential of the second node $ND_2$ rises from the potential $V_1$ to a certain potential $V_2$. On the other hand, since the gate electrode of the driving transistor $TR_D$ is in the floating state and the capacitor $C_1$ is present, a bootstrap operation occurs in the gate electrode of the driving transistor $TR_D$. Accordingly, the potential of the first node $ND_1$ rises to follow the potential variation of the second node $ND_2$.

As the premise of the operation in period $TP(2)_5$, the potential of the second node $ND_2$ should be lower than $(V_{Ofs}-V_{th})$ at the start of period $TP(2)_5$. The length of period $TP(2)_4$ is basically determined so as to satisfy the condition of $V_2<(V_{Ofs\text{-}L}-V_{th})$.

Figure 36A:
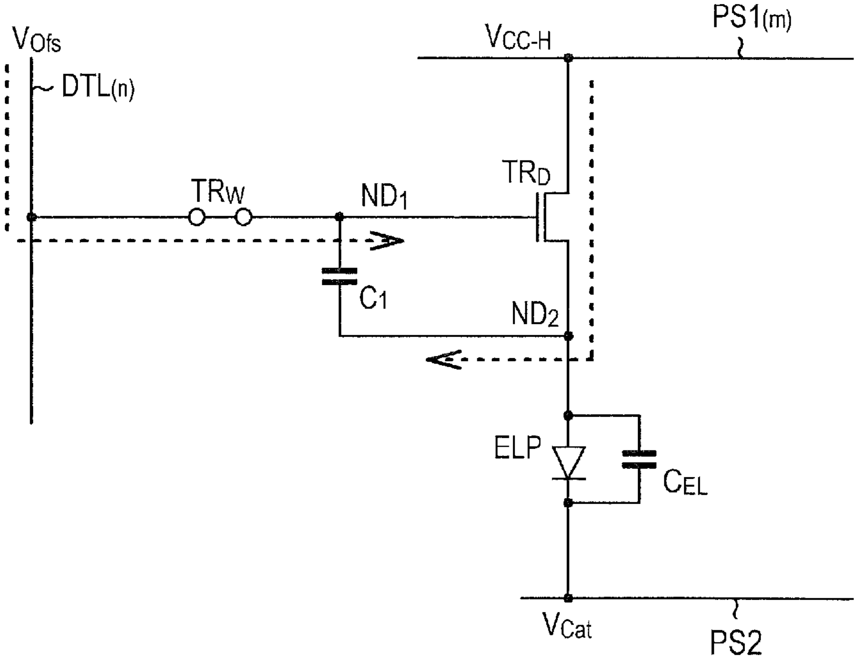
FIGS. 36A and 36B are diagrams schematically illustrating the ON/OFF states of the transistors in the driving circuit of the display element subsequently to FIG. 35B.
Figure 36B:
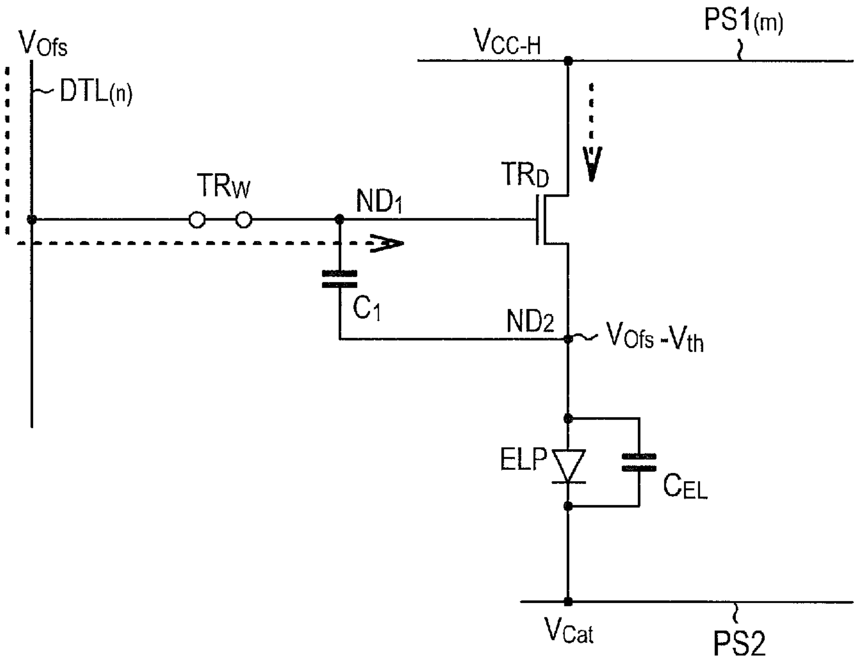

[Period $TP(2)_5$] (see FIG. 32 and FIGS. 36A and 36B)

In period $TP(2)_5$, the second threshold voltage cancelling process is performed. The writing transistor $TR_W$ of the display element 10 is turned on by the scanning signal from the scanning line $SCL_m$. The voltage supplied from the signal output circuit 102 to the data line $DLT_n$ is the reference voltage $V_{Ofs}$. The potential of the first node $ND_1$ is returned again to $V_{Ofs}$ (0 volts) from the potential rising due to the bootstrap operation (see FIG. 36A).

Here, the value of the capacitor $C_1$ is represented by $c_1$ and the value of the capacitor $C_{EL}$ of the light-emitting portion ELP is represented by $c_{ED}$. The value of the parasitic capacitor between the gate electrode of the driving transistor $TR_D$ and the other source/drain region is represented by $c_{gs}$. When the capacitance between the first node $ND_1$ and the second node $ND_2$ is represented by reference sign $c_A$, $c_A=c_1-c_{gs}$ is established. When the capacitance between the second node $ND_2$ and the second power supply line PS2 is represented by reference sign $c_E$, $c_D=c_{EL}$ is established. An additional capacitor may be connected in parallel to both ends of the light-emitting portion ELP, but in this case, the capacitance of the additional capacitor is added to the $c_B$.

When the potential of the first node $ND_1$ varies, the potential difference between the first node $ND_1$ and the second node $ND_2$ varies. That is, charges based on the potential variation of the first node $ND_1$ are distributed on the basis of the capacitance between the first node $ND_1$ and the second node $ND_2$ and the capacitance between the second node $ND_2$ and the second power supply line PS2. However, when the value $C_D$ ($=c_{EL}$) is sufficiently larger than the value $c_A$ ($=c_1+c_{gs}$), the potential variation of the second node $ND_2$ is small. In general, the value $c_{EL}$ of the capacitor $C_{EL}$ of the light-emitting portion ELP is larger than the value $c_1$ of the capacitor $C_1$ and the value $c_{gs}$ of the parasitic capacitor of the driving transistor $TR_D$. In the following description, the potential variation of the second node $ND_2$ caused by the potential variation of the first node $ND_1$ is not considered. In the driving timing diagram shown in FIG. 32, the potential variation of the second node $ND_2$ caused by the potential variation of the first node $ND_1$ is not considered.

Since the driving voltage $V_{CC\text{-}H}$ is applied to one source/drain region of the driving transistor $TR_D$ from the power supply unit 100, the potential of the second node $ND_2$ varies to the potential obtained by subtracting the threshold voltage $V_{th}$ of the driving transistor $TR_D$ from the reference voltage $V_{Ofs}$. That is, the potential of the second node $ND_2$ rises from the potential $V_2$ and varies to the potential obtained by subtracting the threshold voltage $V_{th}$ of the driving transistor $TR_D$ from the reference voltage $V_{Ofs}$. When the potential difference between the gate electrode of the driving transistor $TR_D$ and the other source/drain region reaches $V_{th}$, the driving transistor $TR_D$ is turned off (see FIG. 36B). In this state, the potential of the second node $ND_2$ is approximately $(V_{Ofs}-V_{th})$ Here, when Expression 2 is guaranteed, that is, when the potential is selected and determined to satisfy Expression 2, the light-emitting portion ELP does not emit light.

$$(V_{Ofs}-V_{th})<(V_{th\text{-}EL}+V_{Cat}) \quad (2)$$

In period $TP(2)_5$, the potential of the second node $ND_2$ finally reaches $(V_{Ofs}-V_{th})$. That is, the potential of the second node $ND_2$ is determined depending on only the threshold voltage $V_{th}$ of the driving transistor $TR_D$ and the reference voltage $V_{Ofs}$. The potential of the second node $ND_2$ is independent of the threshold voltage $V_{th\text{-}EL}$ of the light-emitting portion ELP. At the end of period $TP(2)_5$, the writing transistor $TR_W$ is changed from the ON state to the OFF state on the basis of the scanning signal from the scanning line $SCL_m$.

Figure 37A:
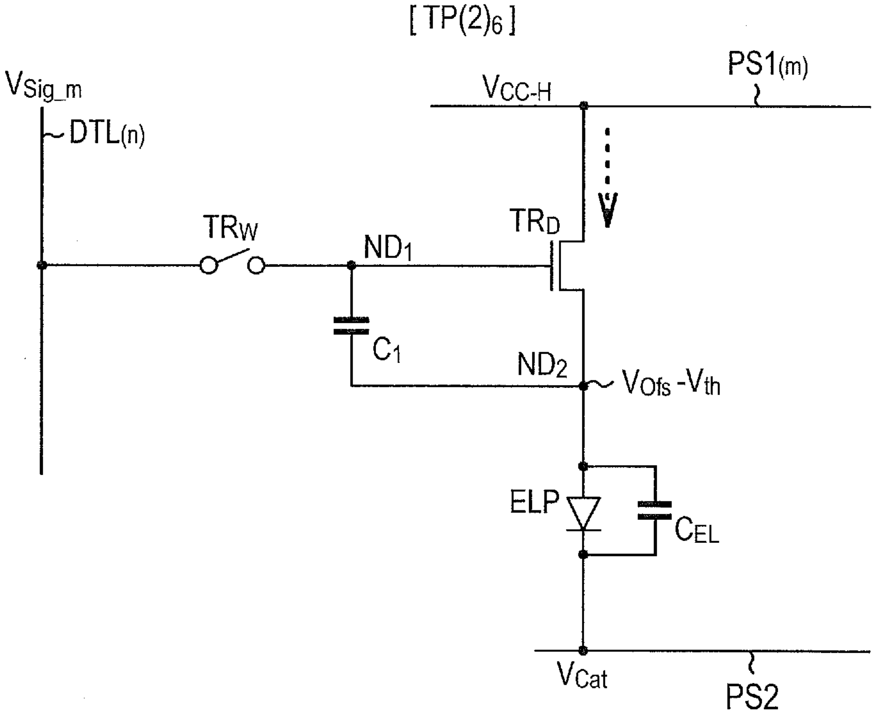
FIGS. 37A and 37B are diagrams schematically illustrating the ON/OFF states of the transistors in the driving circuit of the display element subsequently to FIG. 36B.

[Period $TP(2)_6$] (see FIGS. 32 and 37A)

In the state where the writing transistor $TR_W$ is maintained in the OFF state, the video signal voltage $V_{Sig\_m}$ instead of the reference voltage $V_{Ofs}$ is supplied to an end of the data line $DTL_n$ from the signal output circuit 102. When the driving transistor $TR_D$ is in the OFF state in period $TP(2)_5$, the potentials of the first node $ND_1$ and the second node $ND_2$ do not vary in practice (a potential variation due to the capacitive coupling of a parasitic capacitor or the like may be caused in practice but can be neglected in general). When the driving transistor $TR_D$ does not reach the OFF state in the threshold voltage cancelling process performed in period $TP(2)_5$, the bootstrap operation is caused in period $TP(2)_6$ and thus the potentials of the first node $ND_1$ and the second node $ND_2$ slightly rise.

Figure 37B:
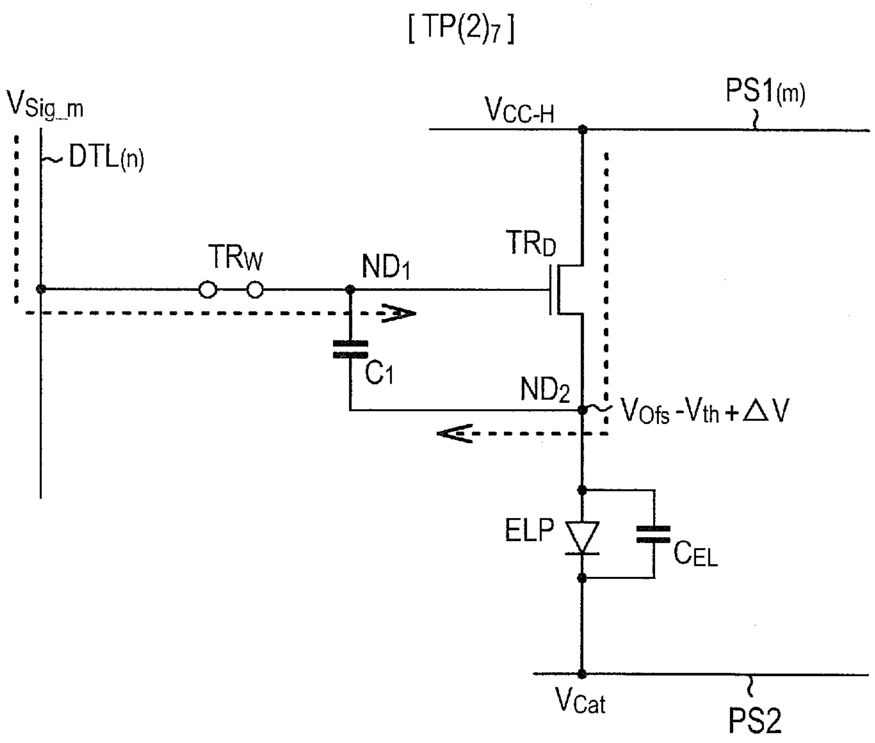

[Period $TP(2)_7$] (see FIGS. 32 and 37B)

In period $TP(2)_7$, the writing transistor $TR_W$ of the display element 10 is changed to the ON state by the scanning signal from the scanning line $SCL_m$. The video signal voltage $V_{Sig\_m}$ is applied to the gate electrode of the writing transistor $TR_W$ from the driving transistor $DTL_n$.

In the above-mentioned writing process, in the state where the driving voltage $V_{CC\text{-}H}$ is applied to one source/drain region of the driving transistor $TR_D$ from the power supply unit 100, the video signal voltage $V_{Sig}$ is applied to the gate electrode of the driving transistor $TR_D$. Accordingly, as shown in FIG. 32, the potential of the second node $ND_2$ in the display element 10 varies in period $TP(2)_7$. Specifically, the potential of the second node $ND_2$ rises. The increment of the potential is represented by reference sign ΔV.

When the potential of the gate electrode (the first node $ND_1$) of the driving transistor $TR_D$ is represented by $V_g$ and the potential of the other source/drain region (the second node $ND_2$) of the driving transistor $TR_D$ is represented by $V_s$, the value of $V_g$ and the value of $V_s$ are as follows without considering the rising of the potential of the second node $ND_2$. The potential difference between the first node $ND_1$ and the second node $ND_2$, that is, the potential difference $V_{gs}$ between the gate electrode of the driving transistor $TR_D$ and the other source/drain region serving as a source region can be expressed by Expression 3.

$$V_g = V_{Sig\_m}$$

$$V_s \approx V_{Ofs} - V_{th}$$

$$V_{gs} \approx V_{Sig\_m} - (V_{Ofs} - V_{th}) \quad (3)$$

That is, $V_{gs}$ obtained in the writing process on the driving transistor $TR_D$ depends on only the video signal voltage $V_{Sig\_m}$ used to control the luminance of the light-emitting portion ELP, the threshold voltage $V_{th}$ of the driving transistor $TR_D$, and the reference voltage $V_{Ofs}$. $V_{gs}$ is independent of the threshold voltage $V_{th\text{-}EL}$ of the light-emitting portion ELP.

The increment (ΔV) of the potential of the second node $ND_2$ will be described below. In the driving method according to Example 1 or Example 2, the writing process is performed in the state where the driving voltage $V_{CC\text{-}H}$ is applied to one source/drain region of the driving transistor $TR_D$ of the display element 10. Accordingly, a mobility correcting process of changing the potential of the other source/drain region of the driving transistor $TR_D$ of the display element 10 is performed together.

When the driving transistor $TR_D$ is constructed by a thin film transistor or the like, it is difficult to avoid the unevenness in mobility μ between transistors. Accordingly, even when the video signal voltages $V_{Sig}$ having the same value are applied to the gate electrodes of plural driving transistors $TR_D$ having the unevenness in mobility μ, the drain current $I_{ds}$ flowing in a driving transistor $TR_D$ having large mobility μ and the drain current $I_{ds}$ flowing in a driving transistor $TR_D$ having small mobility μ have a difference. When such a difference occurs, the screen uniformity of the display apparatus 1 is damaged.

In the above-mentioned driving method, the video signal voltage $V_{Sig}$ is applied to the gate electrode of the driving transistor $TR_D$ in the state where one source/drain region of the driving transistor $TR_D$ is supplied with the driving voltage $V_{CC\text{-}H}$ from the power supply unit 100. Accordingly, as shown in FIG. 32, the potential of the second node $ND_2$ rises in the writing process. When the mobility μ of the driving transistor $TR_D$ is great, the increment ΔV (potential correction value) of the potential (that is, the potential of the second node $ND_2$) in the other source/drain region of the driving transistor $TR_D$ increases. Conversely, when the value of the mobility μ of the driving transistor $TR_D$ is small, the increment ΔV of the potential in the other source/drain region of the driving transistor $TR_D$ decreases. Here, the potential difference $V_{gs}$ between the gate electrode of the driving transistor $TR_D$ and the other source/drain region serving as a source region is modified from Expression 3 to Expression 4.

$$V_{gs} \approx V_{Sig\_m} - (V_{Ofs} - V_{th}) - \Delta V \quad (4)$$

The length of the scanning signal period in which the video signal voltage $V_{Sig}$ is written can be determined depending on the design of the display element 10 or the display apparatus 1. It is assumed that the length of the scanning signal period is determined so that the potential ($V_{Ofs} - V_{th} + \Delta V$) in the other source/drain region of the driving transistor $TR_D$ at that time satisfies Expression 2'.

In the display element 10, the light-emitting portion ELP does not emit light in period $TP(2)_7$. By this mobility correcting process, the deviation of the coefficient k (≡(½)·(W/L)·$C_{ox}$) is simultaneously performed.

$$(V_{Ofs} - V_{th} + \Delta V) < (V_{th\text{-}EL} + V_{cat}) \quad (2')$$

Figure 38:
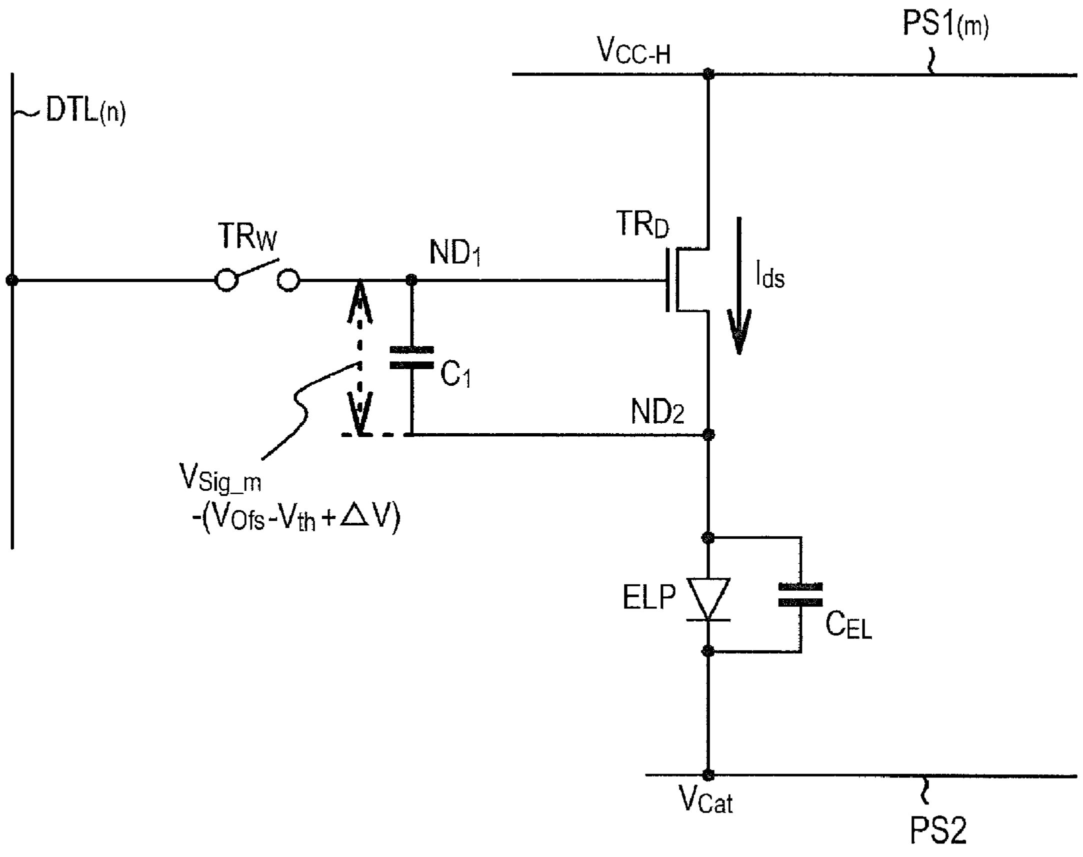
FIG. 38 is a diagram schematically illustrating the ON/OFF states of the transistors in the driving circuit of the display element subsequently to FIG. 37B.

[Period $TP(2)_8$] (see FIGS. 32 and 38)

The state where one source/drain region of the driving transistor $TR_D$ is supplied with the driving voltage $V_{CC\text{-}H}$ from the power supply unit 100 is maintained. In the display apparatus 10, the voltage corresponding to the video signal voltage $V_{Sig\_m}$ is stored in the capacitor $C_1$ by the writing process. Since the supply of the scanning signal from the scanning line is ended, the writing transistor $TR_W$ is turned off. Accordingly, by stopping the application of the video signal voltage $V_{Sig\_m}$ to the gate electrode of the driving transistor $TR_D$, a current corresponding to the value of the voltage stored in the capacitor $C_1$ by the writing process flows in the light-emitting portion ELP via the driving transistor $TR_D$, whereby the light-emitting portion ELP emits light.

The operation of the display element 10 will be described below in more detail. The state where the driving voltage $V_{CC\text{-}H}$ is applied to one source/drain region of the driving transistor $TR_D$ from the power supply unit 100 is maintained and the first node $ND_1$ is electrically separated from the data line $DLT_n$. Accordingly, the potential of the second node $ND_2$ rises as a result.

As described above, since the gate electrode of the driving transistor $TR_D$ is in the floating state and the capacitor $C_1$ is present, the same phenomenon as occurring in a so-called bootstrap circuit occurs in the gate electrode of the driving transistor $TR_D$ and the potential of the first node $ND_1$ also rises. As a result, the potential difference $V_{gs}$ between the gate electrode of the driving transistor $TR_D$ and the other source/drain region serving as a source region is maintained as the value expressed by Expression 4.

Since the potential of the second node $ND_2$ rises and becomes greater than ($V_{th\text{-}EL} + V_{cat}$), the light-emitting portion ELP starts its emission of light. At this time, since the current flowing in the light-emitting portion ELP is the drain current $I_{ds}$ flowing from the drain region to the source region of the driving transistor $TR_D$, the current can be expressed by Expression 1. Here, In Expressions 1 and 4, Expression 1 can be modified into Expression 5.

$$I_{ds} = k \cdot \mu \cdot (V_{Sig\_m} - V_{Ofs} - \Delta V)^2 \quad (5)$$

Therefore, when the reference voltage $V_{Ofs}$ is set to 0 volts, the current $I_{ds}$ flowing in the light-emitting portion ELP is proportional to the square of the value obtained by subtracting the value of the potential correction value ΔV based on the mobility μ of the driving transistor $TR_D$ from the value of the video signal voltage $V_{Sig\_m}$ used to control the luminance of the light-emitting portion ELP. In other words, the current $I_{ds}$ flowing in the light-emitting portion ELP does not depend on the threshold voltage $V_{th\text{-}EL}$ of the light-emitting portion ELP and the threshold voltage $V_{th}$ of the driving transistor $TR_D$. That is, the emission intensity (luminance) of the light-emitting portion ELP is not affected by the threshold voltage $V_{th\text{-}EL}$ of the light-emitting portion ELP and the threshold voltage $V_{th}$ of the driving transistor $TR_D$. The luminance of the (n, m)-th display element 10 has a value corresponding to the current $I_{ds}$.

In addition, as the mobility μ of the driving transistor $TR_D$ becomes greater, the potential correction value ΔV increases and thus the value of the left side $V_{gs}$ of Expression 4 decreases. Accordingly, in Expression 5, since the value of $(V_{Sig\_m} - V_{Ofs} - \Delta V)^2$ decreases as the value of the mobility μ increases, the unevenness of the drain current $I_{ds}$ due to the unevenness (unevenness in k) of the mobility μ of the driving transistor $TR_D$ can be corrected. As a result, it is possible to correct the unevenness of luminance of the light-emitting portion ELP due to the unevenness (and the unevenness in k) of the mobility μ.

The emission state of the light-emitting portion ELP is maintained to the (m+m'−1)-th horizontal scanning period. The end of the (m+m'−1)-th horizontal scanning period corresponds to the end of period $TP(2)_{-1}$. Here, "m'" satisfies the relation of 1<m'<M and is a value predetermined in the display apparatus 1. In other words, the light-emitting portion ELP is driven from the start of period $TP(2)_8$ to just before the (m+m')-th horizontal scanning period $H_{m+m'}$ and this period serves as the emission period.

While the present disclosure has been described with reference to the preferable examples, the present disclosure is not limited to the examples. The configuration of structure of the display apparatus, the steps of the method of manufacturing the display apparatus, and the steps of the method of driving the display apparatus, which are described herein, are only examples and can be appropriately modified.

For example, it has been stated in Example 1 or Example 2 that the driving transistor $TR_D$ is of an n-channel type. However, when the driving transistor $TR_D$ is of a p-channel type, the anode electrode and the cathode electrode of the light-emitting portion ELP have only to be exchanged. In this configuration, since the direction in which the drain current flows is changed, the value of the voltage supplied to the power supply line PS1 or the like can be appropriately changed.

As shown in FIG. 39, the driving circuit 11 of the display element 10 may include a transistor (first transistor $TR_1$) connected to the first node $ND_1$. In the first transistor $TR_1$, one source/drain region is supplied with the reference voltage $V_{Ofs}$ and the other source/drain region is connected to the first node $ND_1$. A control signal from a first-transistor control circuit 103 is applied to the gate electrode of the first transistor $TR_1$ via a first-transistor control line AZ1 to control the ON/OFF state of the first transistor $TR_1$. Accordingly, it is possible to set the potential of the first node $ND_1$.

The driving circuit 11 of the display element 10 may include another transistor in addition to the first transistor $TR_1$. FIG. 40 shows a configuration in which a second transistor $TR_2$ and a third transistor $TR_3$ are additionally provided. In the second transistor $TR_2$, one source/drain region is supplied with the initializing voltage $V_{CC-L}$ and the other source/drain region is connected to the second node $ND_2$. A control signal from a second-transistor control circuit 104 is applied to the gate electrode of the second transistor $TR_2$ via a second-transistor control line AZ2 to control the ON/OFF state of the second transistor $TR_2$. Accordingly, it is possible to initialize the potential of the second node $ND_2$. The third transistor $TR_3$ is connected between one source/drain region of the driving transistor $TR_D$ and the power supply line PS1, and a control signal from a third-transistor control circuit 105 is applied to the gate electrode of the third transistor $TR_3$ via a third-transistor control line AZ3.

The present disclosure contains subject matter related to that disclosed in Japanese Priority Patent Application JP 2010-279002 filed in the Japan Patent Office on Dec. 15, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:

a display panel that includes display elements having a current-driven light-emitting portion, in which the display elements are arranged in a two-dimensional matrix in a first direction and a second direction, and that displays an image on the basis of a video signal; and a luminance correcting unit that corrects the luminance of the display elements when displaying an image on the display panel by correcting a gradation value of an input signal and outputting the corrected input signal as the video signal, wherein the luminance correcting unit includes a reference operating time calculator that calculates the value of a reference operating time in which a temporal variation in luminance of each display element when the corresponding display element operates for a predetermined unit time on the basis of the video signal in a state where the duty ratio of an emission period is set to a certain duty ratio is equal to a temporal variation in luminance of each display element when it is assumed that the corresponding display element operates on the basis of the video signal of a predetermined reference gradation value in a state where the duty ratio of the emission period is set to a predetermined reference duty ratio, an accumulated reference operating time storage that stores an accumulated reference operating time value obtained by accumulating the value of the reference operating time calculated by the reference operating time calculator for each display element, a reference curve storage that stores a reference curve representing the relationship between the operating time of each display element and the temporal variation in luminance of the corresponding display element when the corresponding display element operates on the basis of the video signal of the predetermined reference gradation value in the state where the duty ratio of the emission period is set to the predetermined reference duty ratio, a gradation correction value holder that calculates a correction value of a gradation value used to compensate for the temporal variation in luminance of each display element with reference to the accumulated reference operating time storage and the reference curve storage and that holds the correction value of the gradation value corresponding to the respective display elements, and a video signal generator that corrects the gradation value of the input signal corresponding to the respective display elements on the basis of the correction values of the gradation values held by the gradation correction value holder and that outputs the corrected input signal as the video signal.

2. The display apparatus according to claim 1, wherein the luminance correcting unit further includes:

an operating time conversion factor storage that stores as an operating time conversion factor the ratio of the value of the operating time until the temporal variation in luminance reaches a certain value by causing each display element to operate on the basis of the video signal of the gradation values in the state where the duty ratio of the emission period is set to the predetermined reference duty ratio and the value of the operating time until the temporal variation in luminance reaches the certain value by causing each display element to operate on the basis of the video signal of the predetermined reference gradation value in the state where the duty ratio of the emission period is set to the predetermined reference duty ratio; and a duty ratio acceleration factor storage that stores the ratio of a second operating time conversion factor and an operating time conversion factor as a duty ratio acceleration factor when the ratio of the value of the operating time until the temporal variation in luminance reaches a certain value by causing each display element to operate on the basis of the video signal of the gradation values in the state where the duty ratio of the emission period is set to the duty ratio different from the predetermined reference duty ratio and the value of the operating time until the temporal variation in luminance reaches the certain value by causing each display element to operate on the basis of the video signal of the predetermined reference gradation value in the state where the duty ratio of the emission period is set to the predetermined reference duty ratio is defined as the second operating time conversion factor, and wherein the reference operating time calculator calculates the value of the reference operating time by referring to the value stored in the operating time conversion factor storage to correspond to the gradation value of the video signal and the value stored in the duty ratio acceleration factor storage to correspond to the duty ratio of the emission period during operation and multiplying the value of a unit time by the stored values.

3. The display apparatus according to claim 2, further comprising a temperature sensor, wherein the operating time conversion factor stored in the operating time conversion factor storage is an operating time conversion factor when each display element operates under a predetermined temperature condition, wherein the luminance correcting unit further includes a temperature acceleration factor storage that stores the ratio of a third operating time conversion factor and an operating time conversion factor as a temperature acceleration factor when the ratio of the value of the operating time until the temporal variation in luminance reaches a certain value by causing each display element to operate on the basis of the video signal of the gradation values in the state where the duty ratio of the emission period is set to the predetermined reference duty ratio under a temperature condition different from the predetermined temperature condition and the value of the operating time until the temporal variation in luminance reaches the certain value by causing each display element to operate on the basis of the video signal of the predetermined reference gradation value in the state where the duty ratio of the emission period under the predetermined temperature condition is set to the predetermined reference duty ratio is defined as the third operating time conversion factor, and wherein the reference operating time calculator calculates the value of the reference operating time by referring to the value stored in the operating time conversion factor storage to correspond to the gradation value of the video signal, the value stored in the duty ratio acceleration factor storage to correspond to the duty ratio of the emission period during operation, and the value stored in the temperature acceleration factor storage to correspond to temperature information of the temperature sensor and multiplying the value of a unit time by the stored values.

4. The display apparatus according to claim 3, wherein the temperature sensor is disposed in the display panel.

5. The display apparatus according to claim 4, wherein the light-emitting portion is formed of an organic electroluminescence light-emitting portion.

6. A display apparatus driving method using a display apparatus having a display panel that includes display elements having a current-driven light-emitting portion, in which the display elements are arranged in a two-dimensional matrix in a first direction and a second direction, and that displays an image on the basis of a video signal and a luminance correcting unit that corrects the luminance of the display elements when displaying an image on the display panel by correcting a gradation value of an input signal and outputting the corrected input signal as the video signal, the display apparatus driving method comprising:

correcting the luminance of the display elements when displaying an image on the display panel by correcting a gradation value of an input signal on the basis of the operation of the luminance correcting unit and outputting the corrected input signal as the video signal, wherein the correcting includes calculating the value of a reference operating time in which an temporal variation in luminance of each display element when the corresponding display element operates for a predetermined unit time on the basis of the video signal in a state where the duty ratio of an emission period is set to a certain duty ratio is equal to an temporal variation in luminance of each display element when it is assumed that the corresponding display element operates on the basis of the video signal of a predetermined reference gradation value in a state where the duty ratio of the emission period is set to a predetermined reference duty ratio;

storing an accumulated reference operating time value obtained by accumulating the value of the calculated reference operating time for each display element;

calculating a correction value of a gradation value used to compensate for the temporal variation in luminance of each display element with reference to a reference curve representing the relationship between the operating time of each display element and the temporal variation in luminance of the corresponding display element when the corresponding display element operates on the basis of the video signal of the predetermined reference gradation value in the state where the duty ratio of the emission period is set to the predetermined reference duty ratio on the basis of the accumulated reference operating time value and holding the correction value of the gradation value corresponding to the respective display elements; and correcting the gradation value of the input signal corresponding to the respective display elements on the basis of the correction values of the gradation values and outputting the corrected input signal as the video signal.

7. A display apparatus driving method comprising:

correcting the luminance of the display elements when displaying an image on the display panel by correcting a gradation value of an input signal and outputting the corrected input signal as the video signal, wherein the correcting includes calculating the value of a reference operating time in which an temporal variation in luminance of each display element at a duty ratio during operation is equal to an temporal variation in luminance of each display element at a predetermined reference duty ratio;

storing an accumulated reference operating time value obtained by accumulating the value of the reference operating time for each display element;

calculating a correction value of a gradation value with reference to a reference curve representing the relationship between the operating time of each display element and the temporal variation in luminance of the corresponding display element when the corresponding display element operates at the predetermined reference duty ratio on the basis of the accumulated reference operating time value and holding the correction value of the gradation value corresponding to the respective display elements; and correcting the gradation value of the input signal on the basis of the correction values of the gradation values.

* * * * *